(12) United States Patent
Plahte et al.

(10) Patent No.: US 6,993,360 B2
(45) Date of Patent: Jan. 31, 2006

(54) MOBILE BRANCH EXCHANGE

(75) Inventors: Ivar Plahte, London (GB); Sven Evensen, Ashtead (GB)

(73) Assignee: Onrelay Inc., Melville, NY (US)

( * ) Notice: Subject to any disclaimer, the term of this patent is extended or adjusted under 35 U.S.C. 154(b) by 763 days.

(21) Appl. No.: 10/000,492

(22) Filed: Dec. 4, 2001

(65) Prior Publication Data

US 2002/0132638 A1  Sep. 19, 2002

Related U.S. Application Data

(60) Provisional application No. 60/251,042, filed on Dec. 5, 2000, provisional application No. 60/255,897, filed on Dec. 18, 2000, provisional application No. 60/266,341, filed on Feb. 5, 2001.

(51) Int. Cl.
*H04B 1/38* (2006.01)

(52) U.S. Cl. .................................. 455/555; 455/554.1
(58) Field of Classification Search ................ 455/555, 455/554.1
See application file for complete search history.

(56) References Cited

U.S. PATENT DOCUMENTS

| 4,125,748 A | * | 11/1978 | Nahabedian et al. ........ 379/158 |
| 5,566,236 A | | 10/1996 | MeLampy et al. .......... 379/201 |
| 5,956,652 A | * | 9/1999 | Eriksson ..................... 455/555 |
| 5,995,603 A | | 11/1999 | Anderson .................... 379/142 |
| 6,516,061 B2 | * | 2/2003 | Horowitz et al. ........... 379/233 |
| 6,763,102 B1 | * | 7/2004 | Chen et al. ............. 379/221.15 |

FOREIGN PATENT DOCUMENTS

| EP | 0 510 411 | 10/1992 |
| EP | 0 716 533 | 6/1996 |
| GB | 2 291 565 | 1/1996 |
| GB | 2 324 677 | 10/1998 |
| WO | 96 22000 | 7/1996 |
| WO | 98 30002 | 7/1998 |

* cited by examiner

*Primary Examiner*—Ahmad F. Matar
*Assistant Examiner*—Rasha S. Al-Aubaidi
(74) *Attorney, Agent, or Firm*—Michael Bednarek; Pillsbury Winthrop Shaw Pittman LLP

(57) ABSTRACT

A mobile branch exchange (MBX) allows a user of a mobile telephone to exploit the functionality of a private branch exchange (PBX) as if the user were using a PBX-connected wire line telephone in an office setting. A server is placed on corporate premises and the server is configured to communicate with corresponding client software programmed into a programmable mobile telephone. The server directly interfaces with the PBX to control call placement and connectivity and operates as an intermediary proxy for the mobile telephone. In a preferred embodiment, the server establishes a data pathway to the mobile telephone that is, from a network point of view, independent of a parallel voice pathway established between the PBX and mobile telephone.

35 Claims, 44 Drawing Sheets

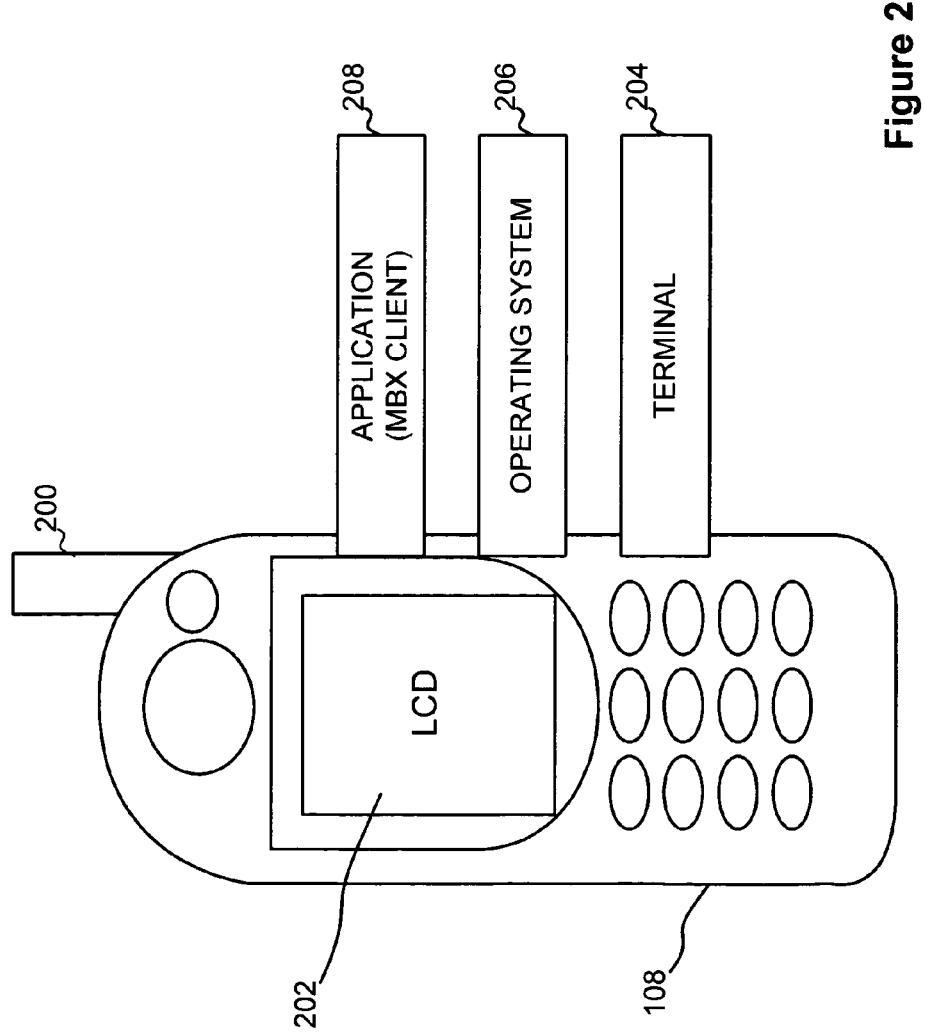

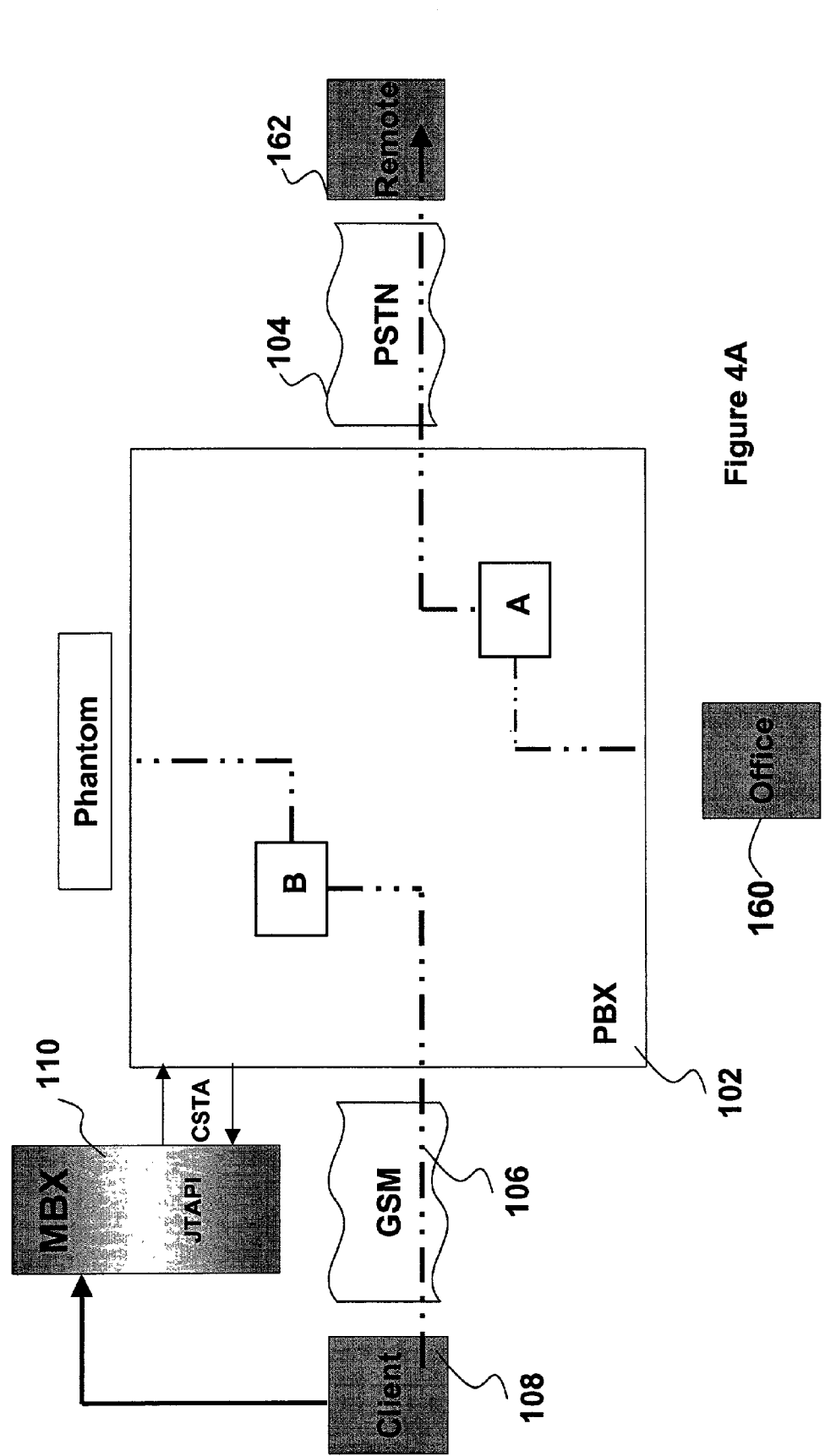

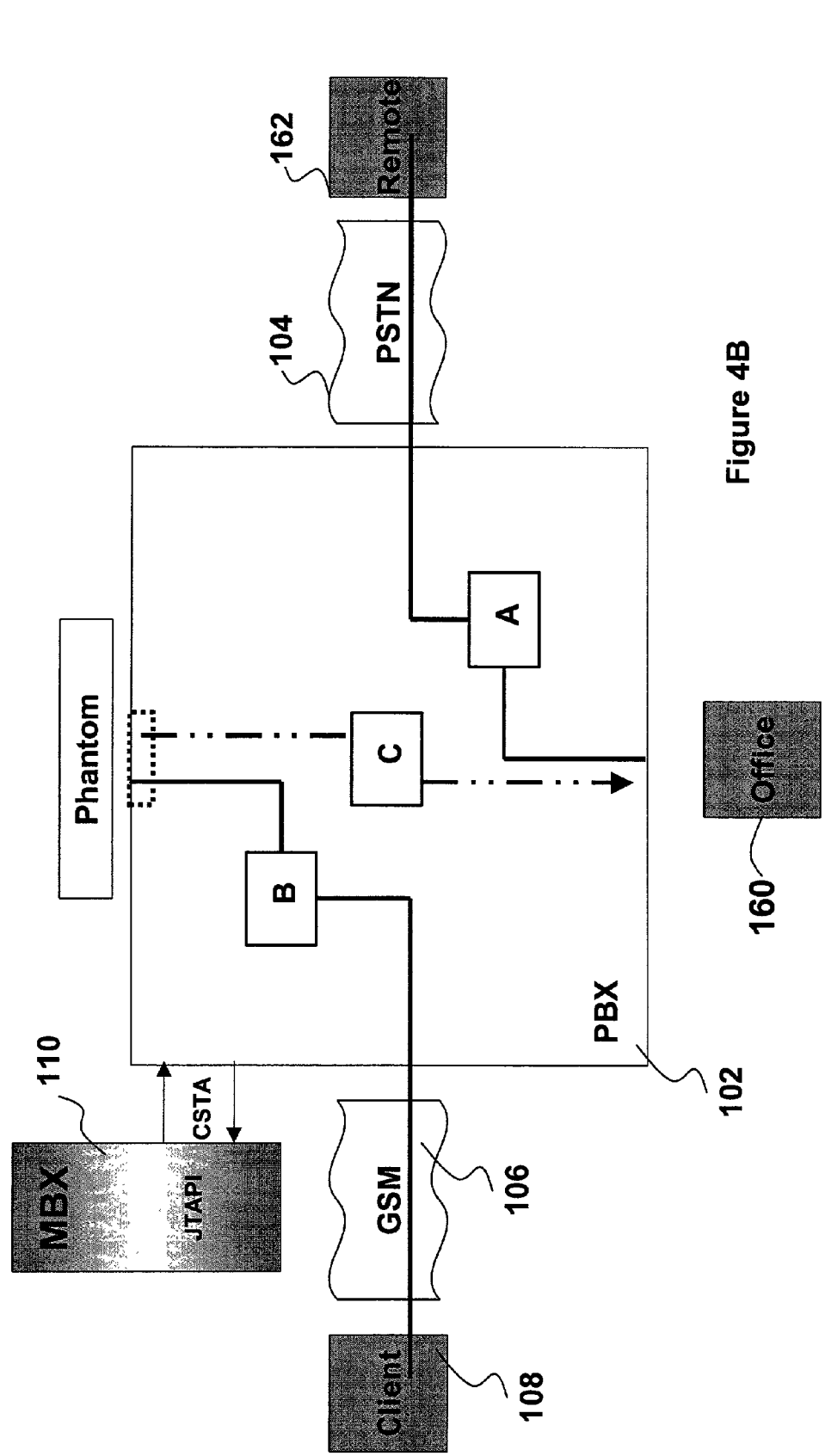

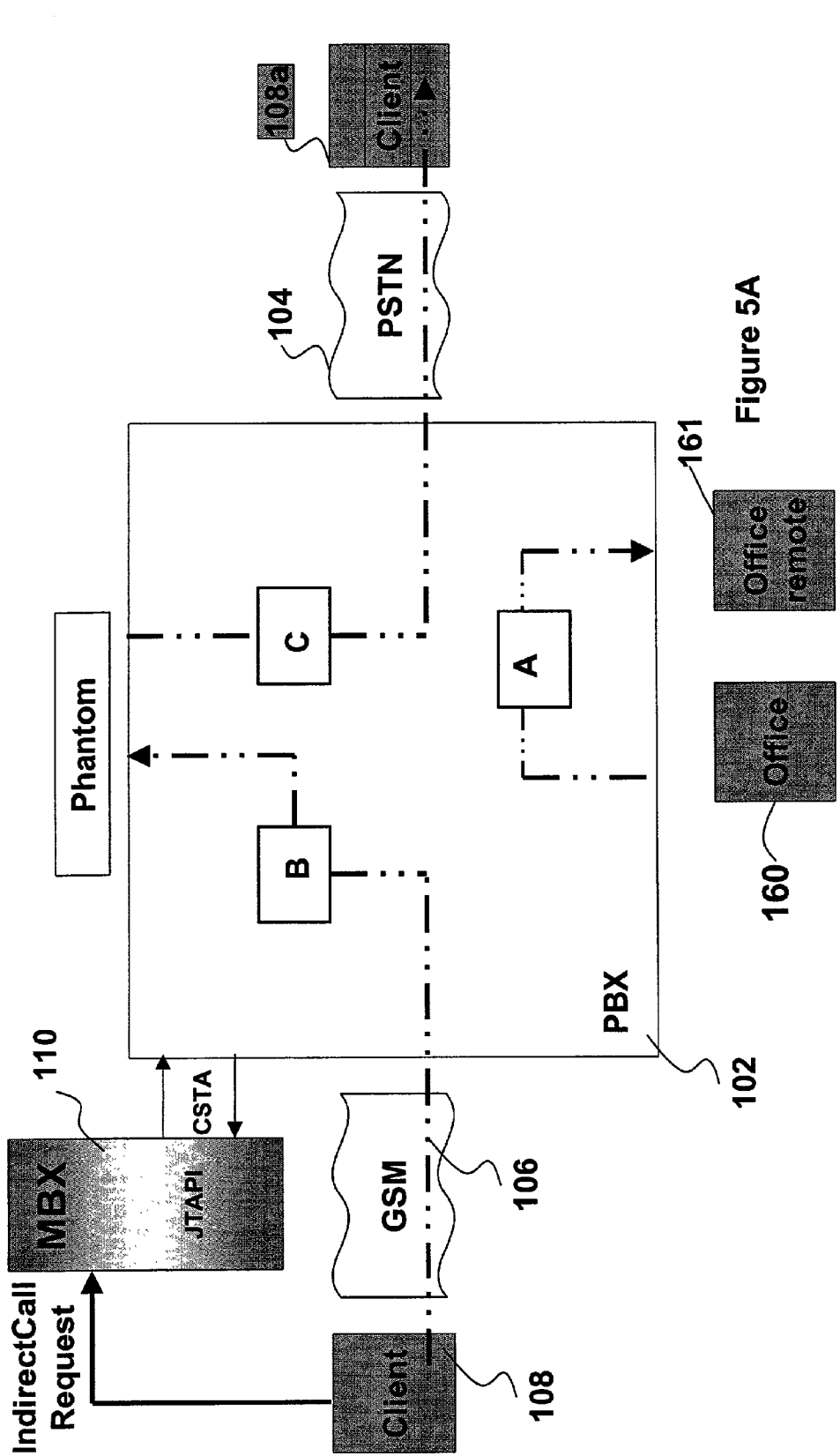

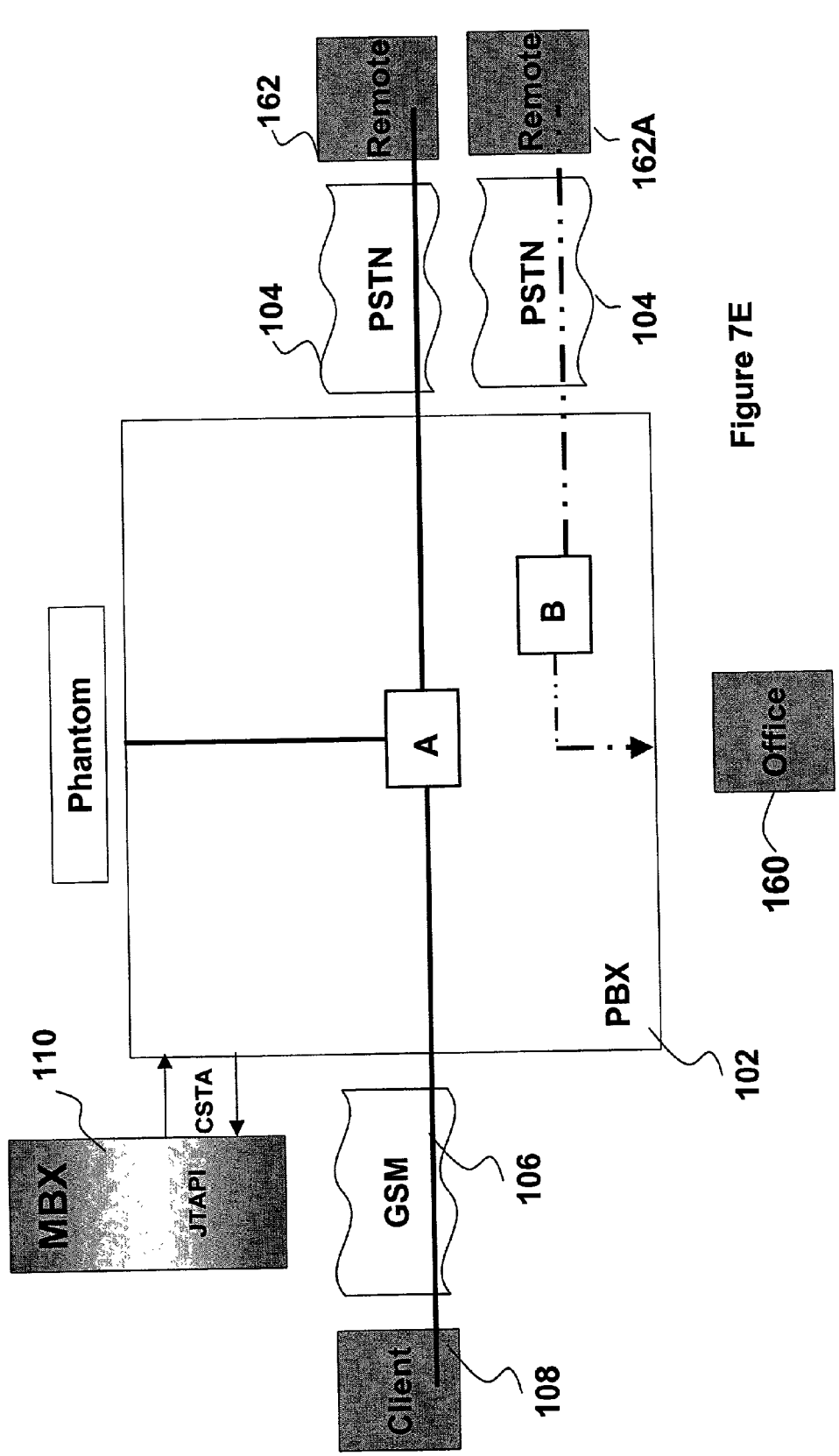

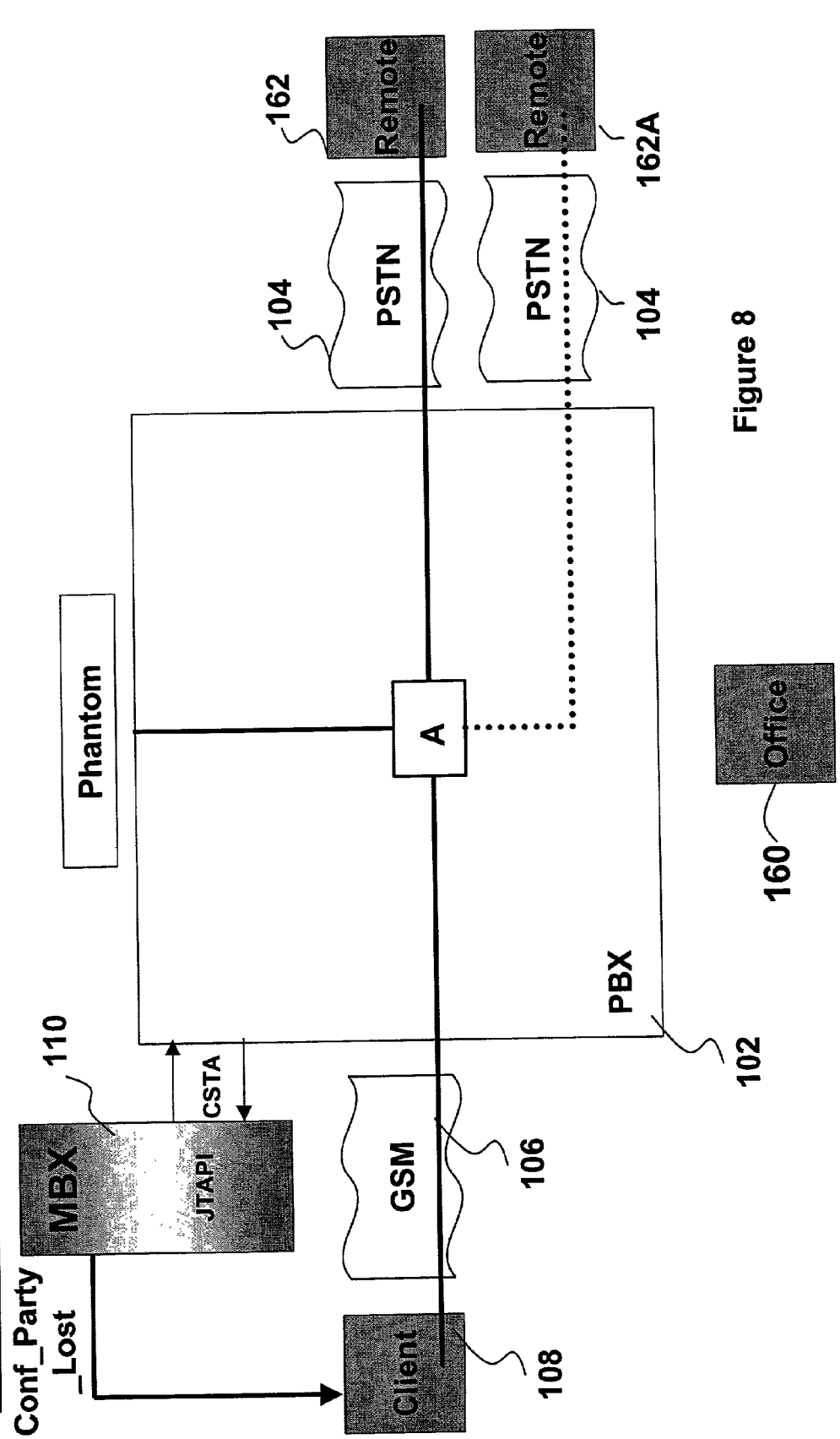

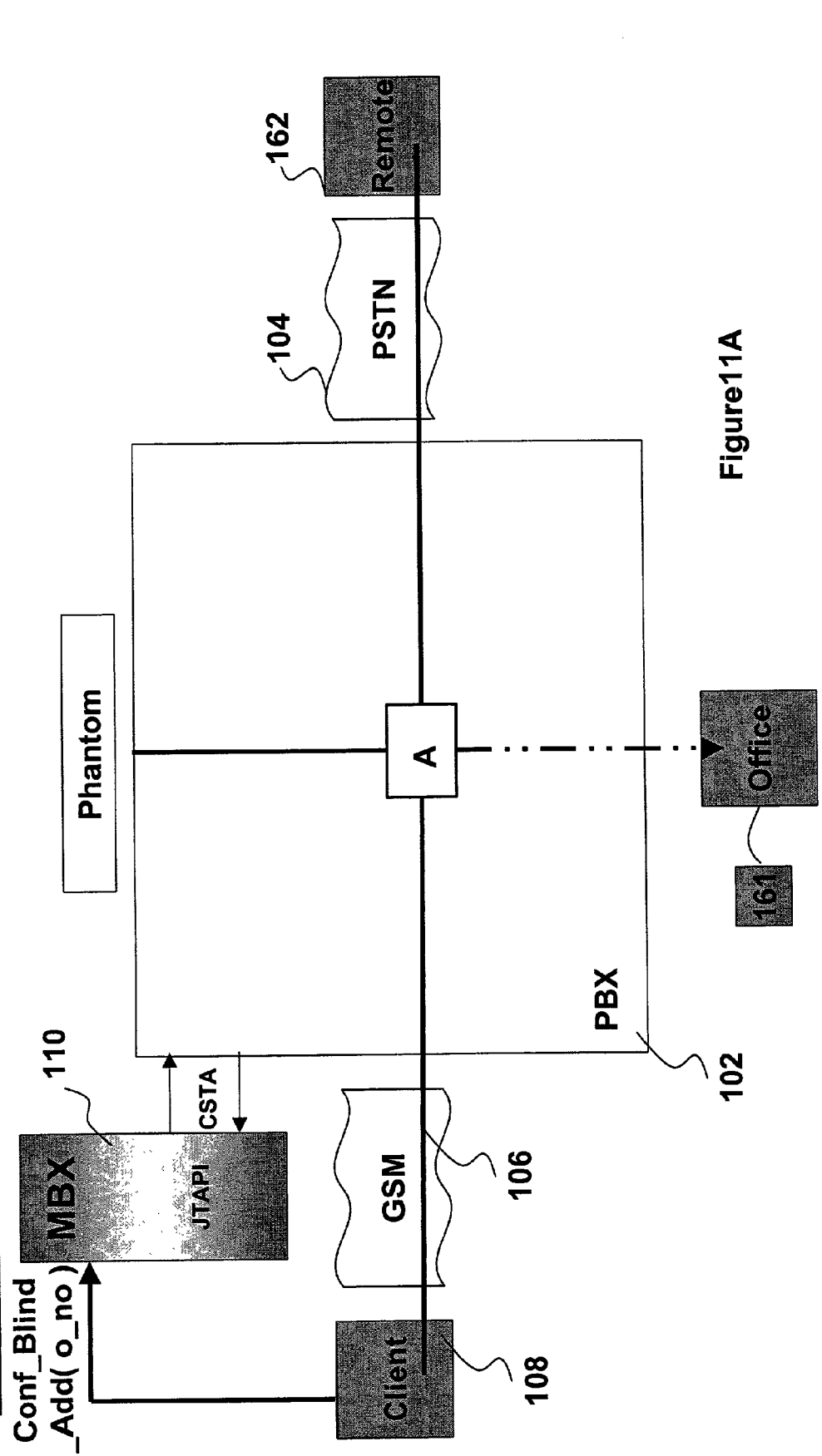

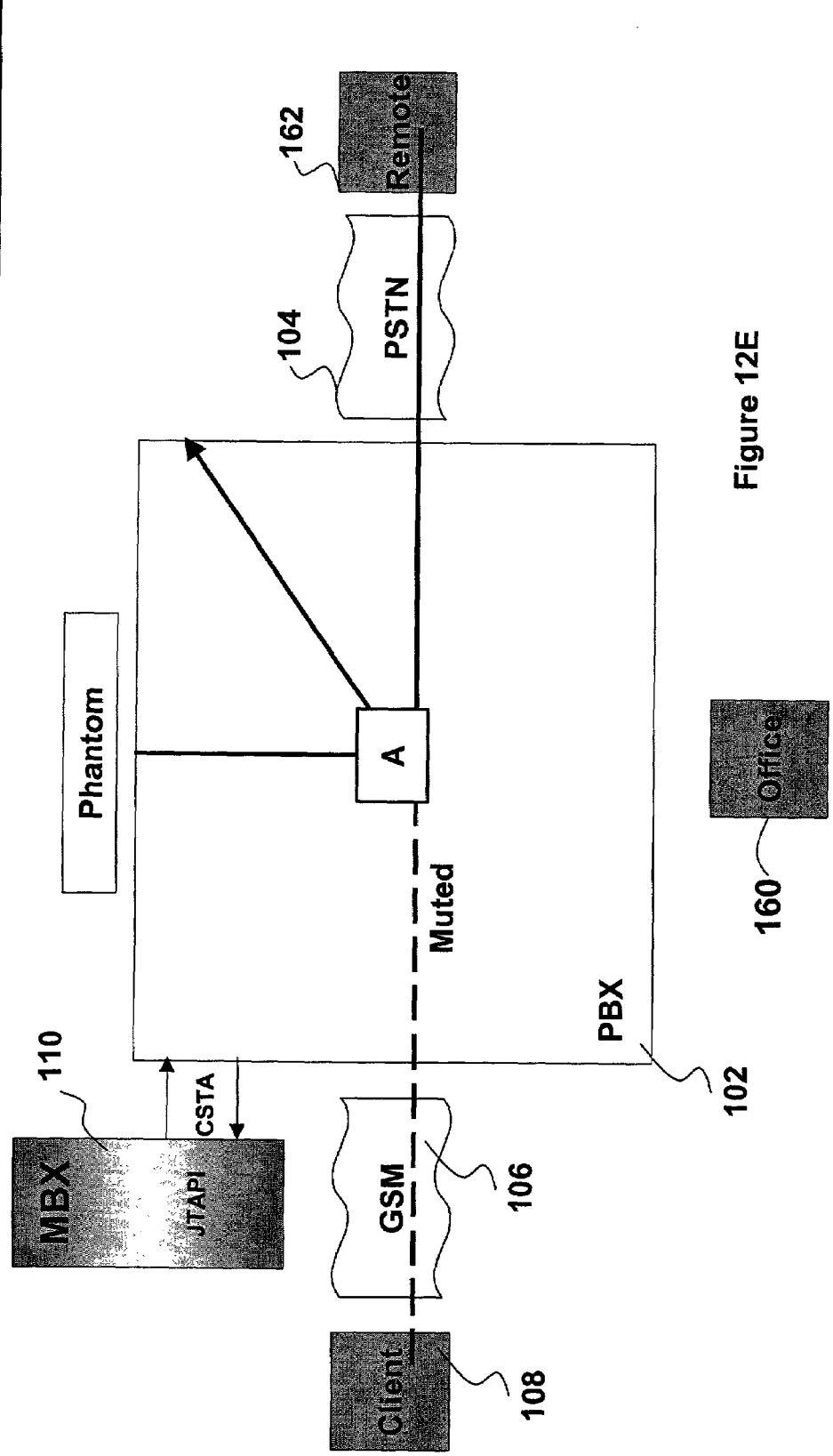

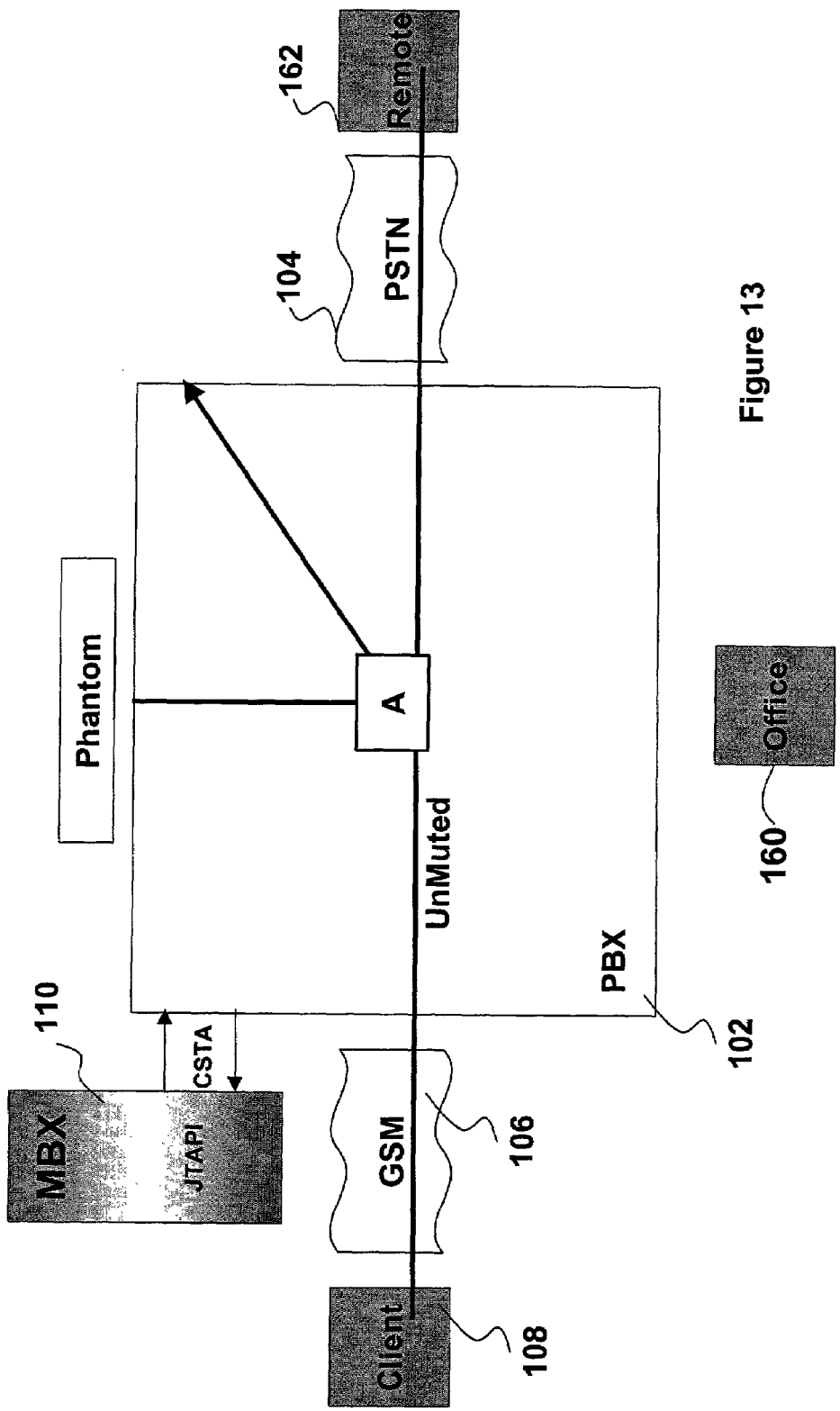

MOBILE BRANCH EXCHANGE

This application claims the benefit of U.S. Provisional Application No. 60/251,042 filed Dec. 5, 2000, U.S. Provisional Application No. 60/255,897 filed Dec. 18, 2000, and U.S. Provisional Application No. 60/266,341 filed Feb. 5, 2001, which are herein incorporated by reference in their entireties.

BACKGROUND

1. Field of the Invention

The present invention is directed to mobile telephony and related features thereof. More specifically, the present invention is directed to extending the functionality of a private branch exchange (PBX) to a mobile telephone or other mobile communication device. The present invention is further directed to providing other advanced services with respect to a mobile telephone that would otherwise be available only via a hard-wired networked computer and/or telecommunications system.

2. Background of the Invention

Voice communication is a touchstone of modern society and, in particular, business. Salespeople, technical people and employees at home, on the move, or on vacation, all need to stay in touch with colleagues and clients. However, when a businessperson leaves the office environment, he typically leaves behind a significant telecommunications infrastructure that resides in the business' telephone private branch exchange (PBX). A PBX offers tremendous functionality for the employee, such as calling line identity (including caller ID), conferencing, transferring, internal number plans and group calling and, more significantly, the PBX also allows IS/IT administrators to manage and provide high-quality, competitive, and cost efficient corporate telephony communications by means of features such as call screening and monitoring, Least Cost Routing (LCR), Virtual Private Networks (VPN), automated recording, automatic routing to switchboards, Interactive Voice Response systems (IVR), voice messaging systems, and call centers. However, this functionality is abandoned the instant the businessperson leaves the businesses premises and uses public mobile telephony services rather than the private fixed telephony system. Thus, when a businessperson is on the road, it is, at the very least, inconvenient, if not impossible, to avail himself of the functionality offered by a PBX. For instance, the PBX contains a set of conferencing features that allow employees to set up both blind and two-step conferences on the fly that are normally inaccessible from a mobile telephone.

Similarly, although some businesses allow their employees to divert office telephone calls to their mobile telephone, the mobile user employee is not able to see the true calling line identity of a diverted call, as the identity of the PBX trunk line is presented by the mobile network instead, and it is very cumbersome for employees to transfer the call to another PBX user, and impossible to allow the PBX to automatically route the call to another PBX user or group if the diverted call is not answered.

Thus, as can be readily appreciated, basic PBX functionality is not available to a mobile telephone user.

In addition, while the use of mobile telephones has exploded in recent years, mobile telephones have also introduced inconveniences of their own. For example, now, not only must a businessperson provide a telephone number that is associated with his company, but the businessperson must also provide a mobile telephone number that is associated with his personal mobile telephone. As a result, instead of keeping track of one telephone number, clients, colleagues, etc., must now keep track of at least two telephone numbers for a particular person. This unnecessarily fills address books and quickly becomes unmanageable, especially as mobile telephone users change service providers as mobile service provider competitors offer better and/or less expensive service.

This mix of company and personal telephone numbers also poses a significant problem for the company when the employee is terminated or leaves, as important corporate clients will keep placing business calls to the terminated employee's personal mobile telephone number, bypassing any corporate call management mechanism in place to ensure that customers calls are answered and responded to in an appropriate manner, also creating a risk that hostile former employees get the opportunity to damage or steal the client relationship.

Also, while mobile telephones provide exceptional opportunities for staying in touch, generally speaking, international mobile telephone calls are much more expensive than calls made via a company's telephone service, especially if the company exploits the advantages of negotiating for bulk telecommunications services.

Thus along with the advantages and convenience of mobile telephony there are, however, also several disadvantages, inconveniences, and failings of this technology, especially with respect to the business environment.

SUMMARY OF THE INVENTION

It is therefore an object of the present invention to provide a series of improvements in mobile telephone service and technology and thereby provide improved and extended functionality to mobile telephone users.

It is a significant object of the present invention to extend the functionality of a private branch exchange (PBX) to a mobile user.

It is a further object of the present invention to extend the functionality of a PBX by establishing a mobile branch exchange (MBX) that is in communication with the PBX and a mobile telephone or other wireless communication device.

It is yet another object of the present invention to set up and exploit separate voice and data paths synchronized between a mobile branch exchange and a program executing on a mobile communications device such as a mobile telephone.

It is another object of the present invention to provide a single telephone number that can be used to access both a regular office telephone as well as a user's mobile telephone.

It still another object of the present invention to provide at least the telephony functionality of a wireless mobile device that functions as a single mobile office terminal that combines the functionality of an office telephone with email, corporate intranet and corporate sales tools.

It is also an object of the present invention to provide a system and method of gaining seamless access to a mobile telephone user's corporate PBX via which less expensive telephone calls can be made.

It is still another object of the present invention to provide integration between incoming and outgoing mobile telephone calls and a contacts database.

These and other objects of the present invention are made possible by a unique and heretofore unknown architecture that exploits both the features offered by a conventional private branch exchange (PBX) and the features of emerging programmable mobile telephones. Separate voice and data channels are preferably established whereby the PBX can pass voice communication through the PBX and, at the same time, pass to and receive data (e.g., calling line ID information or number for transfer) from the mobile telephone.

More particularly, the present invention, which comprises server and client side innovation, combines voice and data channels via a Voice Data Synchronization Protocol (VDSP) to provide cutting edge voice integrated features, using simple graphical user interfaces, to all mobile telephone users wherever they are located around the world.

A server (or mobile branch exchange (MBX)) directly interfaces with a PBX via the well-known Computer Telephone Integration (CTI) interface, Computer Software Telephony Application (CSTA), or via a similar call control interface. The MBX is thus able to function as an intermediary proxy needed to provide full PBX functionality to the mobile telephone, or other wireless device.

A software client for the MBX system is installed on, or an integrated part of, the mobile telephone, or other wireless device, and it directly interfaces with the mobile voice and data hardware on the mobile telephone via well known interfaces such as AT commands, Telephony Application Programming Interface (TAPI), JavaPhone, Subscriber Identity Module (SIM) Toolkit, Wireless Application Protocol (WAP) Telephony Application Interface (WTAI), or via similar call control interface. The software client is thus able to handle independent data signals and voice events/commands and present these to the user as integrated components of the same call.

The extension of PBX functionality is made possible by setting up a data link via a network independent protocol running over the data-leg (or channel) of VDSP between the MBX and a programmable mobile telephone in parallel with the basic voice connection between the PBX and the programmable mobile telephone. The MBX server and the mobile telephone client uses the data protocol link to synchronize the call control interfaces on both the server side and the client side of the voice connection, and to pass the information needed to establish the functional procedures that can not be signaled over standard public voice connections. The server side uses CSTA or similar PBX call control interface to monitor and control the PBX end of the call, while the client program uses a similar call control interface, such as TAPI, JavaPhone, AT commands, or SIM Toolkit, to monitor and control the mobile telephone side of the call.

The present invention leverages a client-server model; an intelligent/programmed wireless client and an intelligent server that controls the PBX are employed to implement the application. The network is used as a carrier of voice and specialized data. For private wireless systems, an MBX client is provided with a Wireless Local Area Network (W-LAN) interface using Voice over Internet Protocol (VoIP) in parallel with the data stream. A VoIP protocol such as H.323 or SIP is used as a dumb carrier of the voice traffic, while the intelligence is sent in parallel over a data connection and synchronized at the client and the server respectively. In the latter configuration, the MBX also contains an IP-PBX or interfaces via a standard call control API to an external IP-PBX.

In an IP-PBX configuration, when the user is in his/her office it is also possible to transport the voice and data signaling between the client and the server over a fixed Local Area Network (LAN), by means of the mobile telephone/personal digital assistant 'Hot-Sync' cradle that normally has a LAN interface connection either via the PC or directly. In this instance, the fixed line LAN carries VDSP via the cradle when the mobile telephone is stationary in the cradle, and automatically switches to mobile (GSM or W-LAN) voice and data connections when the mobile telephone is removed from the cradle.

While a mobile telephone in accordance with the present invention is technologically advanced, the invention is quick and easy to deploy and scale, as well as cost effective, because, typically, it does not necessitate replacing an existing PBX, it does not, typically, require major changes to the PBX configuration or changes to the corporate number plan, nor, typically, does the PBX require additional hardware, depending, of course, on the specific implementation. The MBX reliably connects to and compliments even large distributed multi-vendor corporate voice systems utilizing standard PBX interfaces. The solution is highly scalable, integrates with all commercial PBXs and requires no upgrades to the mobile or enterprise networks.

In accordance with the present invention, a significant number of features are extended to or are made available to a mobile telephone, a sampling of which is summarily described below.

Calling Line Identity (CLI) for Calls via PBX: A well known previously unsolved problem in the telephony world is that the Calling Line Identity (calling number) for calls diverted, redirected, or transferred to mobile telephones via the PBX are presented as emerging from the PBX and not from the real incoming caller. The invention solves this by reading the true CLI from the PBX and passing it over the data-link in parallel with the phone call. The mobile telephone uses this information to look up full caller details in the native contact list, if present.

Additional Caller Details: The MBX server also does a public directory, a corporate directory, and/or CRM database look-up to gain access to the full contact details of the calling party, including company name and title, irrespective of the network or when roaming, and passes the information over the data-link to the mobile client alongside the Calling Line Identity (CLI).

Always-on Missed Call Registers: Ability to receive a complete log of all missed calls, even when the telephone is turned off.

Listen-in Voicemail: Screening voicemail message by 'listening in' to a message as it is being recorded. Calls can be interrupted and answered thereby simulating home-answering machine behavior.

Automatic Reconnection for Dropped Incoming Calls: If a diverted call to a mobile telephone is dropped due to cellular coverage limitations, the MBX will attempt to reconnect the caller, and if this is not possible, it will route the call to voicemail or a switchboard.

Unified Business Number: A user's existing office telephone number automatically becomes a single unified business number both for receiving incoming calls and for external presentation of outgoing calls.

Advanced Handling of Incoming Calls: Ability to forward a call without answering it, while in a meeting or while busy in another call.

Synchronized Simultaneous Ringing: The mobile telephone and fixed line telephone ring at the same time, providing the opportunity to pick up the call where most convenient without manual configuration of diversions.

Internal Short Number Dialing Plan: A user can choose on a call-by-call basis between using public dialing or PBX short number dialing to reach a party, including, e.g., dialing "9" for a switchboard.

Single Step Outgoing Conference: Allows the user to dial-in a new party into an established two-party or multi-party call such that all existing participants can listen in as the new party's phone is ringing and the new participant is introduced to the call. This allows the user to arrange a phone meeting by simply calling out to all participants at an agreed time.

Single Step Incoming Conference: Allows the user to add an incoming caller to an existing two-party or multi-party call in a single step, thereby, e.g., allowing a phone meeting to be set up by arranging for several people to call the user at his regular business number at an agreed time, and in combination with the Single Step Outgoing Conference function also, e.g., include participants that happen to forget calling in to the meeting.

Individual Call Participant Display: The mobile user is presented a list of all call participants that is automatically updated as a parties leave or become added to a call. Also, the time of which individual participants have been included in the call is displayed alongside their identity.

Drop Conference Party: Via the Individual Call Participant Display the user acting as the call controller can individually select and enforce a call participant to be dropped from the call, for instance securely allowing a phone meeting to continue after one or more external parties that are no longer wanted in the meeting are dropped.

Leave Call/Online Transfer: The Leave Call function allows the call controller to leave the call, and to pass along the call control to another user, without closing the call. This also allows for a very useful Online Transfer mechanism in which the party to receive the transferred call is first added to a three-party call for a brief period, and the call controller subsequently introduces the other two participants before leaving the call to them. This helps overcome a great psychological obstacle many users have for loosing the initial call when setting up transfers, as normal transfer functions either automatically puts the initial call on hold or 'blindly' transfer the initial call to another telephone.

Personal Call Data Records and Call Notes: Permits integrated note taking on a wireless handheld during a call, wherein a note is stored locally at the mobile telephone and/or synchronized with the employee PC. The note is saved with the Call Data Record (including duration, numbers called/received) as a calendar entry on the mobile telephone calendar at the time the call was placed or received, making the history of the calendar a comprehensive record of all calls. The call note made by the user is automatically included in the Call Data Record, and can subsequently be accessed by looking up the calendar entry at the time the call was made.

Personal Call Data Records Sorted per Contact: Call Data Records and notes are fully searchable by name of contact, time of call, date, or keyword, for both incoming and outgoing calls.

Full GUI Integration with Native Contact List: The mobile telephone is preferably integrated with the native contact list, e.g., Microsoft Outlook, and includes address book number parsing for easy dialing of numbers with parenthesis, dots, etc. that have been entered in the contact list.

Advanced Call Filtering: Permits configuration control over how a user wants to be reached based on, e.g., time of day or status of calendar. This feature can be combined with a personal VIP list of people who will always be able to get through to the mobile telephone independent of the Call Filtering settings.

Advanced Optional-Length Call Registers: Outgoing, incoming and missed call registers are not limited by the Subscriber Identity Module (SIM) memory, but can be stored in the mobile telephone memory and be configured with arbitrary length.

Voice Mail Indicator Synchronization: Most PBX desk phones have a voice mail indicator lamp that lights up when someone has left a voice mail at the PBX. This lamp is fully synchronized with a corresponding graphical indicator on the mobile telephone such that the mobile telephone user at any time knows whether a voice mail has been left at his/her PBX extension. The mobile telephone user can subsequently click on the graphical voice mail indicator to call the voice mail system and automatically log on to his/her account to listen to the message(s).

A number of even more advanced functions are enabled when all mobile telephone endpoints in the call are clients of the MBX system, a small subset of which are described below:

Data Conferencing: While the PBX switches the voice part of the call, the MBX server allows simultaneous real-time data to be mixed and distributed between the call participants over the data-leg of VDSP. Such data can be text information and call notes, shared whiteboards, shared applications, pictures, world-wide-web pages, presentations, files, and similar electronic information.

Virtual Closed Band Radio: The MBX system can also be configured to implement the behavior of a Closed Band (CB) radio system, in which a never-ending PBX conference is used to mix the audio from all participants, participants can enter and leave the radio channel when they please, and every participant has a press-to-talk function on their mobile telephone client that enforces all other participants to be muted.

The present invention also enables the IS/IT management to improve cost control and management of mobile telephony. Such control is increasingly critical as corporate mobile telephony costs escalate and managers lose control of disbursed employee mobile bills and call processing migrate from the private corporate voice system to public mobile operator services. The mobile telephone of the present invention provides the following cost control functionality:

Enforcing Routing of all Outgoing Mobile Calls Through the PBX: This enables the access filtering mechanisms already implemented per user in the PBX that limits the domestic and international destinations that an employee may call directly from his/her office phone.

Automatic Use of Pre-Programmed PBX Short Numbers: This enables mobile use of negotiated rates or VPN connections, which are currently being bypassed by mobile users, thereby allowing fuller use of expensive VPN links.

Project Code Utilization: Allows use of project codes implemented in the PBX, ensuring that expansible calls are appropriately allocated to clients, and not absorbed by the corporation.

Accumulate and Aggregate Call Data Records: The mobile telephone of the invention preferably automates the passing and accumulation of call data records for all incoming and outgoing mobile office calls, also for calls that are routed directly over the mobile networks. This allows IS/IT management to monitor call volume and distribution patterns, and sales and marketing management to export and aggregate the accumulated data into CRM systems.

Single Business Contact Numbers: The existing PBX extension number can be used as a single public contact number for each employee, meaning existing troublesome privacy considerations and employee termination complications in publicly distributing employees' personal mobile phone numbers as part of corporate directories can be avoided.

Single Mobile Office Device: The integration of PBX functionality onto a wireless handheld, alongside e-mail and intranet integration, allows corporate IS/IT management to purchase and support only a single mobile device and single mobile subscription per employee, thereby reducing support, and purchasing costs.

BRIEF DESCRIPTION OF THE DRAWINGS

The present invention will now be explained in more detail in conjunction with several drawings in which

FIG. 2 depicts a programmable mobile telephone or mobile telecommunications device in accordance with the present invention;

FIGS. 3A–13 depict stepwise MBX control of a PBX for several different types of calling functionality in accordance with the present invention.

DETAILED DESCRIPTION OF THE INVENTION

Figure 1:
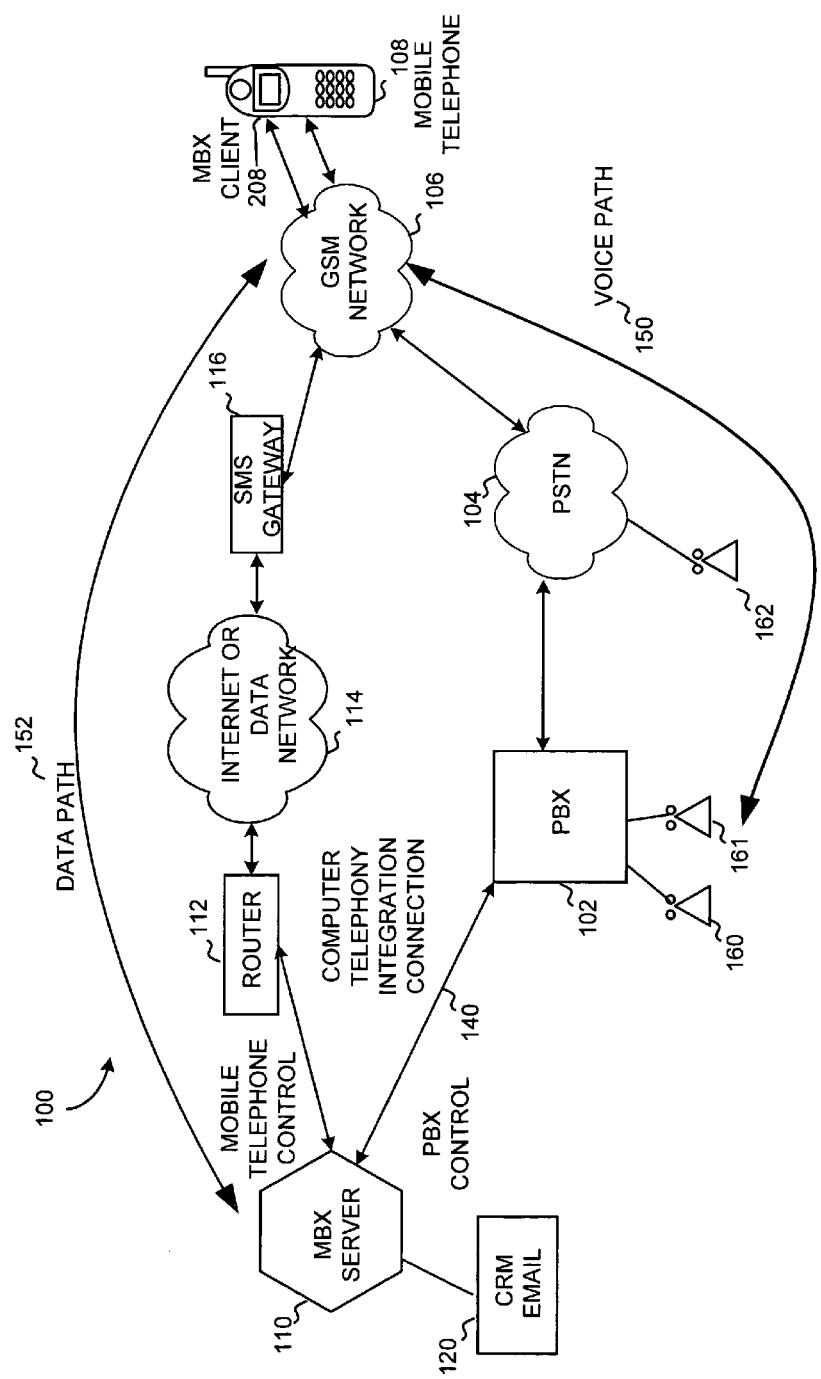
FIG. 1 illustrates an exemplary architecture for implementing the present invention.

FIG. 1 shows an exemplary system or architecture 100 for implementing the present invention. As will be appreciated by those skilled in the art, most of what is shown in FIG. 1 is well-known cellular telephone, data network, and private branch exchange (PBX) technology. However, in accordance with the present invention, there is provided significant improvements and functionality to this technology by introducing new components and by leveraging this existing technology.

System 100 includes a private branch exchange (PBX) 102 such as an Avaya (formerly Lucent) Definity Generic 3 PBX, Siemens Hicom 300E PBX, Nortel Meridian 1 PBX, Ericsson MD110 PBX, Alcatel 4400 PBX, or any other PBX having the necessary functionality for performing the steps described throughout the following description. A private branch exchange (PBX) can also be an Internet Protocol Telephony-based server such as Cisco Call Manager. As further illustrated, PBX 102 is connected to the public switched telephone network (PSTN) 104 in a conventional manner. PSTN 104 is in communication with a mobile communications network such as the Global System for Mobile Communications (GSM) 106. However, the present invention is operable with any mobile communication network that supports at least voice and data communication to and from a mobile device.

As would be expected, GSM network 106 is in communication with a mobile telephone 108. Although a mobile telephone is specifically shown in FIG. 1, the present invention is intended to cover virtually all forms of mobile communications devices including, but not limited to, a Personal Digital Assistant ("PDA")/Smartphone, a mobile telephone, a mobile computer, etc., that execute an operating system such as EPOC (from Symbian Software), Palm OS (from Palm, Inc.), PocketPC (from Microsoft Corp.), Pocket Linux (shareware), or other operating system—or alternatively a Wireless Access Protocol ("WAP"), SIM Toolkit ("STK") or Java Virtual Machine Micro Edition (J2ME). In this description device 108 will be referred to as a "mobile telephone", but it should be understood by those skilled in the art that any of the foregoing devices could also be employed. Mobile telephone 108, as shown in FIG. 2, preferably includes a display 202 such as a liquid crystal display, via which several pieces of information can be presented to a user using a graphical user interface. Importantly, mobile telephone 108 is preferably an intelligent, programmable handset such as those that are quickly replacing older mobile telephones with embedded telephony applications. While the mobile telephone shown in FIG. 2 includes conventional buttons for dialing, as will be explained later herein, display 202 is preferably a touch screen display on which "buttons" can be presented within a graphical user interface (GUI).

The programmable handset can be visualized, logically, as having three main components or layers: a terminal 204, an operating system 206 and an application 208. In accordance with the present invention, a client program or application is preferably loaded into application layer 208 of mobile telephone 108 such that it operates according to the principles set forth herein. The application preferably has access to the GSM functionality of the device, either directly via GSM AT commands, or with a higher level API provided as part of the wireless handset operating system, such as TAPI or JAVAPhone.

Referring again to FIG. 1, system 100 further includes a mobile branch exchange (MBX) 110 that is, in concert with the client-side software application loaded in mobile telephone 108, at the core of the present invention. Detailed functionality of MBX 110 is described later herein. MBX 110 is in communication with, for example, a router 112, which in turn provides access to a data network 114 such as the Internet. Data network 114 is in communication with a device that can pass non-voice data to mobile telephone 108. In the exemplary embodiment depicted in FIG. 1, a short message service (SMS) gateway 116 is employed. SMS gateway 116 is connected to the mobile telephone network 106, which provides wireless connectivity to mobile telephone 108.

As is further illustrated in FIG. 1, the topology of the device interconnectivity provides two separate channels, paths, or tunnels, between MBX 110 and mobile telephone 108: a voice path 150 and a data path 152. In accordance with the present invention, voice path 150 supports a voice channel that connects any one of telephones 160, 161, 162 to mobile telephone 108. Significantly, as will be described in more detail with respect to the functionality of MBX 110, both calls outgoing to mobile telephone 108 and calls incoming from mobile telephone 108 are preferably passed through PBX 102, which is under the control of MBX 110. Overall synchronization between mobile telephone 108 and MBX 110 is made possible, at least in part, by data path 152.

More specifically, the purpose of MBX 110 is to allow mobile users to connect to PBX 102 as if they were in a conventional office environment. In a preferred embodiment, this can be accomplished by placing on a customer premises a software server, namely, MBX 110, which communicates with a corresponding software/firmware client on mobile telephone 108.

MBX 110 preferably directly interfaces to PBX 102 via a standard Computer Telephone Integration ("CTI") interface 140 such as Computer Software Telephony Application ("CSTA"), Telephone Application Programming Interface ("TAPI" and Java TAPI) and Telephone Server Application Programming Interface ("TSAPI"). Alternatively, MBX 110 can be an integrated part of the PBX itself. MBX 110 functions as an intermediary proxy to provide PBX functionality to mobile telephone 108. In a preferred embodiment full, or at least a significant amount of, PBX functionality is provided or extended to mobile telephone 108.

More specifically PBX functionality is made available to mobile telephone 108 by setting up a data link between MBX 110 and mobile telephone 108 in parallel with the basic voice connection between the PBX and the mobile telephone. MBX 110 synchronizes voice and data by means of the PBX's Computer Supported Telephony Applications ("CSTA") interface, which allows MBX 110 to take control of selected calls through PBX 102, and the call control interface on the client, which allows the client application to take control of the calls on the mobile telephone.

For the parallel data transport via data path 152, MBX 110 can employ Internet Protocol ("IP"), Short Message Service ("SMS"), Unstructured Supplementary Service Data ("USSD"), General Packet Radio Service ("GPRS"), Enhanced Datarate for Global Evolution ("EDGE"), user/private/application data fields in public voice protocols (such as the Integrated Services Digital Network ("ISDN") protocol, SS7, GSM, SIP or H.323), Bluetooth, Wireless Access Protocol (WAP), CDPD, LMDS, High Speed Circuit Switched Data (HSCSD), W-CDMA (e.g. CDMA 2000, UMTS, or any other variants of W-CDMA), Mobitex, two way paging, wireless Ethernet, or any other wireless data (circuit or packet switched) protocol to send call-data to mobile telephone 108 in parallel with the voice call. When appropriate, it is also possible to simultaneously use multiple data transport protocols in the same system, even during the same call.

The voice call via voice path 150 can be carried by any wireless voice technology including, but not limited to, GSM, DECT, W-CDMA (e.g. CDMA 2000, UMTS, or any other variants of W-CDMA), High Speed Circuit Switched Data (HSCSD), TDMA, Trunked Radio, TETRA, LMDS, and H.323 or Session Initiation Protocol ("SIP") over Wireless Local Area Networks or 3G. In such a public configuration, the intelligent/programmed mobile telephone client and an intelligent server (MBX 110) that controls PBX 102 are used to achieve the goals of the invention (by, in effect, using the mobile networks as a dumb carrier).

As shown in FIG. 2, mobile telephone 108 is capable of being programmed in accordance with a service provider's specifications by loading a software program into application layer 208 of mobile telephone 108. In accordance with the present invention, the client software that communicates with MBX 110 is loaded in this layer.

It is noted that not only can an interface such as JTAPI (or TAPI) be employed to control/listen to PBX 102, but the present invention can also be configured to provide an extended JTAPI interface that includes the functionality to handle mobile telephones 108 as a regular PBX extension, meaning that existing 3rd party call-centers and CTI applications in the market place can be extended to support the MBX, thereby allowing the $3^{rd}$ party application to also perform call control operations and monitor the mobile telephones in addition to the fixed line PBX phones.

Similarly, the present invention may provide a JTAPI-like call-control interface to other client applications running on a mobile telephone enabling, e.g., a 3rd party e-mail program to implement click-to-call functionality.

Figure 1A:
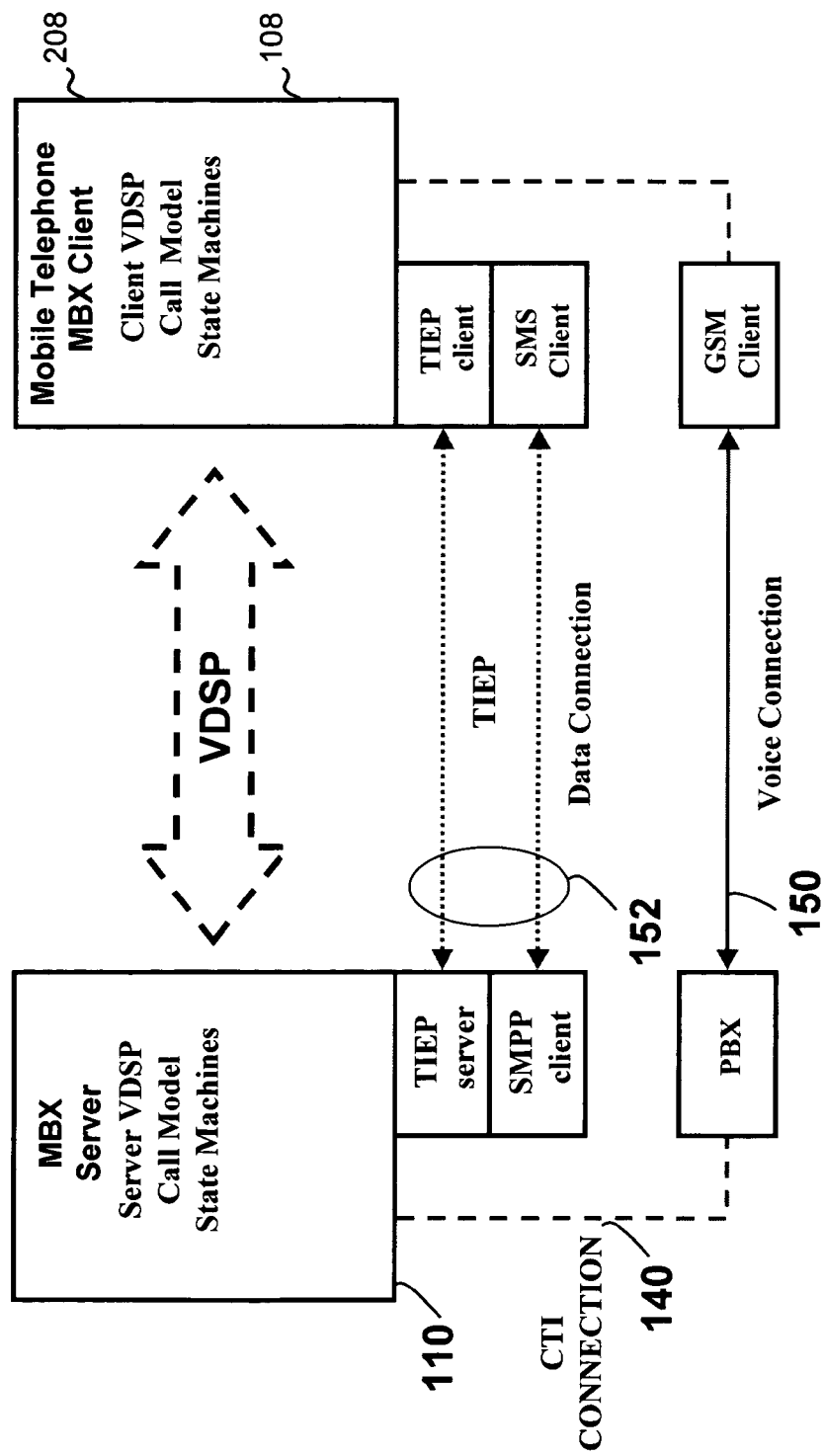
FIG. 1A is a schematic diagram of an architecture for implementing a voice data synchronization protocol in accordance with the present invention.

Preferably, overall interaction between MBX 110 and mobile telephone 108 is effected via a voice data synchronization protocol (VDSP) that enables intelligent wireless handhelds to become seamless PBX extensions. In accordance with the present invention, VDSP comprises three main components as shown in FIG. 1A:

(1) a standard PBX-to-mobile voice connection, such as ISDN/GSM, monitored and controlled by means of complete call control APIs towards both the PBX at MBX end and the mobile telephone at the client end;

(2) a telephony information exchange protocol (TIEP), or any other suitable protocol, that runs over a standard mobile data service, such as SMS or GPRS, between the client and the server (mobile telephone and MBX). TIEP transports signaling information between MBX 110 and mobile telephone 108 that can not be transported by standard voice network protocols, and thus enables the system to bypass the limitations that these protocols impose on mobile PBX integration; and (3) VDSP functionality located on both ends of the connections to implement the call features of the system. State machines are preferably employed to deal with the complexity of controlling two independent voice and data connections from both ends, while also maintaining consistency and synchronization within the system when data packet loss occurs. The actual state machine design depends on the particular implementation and it is well within the skill of those familiar with the art to construct and deploy such call model state machines once an overall architecture has been chosen.

The following is a listing of exemplary TIEP codes that are implemented for call control in accordance with the present invention. Preferably, the appropriate code is transmitted along with a message identifier, a timestamp, a length and attributes (where desired) between the MBX and mobile telephone as shown schematically in FIG. 1A. The TIEP protocol is readily extended to accommodate for new functionality, and can be modified without changes to any public voice or data protocols.

| Code | Type |
|---|---|
| 0 | ACK |
| 1 | RAW |
| 2 | CLI_INDICATION |
| 3 | VOICEMAIL_INDICATION |
| 4 | LOST_CALL_INDICATION |
| 5 | LISTEN_IN_INDICATION |
| 6 | CONFERENCE_NO_ANSWER_INDICATION |
| 7 | CONFERENCE_PARTY_LOST_INDICATION |
| 8 | CLI_QUEUED_INDICATION |
| 9 | CONFERENCE_INDICATION |
| 100 | INDIRECT_CALL_REQUEST |
| 101 | CONFERENCE_BLIND_INCLUDE_REQUEST |
| 102 | CONFERENCE_BLIND_ADD_REQUEST |
| 103 | CONFERENCE_DROP_PARTY_REQUEST |
| 104 | FORWARD_REQUEST |
| 105 | FORWARD_VOICE_MAIL_REQUEST |
| 106 | LISTEN_IN_REQUEST |
| 107 | LISTEN_IN_PICKUP_REQUEST |
| 108 | CLIENT_CRADLE_STATUS_INDICATION |
| 109 | CLIENT_CRADLE_CONTROL_INDICATION |

FIGS. 3A–13 depict stepwise control of PBX 102 for the following different types of calling functionality. While the following description focuses on employing a "phantom call" initiated by a PBX, other PBX functionality may also be employed the sequences and calling results described below.

(1) Incoming Call
(2) Outgoing Indirect Call
(3) Outgoing Indirect Call to MBX client
(4) Outgoing Conference
(5) Incoming Conference
(6) Conference Lost Participant
(7) Conference Drop Participant
(8) Forward Call
(9) Transfer Call
(10) Listen In—Forward
(11) Listen In—Intrude (1) Incoming Call FIGS. 3A–3E depict how an incoming call from a remote telephone 162 is preferably processed in accordance with the present invention. Preferably, all PBX control and data exchange to the mobile telephone 108 is controlled by MBX 110.

Figure 3A:
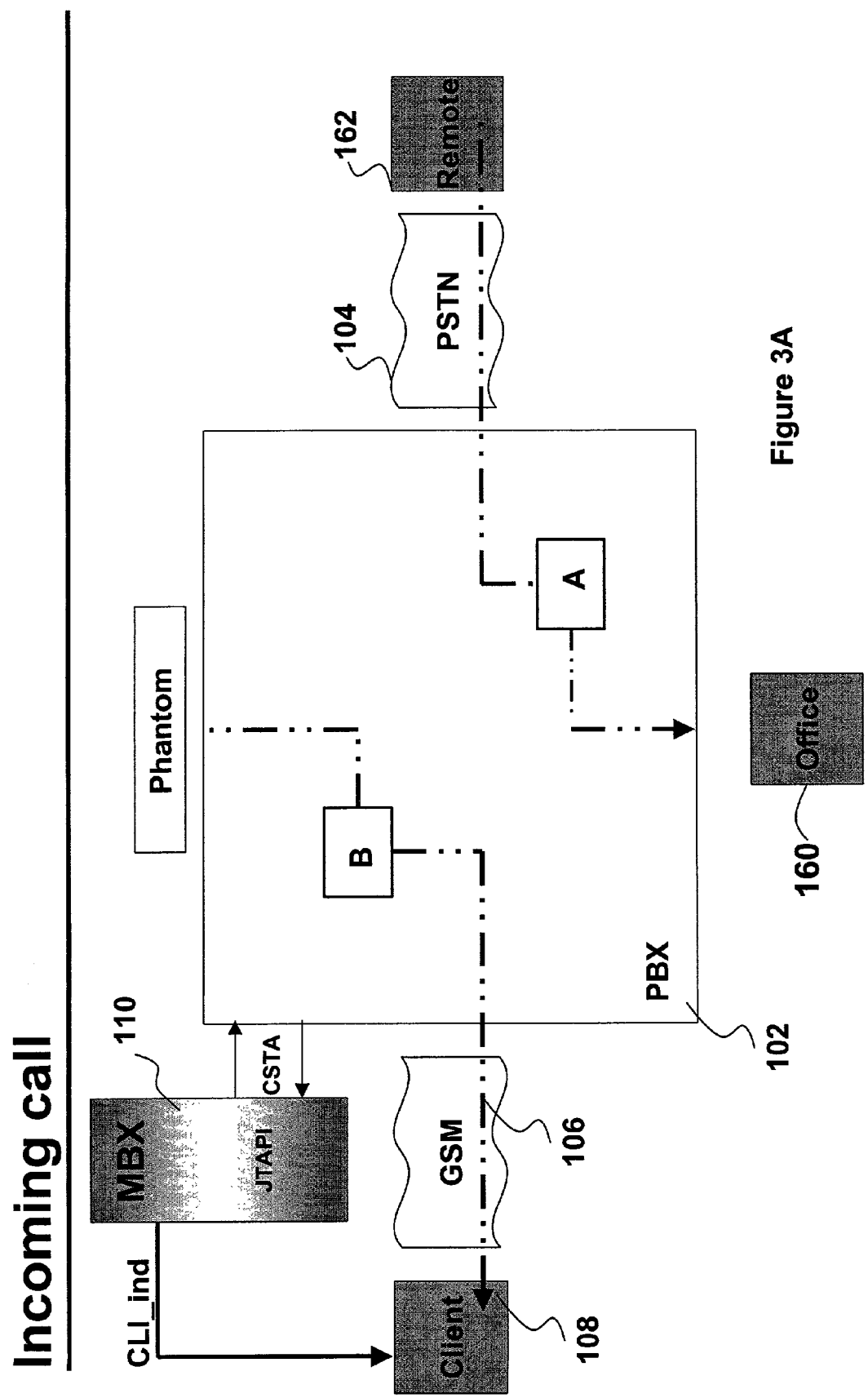

Referring first to FIG. 3A, an incoming call A arrives at PBX 102 and is routed via remote call connection to the office terminal/telephone 160 associated with the telephone number dialed. MBX 110 is notified, via CSTA for example, of call A and, as a result, initiates two processes. The first process comprises setting up phantom call B between a virtual terminal associated with a phantom number within PBX 102 (or alternatively a real terminal if PBX does not support virtual terminals) and mobile telephone 108 via a conventional GSM network 106. The second process is the establishment of a data path between the MBX 110 and mobile telephone 108. In this case, calling line identity CLI_ind information is sent via this data channel in parallel to the voice channel that is being established whereby the mobile telephone user can be apprised of who the caller is. Such information can be more than just caller ID, and could include a name of the caller, such as is common in advanced PBX systems. Additional information about the caller can also be displayed to the mobile telephone user as will be described later herein.

Figure 3B:
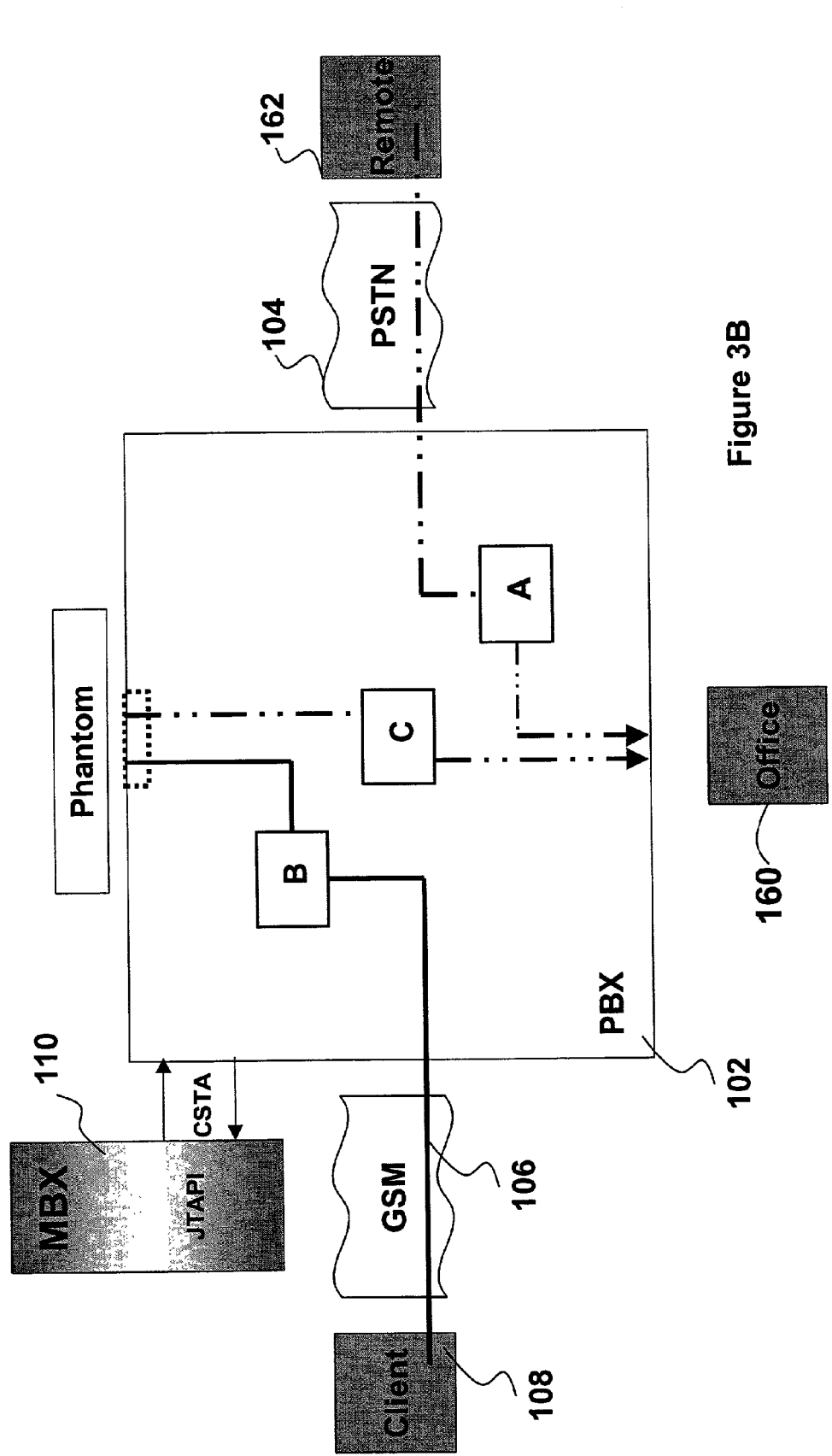

Having received the calling line identity information, the mobile telephone user is now in a better position to decide whether to answer (or forward or conference in) the call. FIG. 3B shows the scenario in which the mobile telephone user decides to answer the call. As shown, call B is fully established. The virtual terminal from which the phantom call originated then holds call B and places a new call C to office telephone 160. Calls B and C are then conferenced together.

Figure 3C:
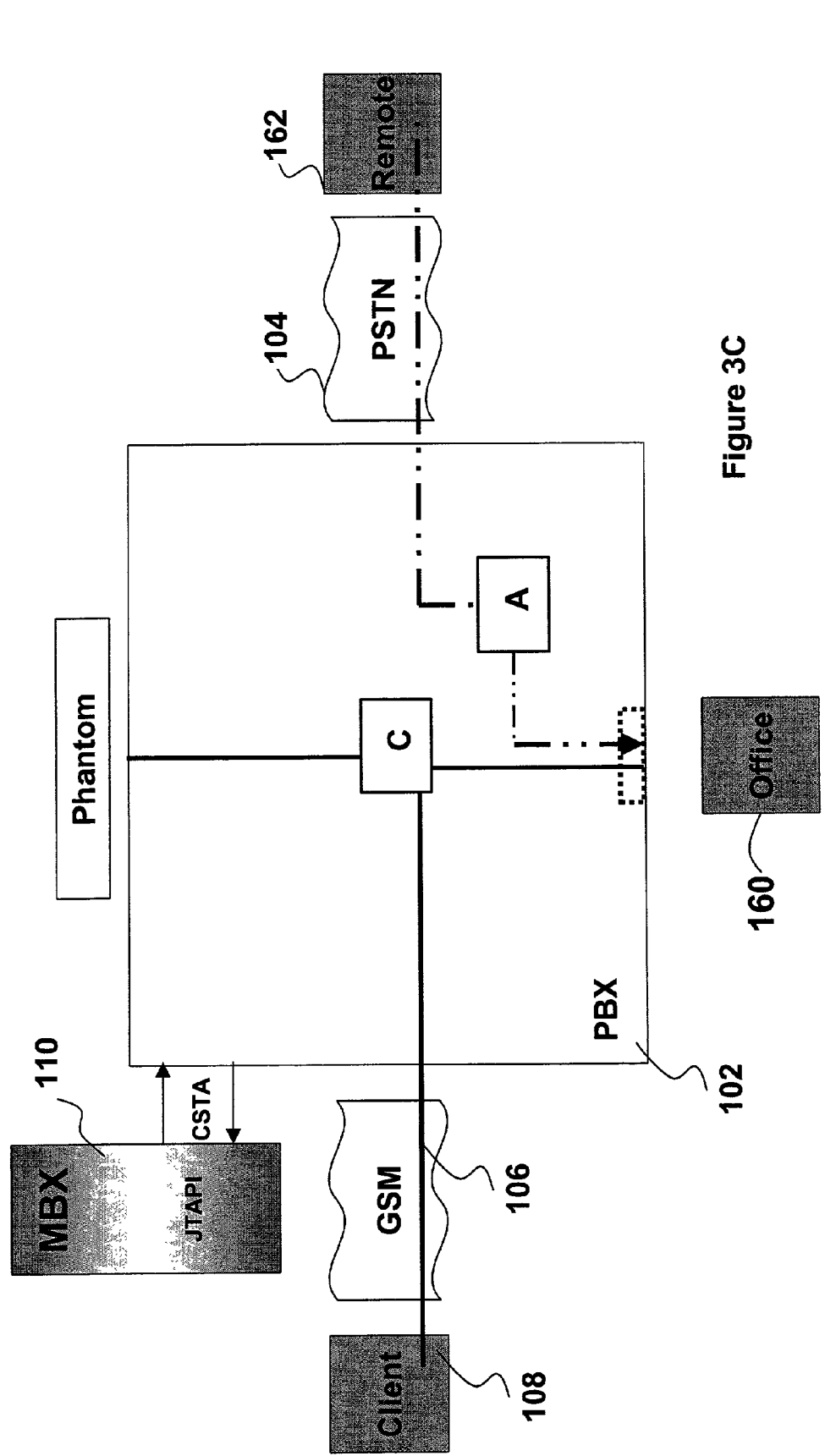
Figure 3D:
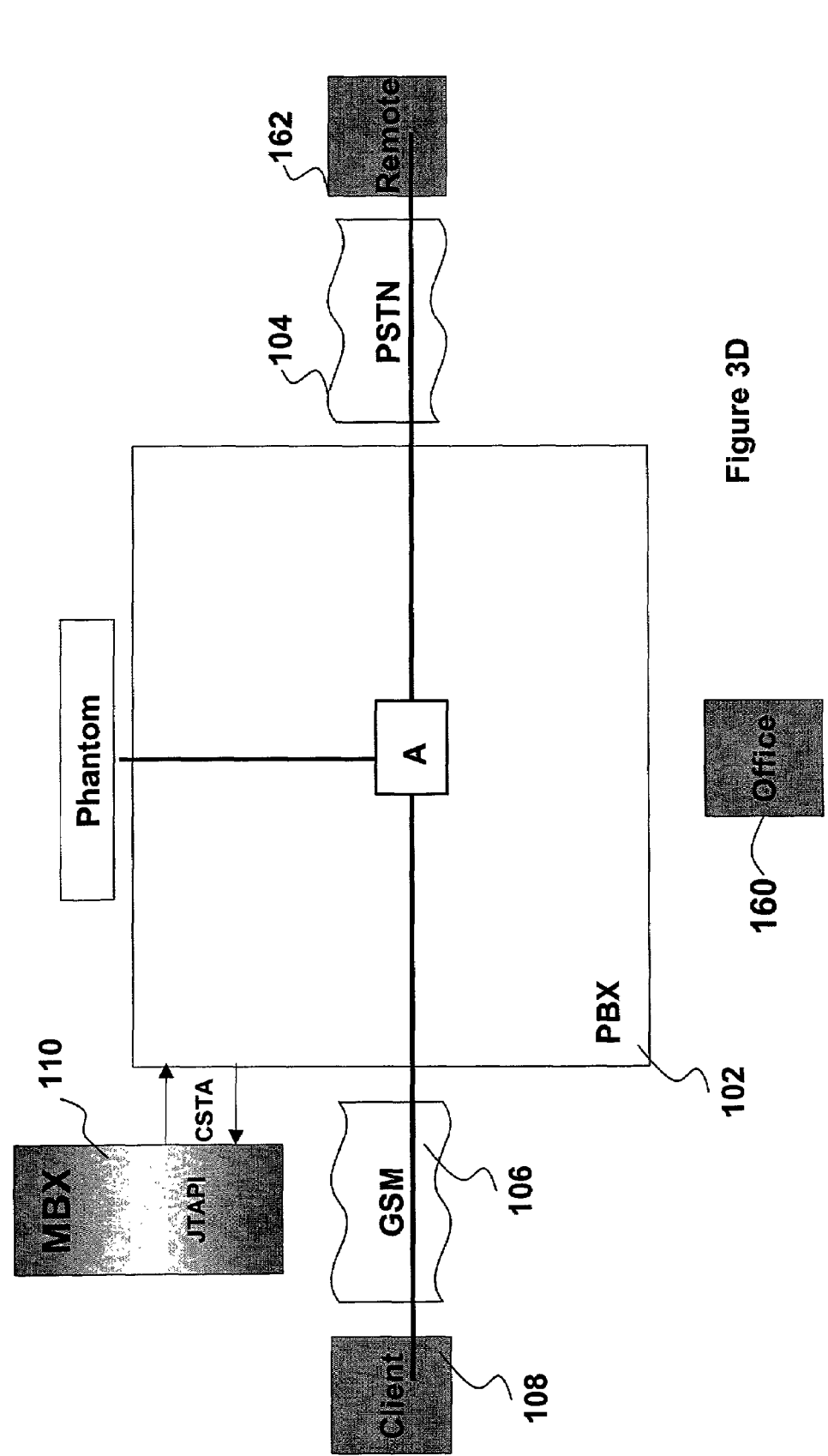

As shown in FIG. 3C, in order to establish connection between calls A and B/C, call C is answered and placed on "hold." Call A is then answered, and call C is transferred, whereby the end effect is to merge call B and call A and remove the office telephone from the call, as shown in FIG. 3D, and to keep the virtual terminal associated with the call in the call for monitoring and control purposes, as necessary. Thus, as can be appreciated, MBX 110 continuously monitors PBX 102 via CSTA or any other interface that is exposed to PBX users, and causes PBX 102 to initiate various functions to automatically connect a remote caller, who dialed an office telephone number, to a mobile user without the remote caller even knowing that the mobile telephone user is not actually answering the call at his/her office. This overall functionality is further enhanced by virtue of the separate data path (employing TIEP) that is set up in conjunction with the GSM voice path to deliver PBX-type functionality to the mobile user whereby, from the mobile user's point of view, he/she receives the same information that is available as if he/she were sitting at his/her office desk.

Figure 3E:
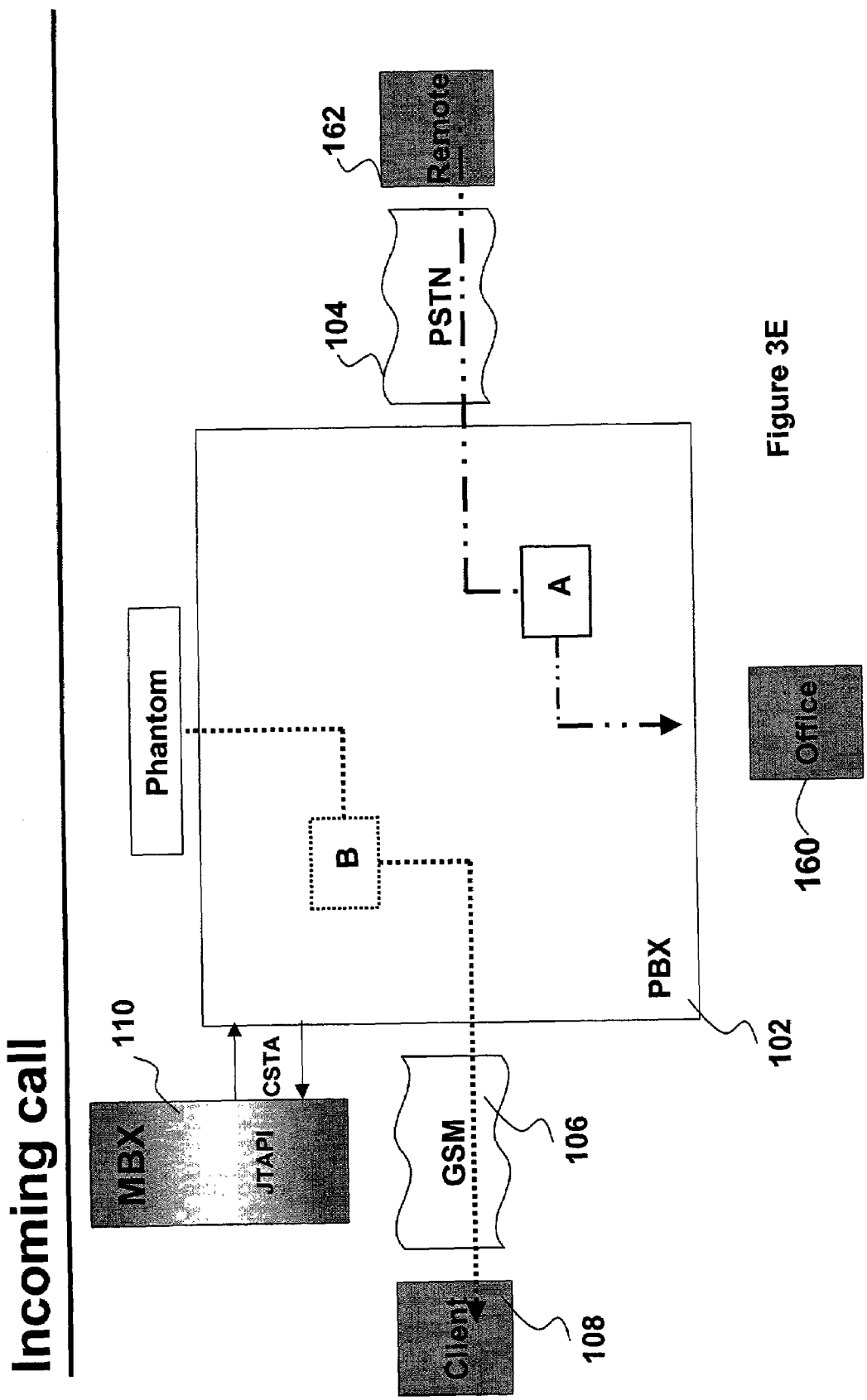

FIG. 3E depicts the scenario in which phantom call B, which is placed from a virtual terminal, is rejected by the mobile telephone user, i.e., the call is not answered. With call A neither being answered by office telephone 160 nor mobile telephone 108, incoming call A will continue until redirected to a voice mail function, as might be conventional when a person is not available to answer their assigned office telephone. Of course, if there is no voice mail, call A would simply ring the office telephone.

(2) Outgoing Indirect Call

Figure 4C:
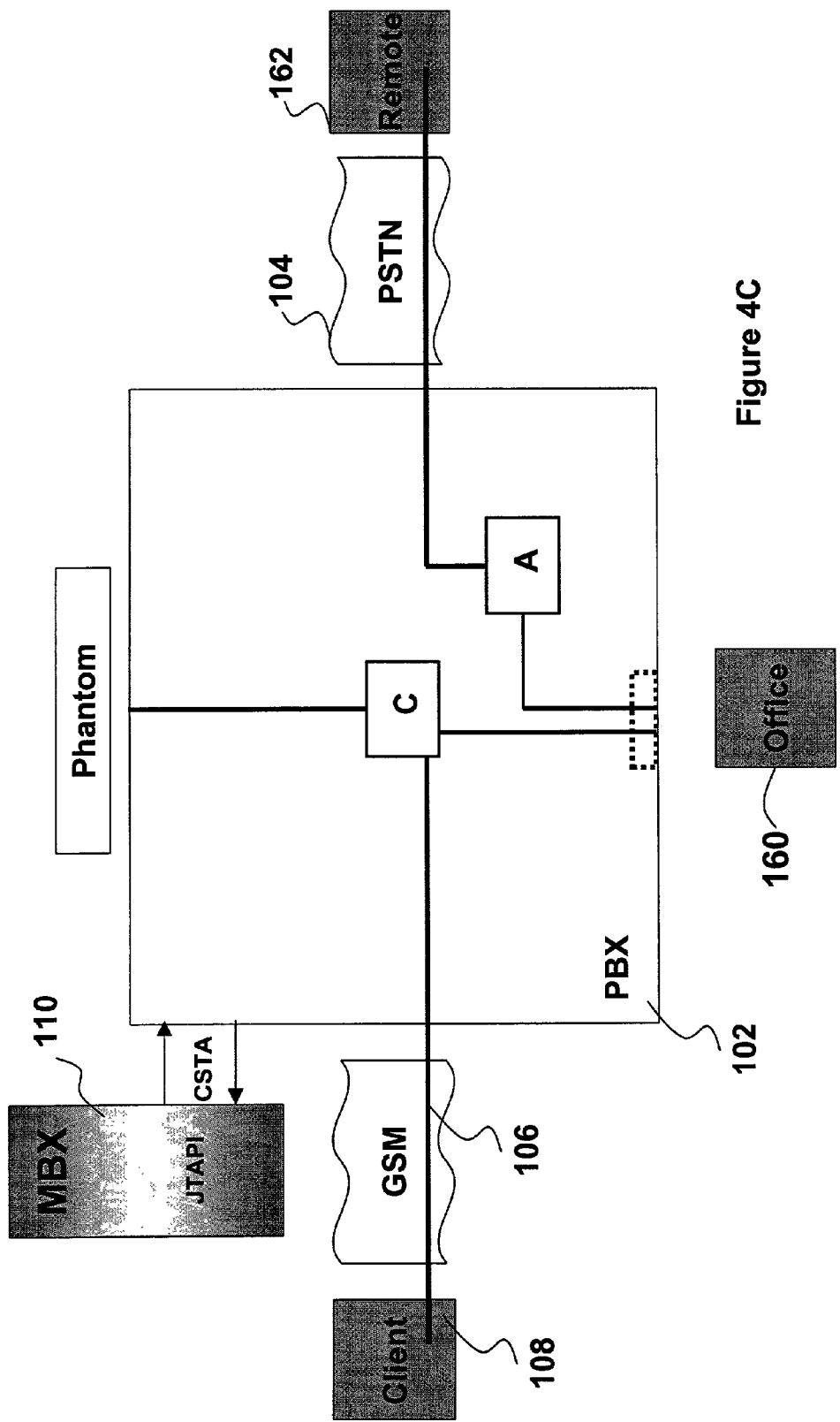

FIGS. 4A–4D illustrate a call initiated by a mobile telephone to a remote telephone 162. This scenario is identified as an outgoing indirect call in that while the call originates with the mobile telephone, from the remote number's perspective, the telephone call is being received from the mobile telephone user's office telephone 160. Referring specifically to FIG. 4A, the client-side portion of the present invention resident on mobile telephone 108 causes a data pathway to be opened between mobile telephone 108 and MBX 110 contemporaneously with a voice channel thereby causing, initially, call B being opened up between the mobile telephone and a virtual terminal on PBX 102. More specifically, the client side application loaded on mobile telephone 108 maps the dialed number into a preconfigured PBX phantom number on which the MBX server listens, while sending the real dialed number as a data message to the MBX, such that from the calling user's perspective the process is fully automated. An IndirectCallRequest command (shown in FIG. 5A) is sent via the data pathway to MBX 110. This command causes MBX 110 to initiate a call, A, that originates from the mobile telephone user's standard office telephone number 160 and is placed to the desired remote telephone number 162. The remote number is preferably transmitted via data path 152 and, in accordance with the present invention, over TIEP.

Figure 4D:
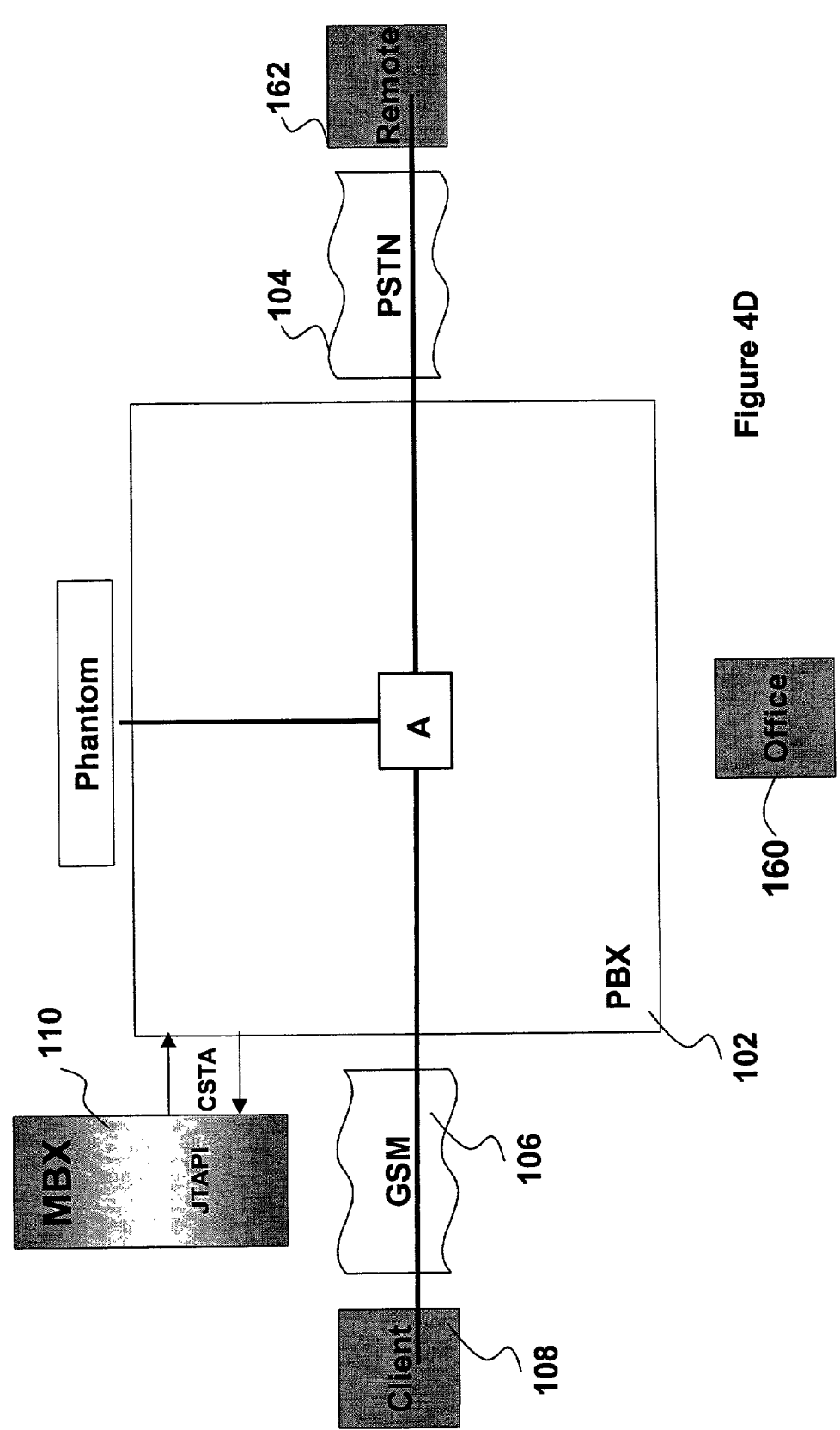

When call A is answered, or established, (keeping in mind that call A could be answered by a person, an answering machine, a fax machine, a modem, etc.), a phantom call C is placed internal to PBX 102 between the virtual terminal and the mobile telephone user's office number 160, which, when manipulated using well-known PBX control commands, has the effect of redirecting call B, the actual call made by mobile telephone 108 to PBX 102, to the office telephone of the mobile telephone user's office number 160, as shown in FIG. 4B. More specifically, call B is answered at the virtual terminal, call B is placed on hold at the virtual terminal, the new call C is placed from the virtual terminal to the office telephone 160, and calls B and C are conferenced. FIG. 4C then shows that call C is answered at office telephone 160. Call C is then placed on hold and then transferred at the office telephone to call A. The result is shown in FIG. 4D wherein a voice communication path that is established between the mobile telephone 108 and a remote number transparently passes through PBX 102. Again, as in the incoming call sequence, the virtual terminal in the PBX, i.e., one of the virtual terminals associated with the phantom number, is maintained in a conference throughout the call via a 'conference' operation. This enables MBX 110 to keep controlling the call even if none of the endpoints are local PBX terminals, and it further enables MBX 110 to reestablish a connection if it is dropped by the mobile network, since the virtual terminal ensures that there are still two parties connected in the call after the drop.

(3) Outgoing Indirect Call to MBX Client

Figure 5B:
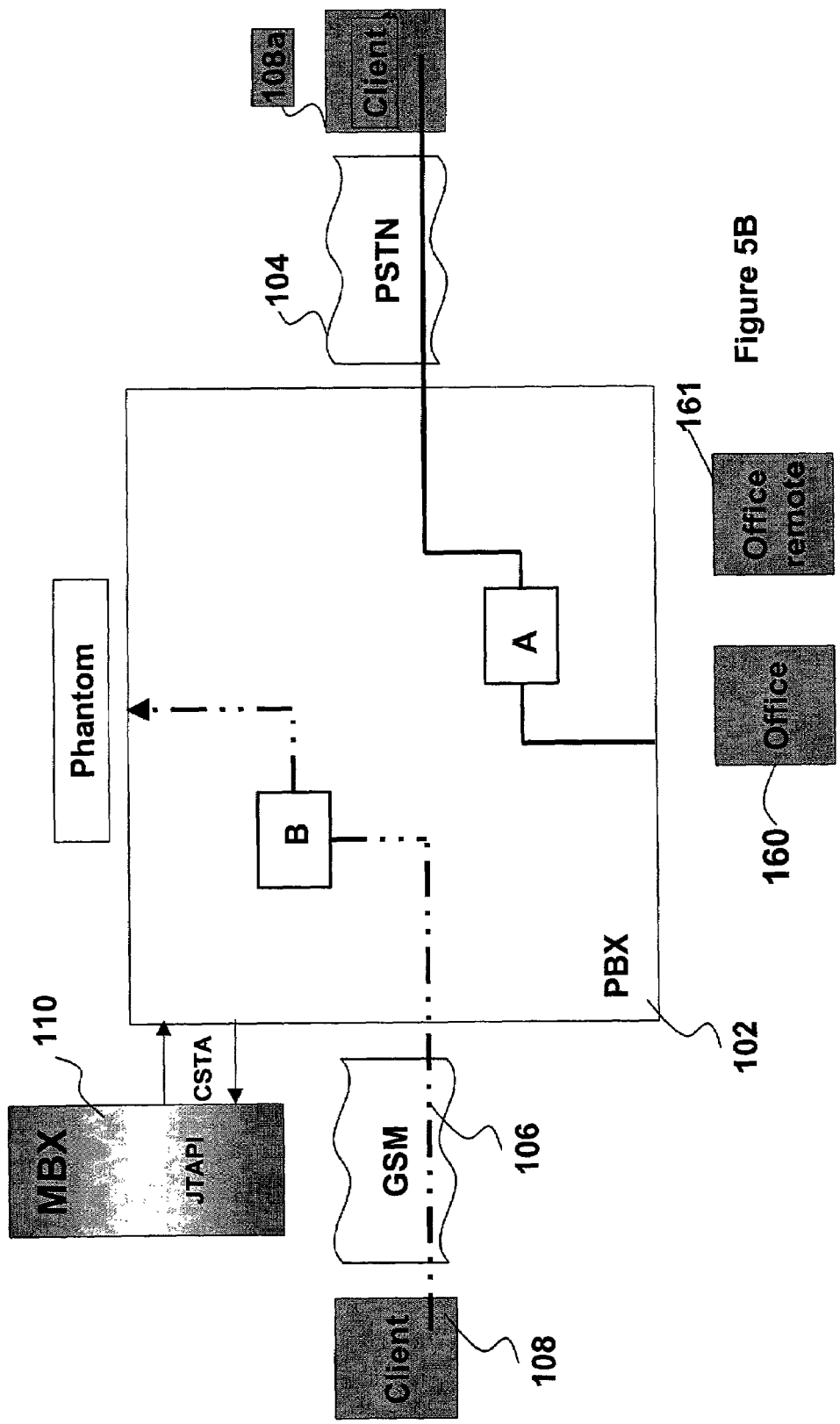
Figure 5C:
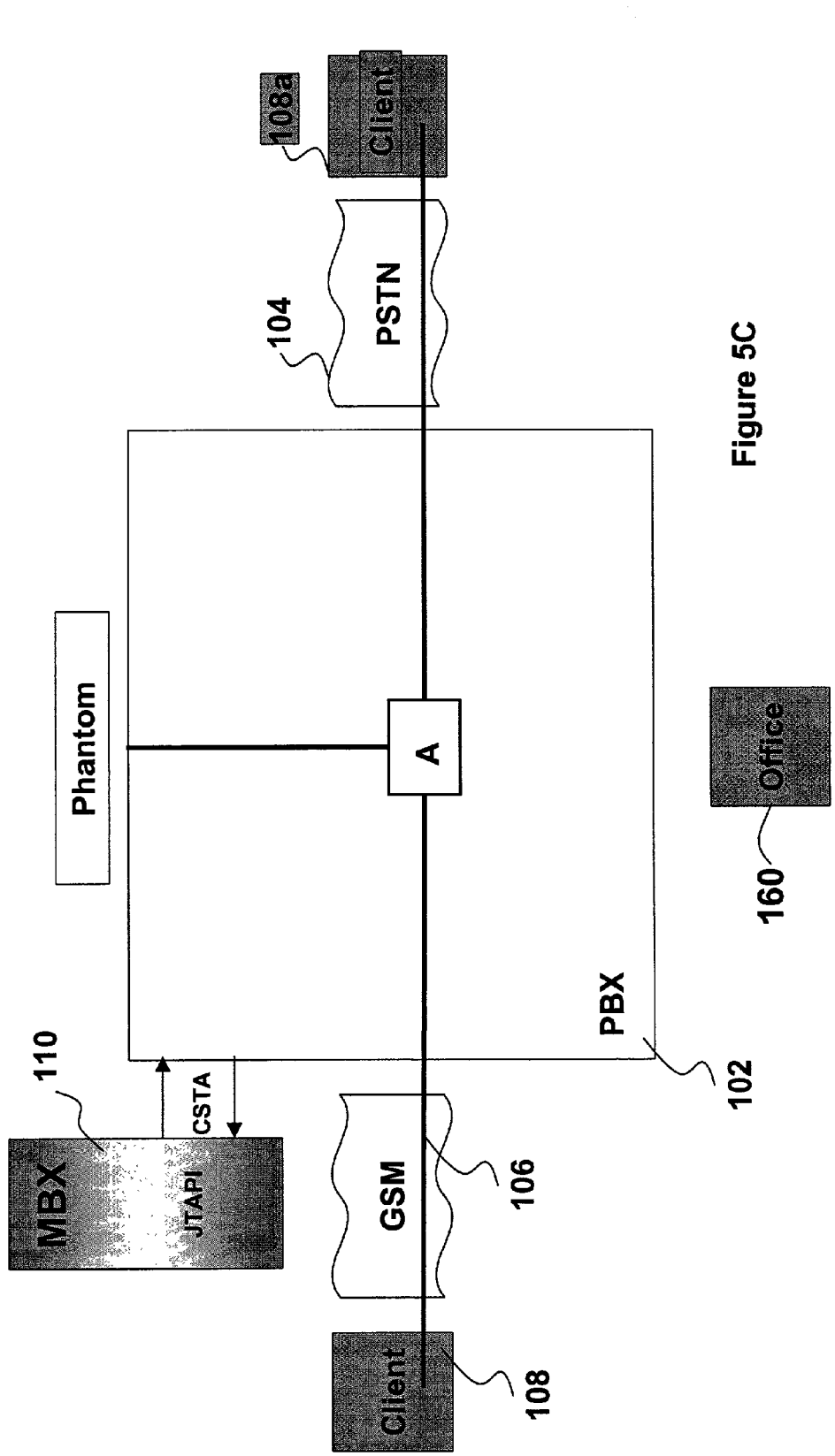

FIGS. 5A–5C illustrate a scenario in which both the caller and callee are parties to an MBX in accordance with the present invention. As shown, beginning first with FIG. 5A, an IndirectCallRequest is sent to MBX 110. Then a call B is placed from mobile telephone 108 to a phantom number at PBX 102, preferably at the same time that the IndirectCallRequest is transmitted via the data pathway, which causes a phantom call C to be placed from a virtual terminal to a remote telephone 108a equipped in accordance with the present invention. At the same time, PBX 102 is commanded to establish or create a call, A, between the conventional office telephones 160, 161 of the caller and callee. Finally, calling line identity information (not shown) with respect to the caller is sent via a second data pathway, in accordance with TIEP, that is established between the MBX and the callee's telephone 108a. In this scenario it is noted that both the remote telephone 108a and office telephone 161 preferably ring simultaneously.

Eventually, the callee answers call C at the remote telephone 108a, as depicted in FIG. 5B, and the procedure of answering an incoming call (FIGS. 3A–3D) is executed such that call A for an instant connects the caller's office telephone with the callee's mobile telephone. The procedure of answering an outgoing call (FIGS. 4B–4D) is then executed, thereby completing the connection between the two mobile telephones 108, 108a via PBX 102, as shown in FIG. 5C.

(4) Outgoing Conference

Figure 6A:
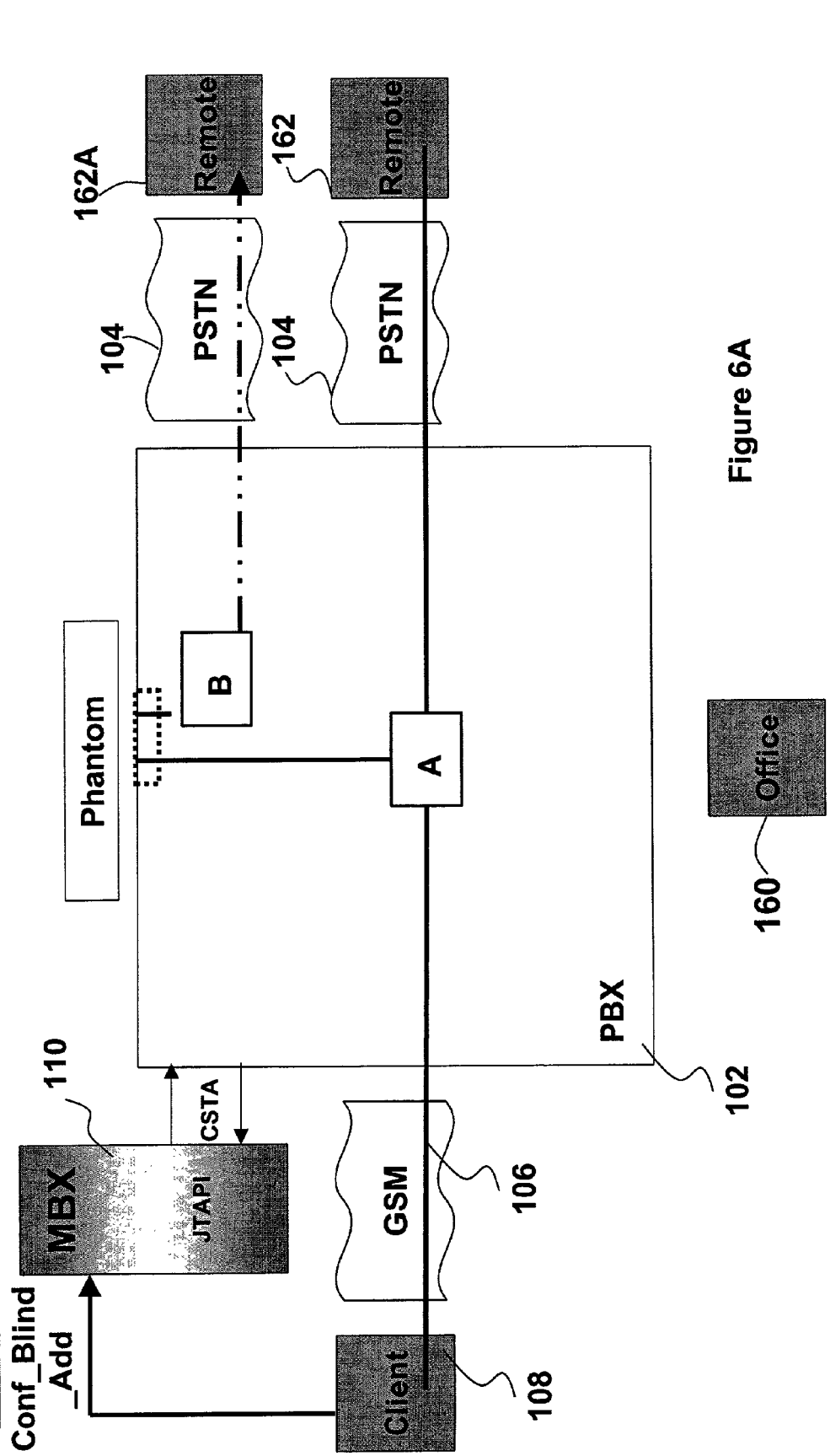
Figure 6B:
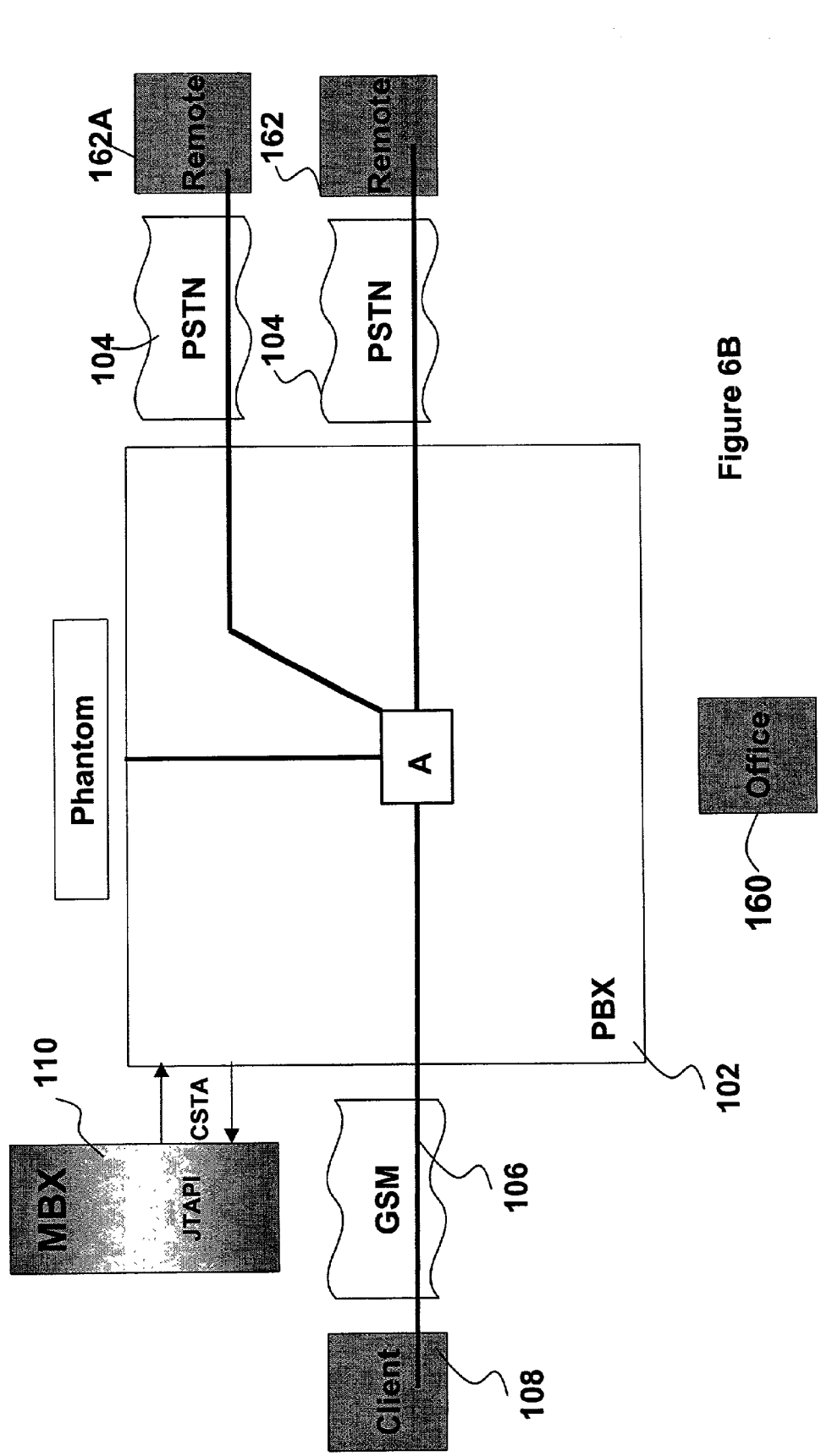

This next sequence, illustrated by FIGS. 6A–6B, depicts how a third party can be conferenced in to an on-going conversation between a mobile telephone 108 and a remote number 162. In this case, as shown in FIG. 6A, a call A is established between mobile telephone 108 and a remote number 162. As with a typical call, a virtual terminal is also conferenced in to keep track of call A and to be available to reestablish the voice channel with mobile telephone 108 should mobile telephone 108 drop the call. In this case, in order to conference in a second remote telephone 162a, a "conference blind add" TIEP request is sent via the data channel to MBX 110. This causes MBX 110 to instruct PBX 102 to place the virtual terminal on hold and to place a new call B to a second remote telephone number, namely 162a. Call B, is then immediately conferenced with call A, as shown in FIG. 6B. As a result, mobile telephone 108 is in communication with both remote telephones 162 and 162a.

(5) Incoming Conference

Figure 7A:
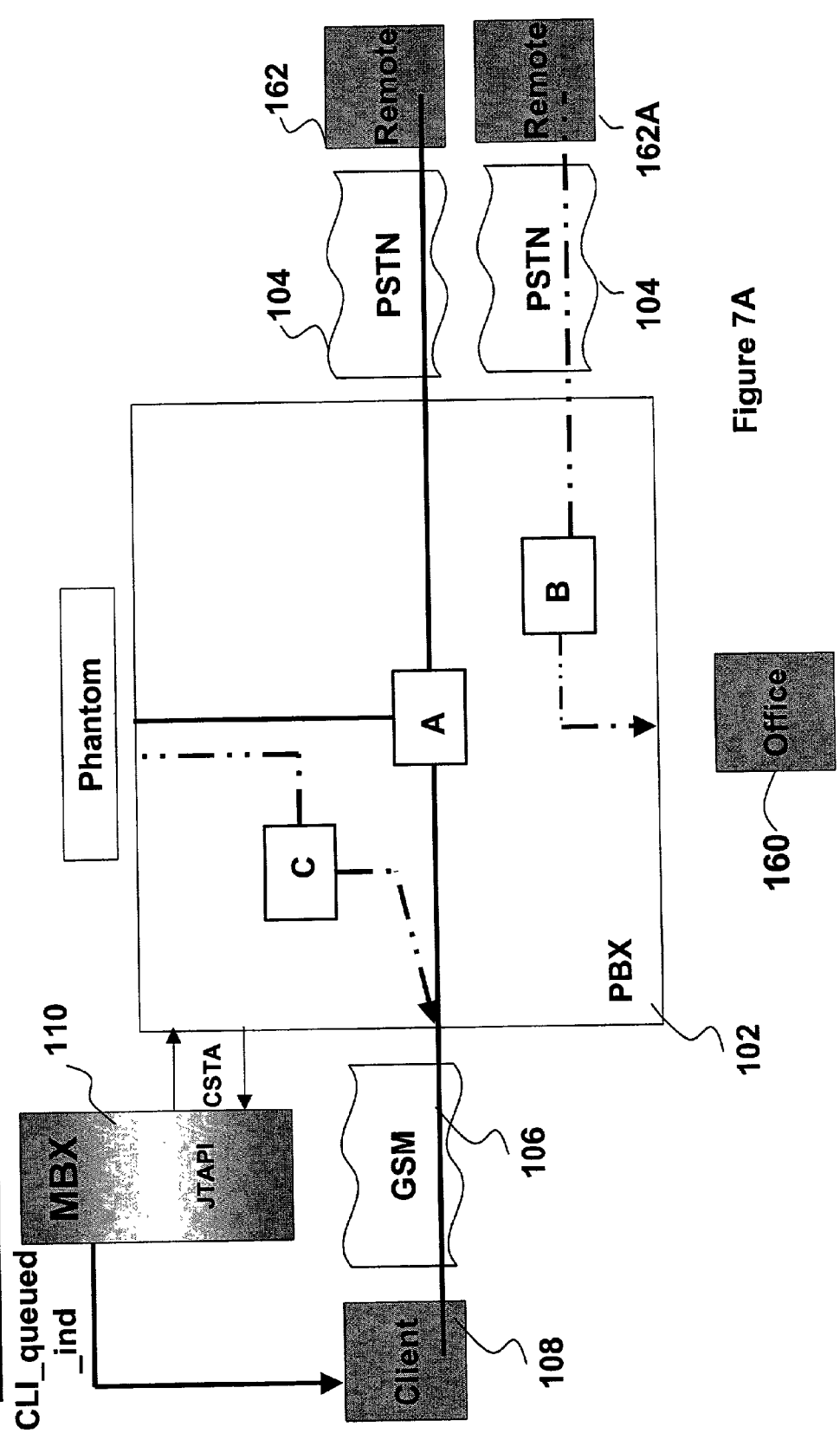
Figure 7B:
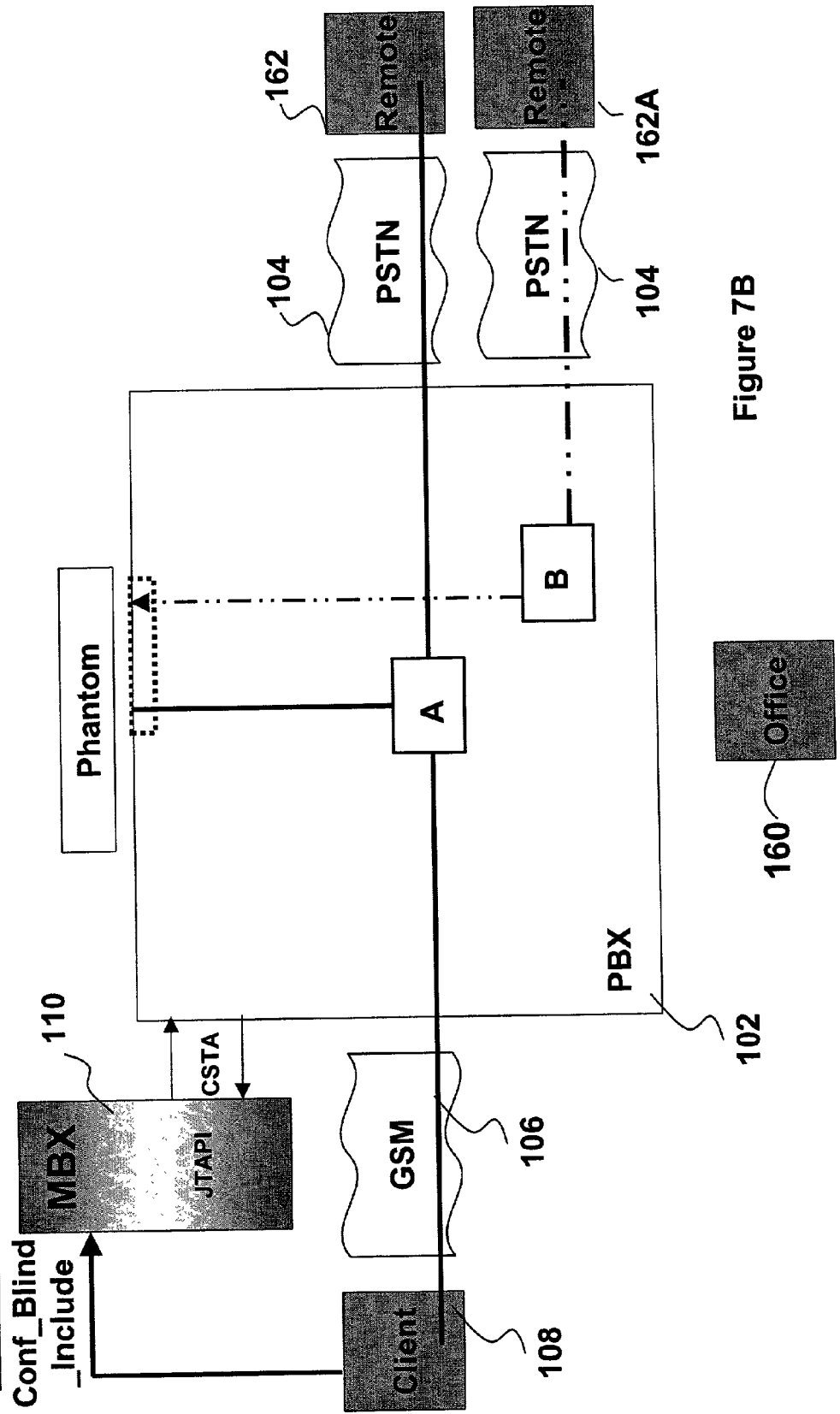

FIGS. 7A–7B illustrate how an incoming call can be conferenced in with a pre-established call between a mobile telephone 108 and one or more remote telephones. As shown in FIG. 7A, call A is an existing call between mobile telephone 108 and a first remote telephone 162. A call B is placed from a second remote telephone 162a to office telephone number 160. As a result, a call C is established between the virtual terminal and mobile telephone 108 in parallel with a TIEP package for calling line identity. From the perspective of the user of mobile telephone 108, the new incoming call is presented as a call-waiting or queued call.

Figure 7C:
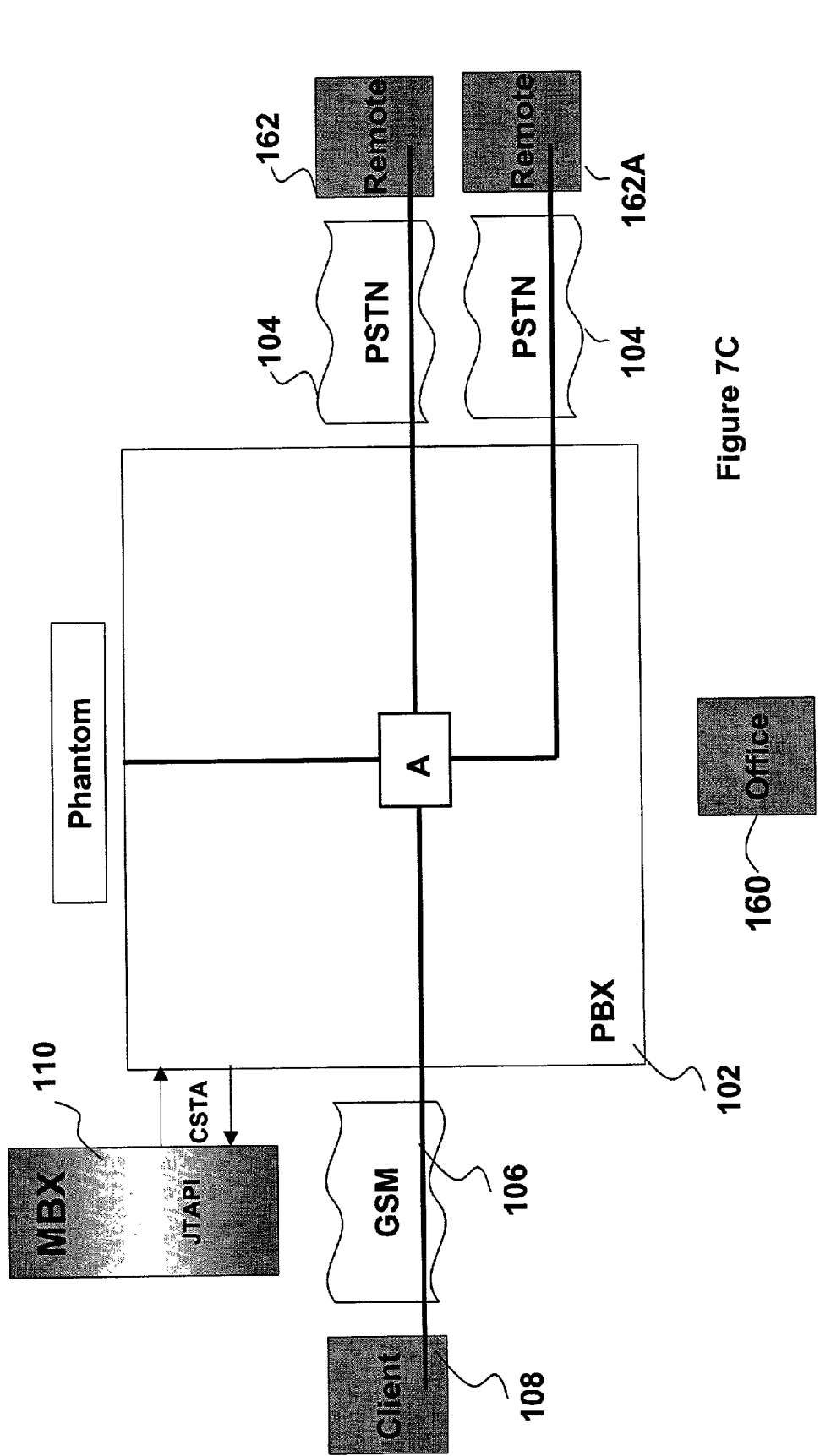

Assuming the user of mobile telephone 108 desires to include the caller from remote telephone 162a in the ongoing conversation, the user inputs (as will be described in more detail later herein) into mobile telephone 108 an indication that the second caller should be included. As a result, the client side application loaded on mobile telephone 108 sends a "conference blind include" request via TIEP back to MBX 110 via the data channel. As a result, call C is dropped and call B is redirected to the phantom number, answered at a virtual terminal, placed on hold, and conferenced with call A at the virtual terminal. This sequence is depicted in FIG. 7B. The result within PBX 102 is shown in FIG. 7C.

Figure 7D:
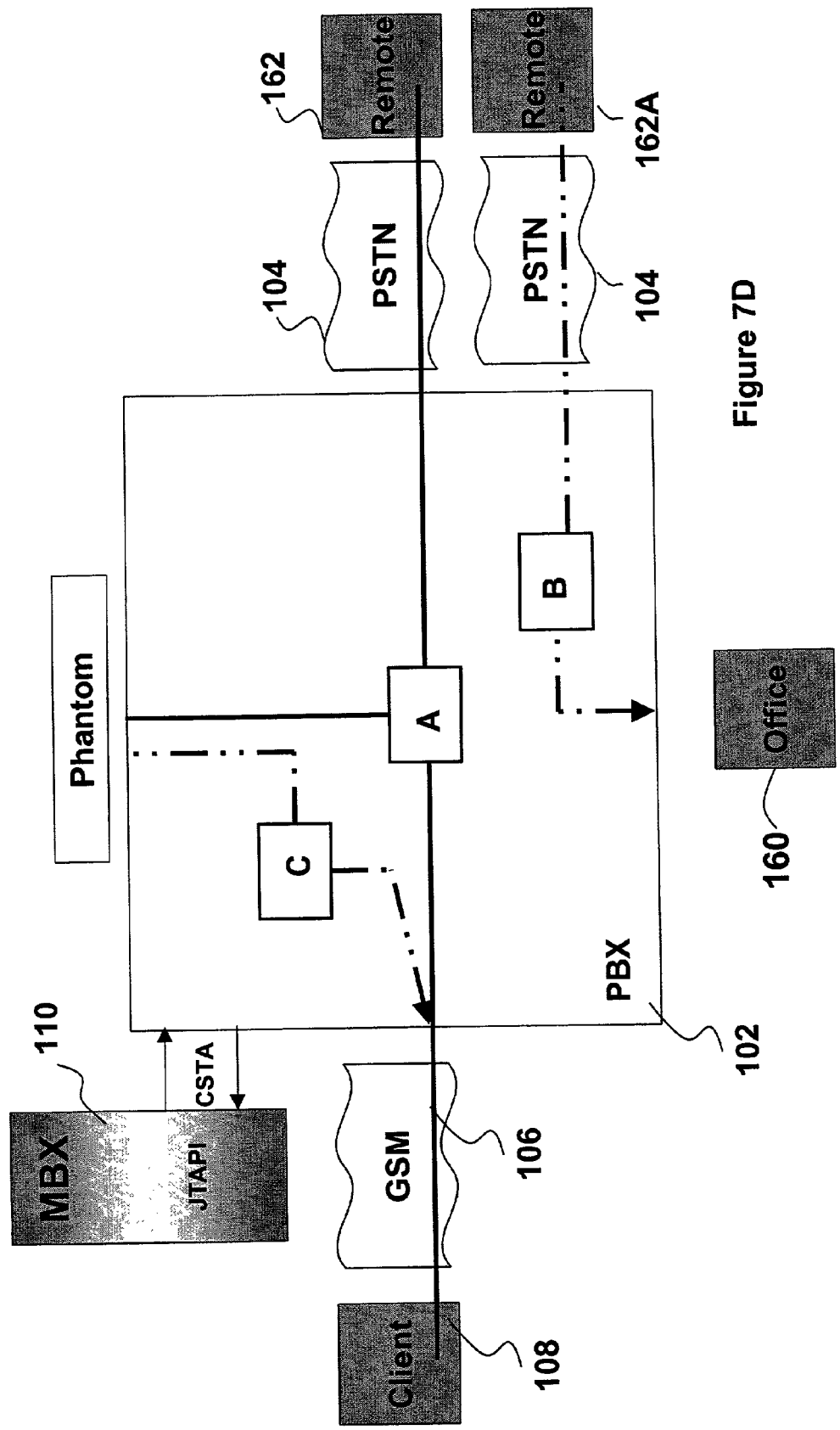

FIGS. 7D and 7E illustrate the case where the new incoming call from remote number 162a is rejected by the user of mobile telephone 108. Specifically, as shown in FIG. 7D, call A is an existing call and calls B and C represent the sequence that occurs for a new incoming call. Call C, again, is preferably presented as a call waiting call to the user of mobile telephone 108. Referring now to FIG. 7E, if the user of mobile telephone 108 fails to answer call C, call C will be dropped. This will result in call B ringing at office telephone 160 until it is diverted to voice-mail, as might be the case in a typical office environment.

(6) Conference—Lost Participant

FIG. 8 shows a sequence in which one of the conference participants, namely remote telephone number 162a, drops out of the conference call. In this case, MBX 110 is alerted to this fact and in response, sends a "conference party lost" signal via TIEP to mobile telephone 108 via the data channel. As will become apparent in the description of the Graphical User Interface for the mobile telephone of the present invention described later herein, the loss of a participant from a conference call preferably results in a visual cue to the user of mobile telephone 108.

(7) Conference—Drop Participant

Figure 9:
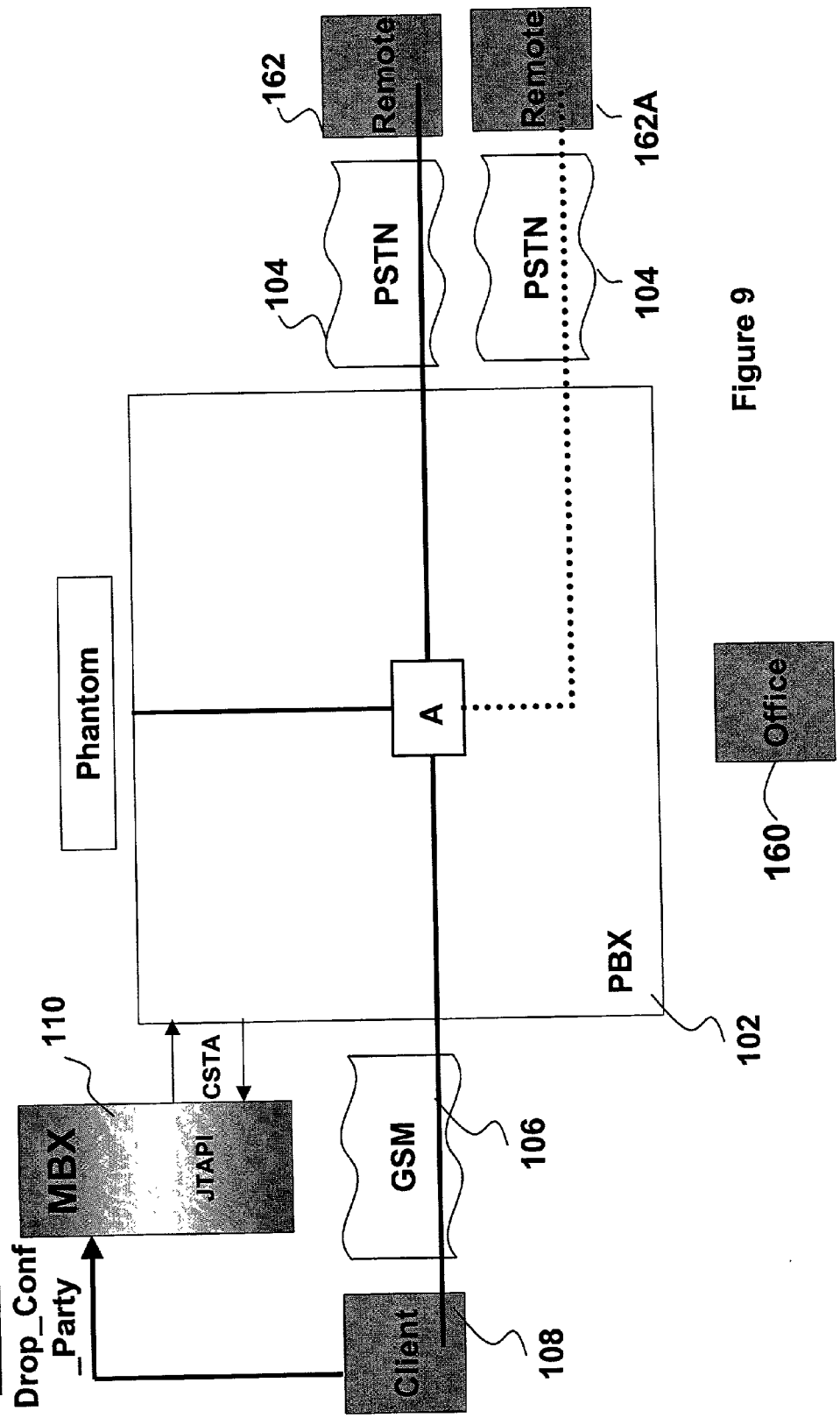

FIG. 9 illustrates the case of a conference call in which the user of mobile telephone 108 desires to expressly drop a participant from the conference call rather than the participant himself initiating the drop from the conference call. In this case, a "drop conference party" signal is sent in accordance with TIEP from mobile telephone 108 to MBX 110 via the data channel. MBX 110, in turn, causes PBX 102 to drop the participant indicated by the user of mobile telephone 108. In this case, remote telephone number 162a is dropped.

(8) Forward Call

Figure 10A:
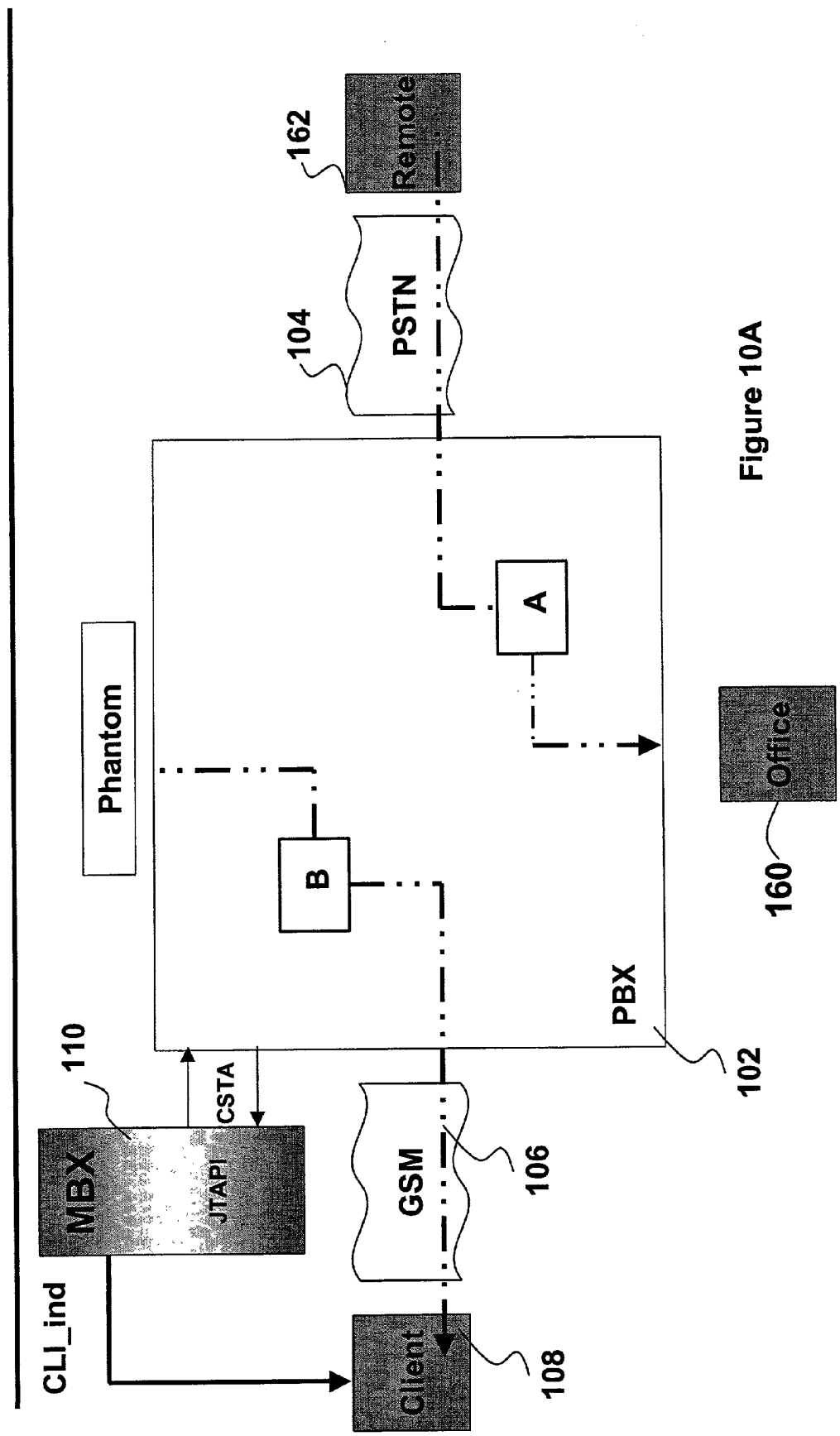
Figure 10B:
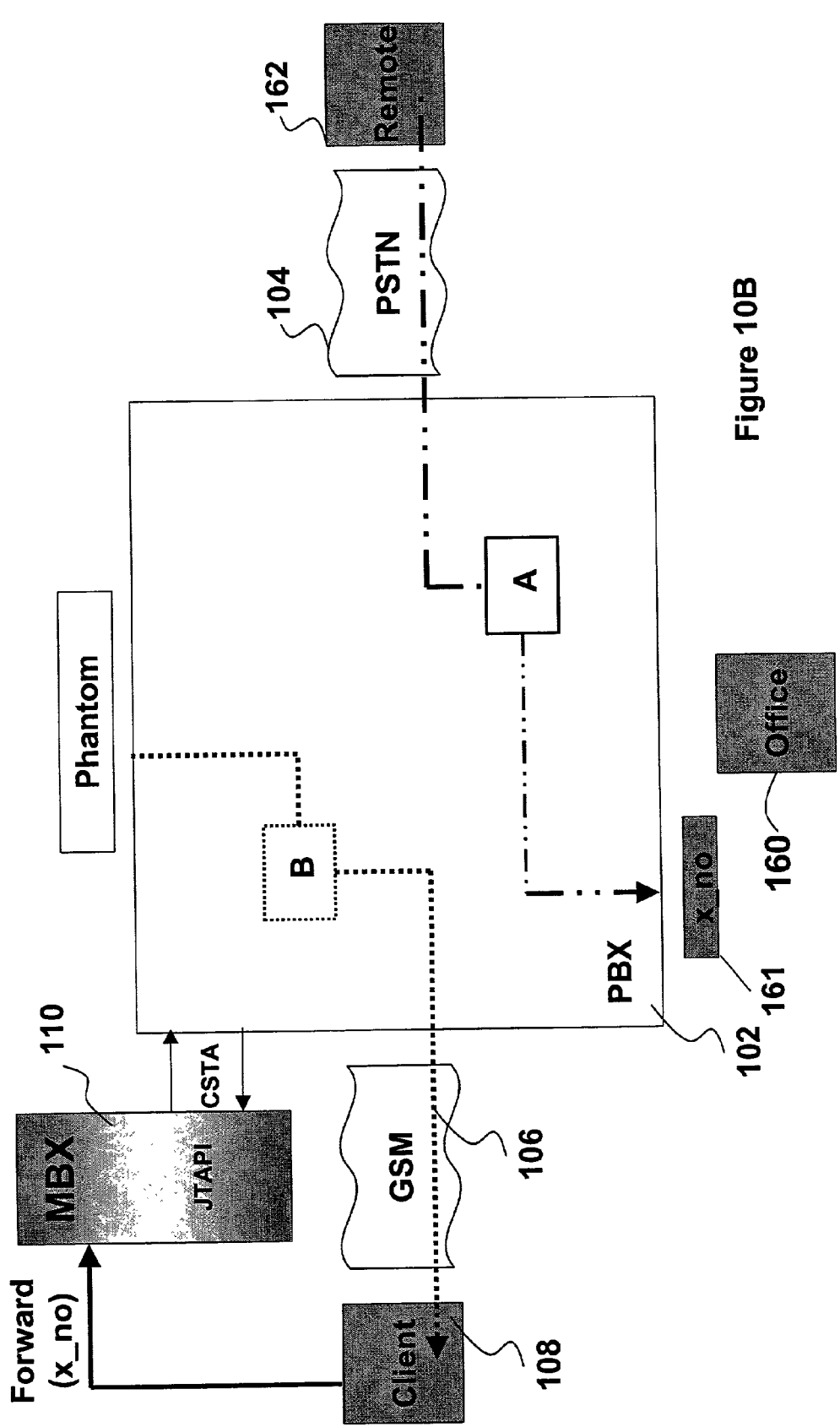

FIGS. 10A and 10B illustrate how an incoming call can be forwarded by mobile telephone 108. As shown, a call A is placed by remote telephone number 162 to office telephone number 160. As is the case for any incoming call, a phantom call B is placed between a virtual terminal within PBX 102 and mobile telephone 108. In parallel with this, calling line identity information is sent from MBX 110 to mobile telephone 108 via TIEP over the data channel. Then, as shown in FIG. 10B, assuming the user of mobile telephone 108 wants to forward the call to another number, the user enters or indicates such a desire via, e.g., a graphical user interface (described below), and the client side application loaded on mobile telephone 108 generates a "forward (x_no)" TIEP command that is sent via the data channel back to MBX 110. Then, as a result of receiving such a command, MBX 110 causes PBX 102 to drop call B between the virtual terminal and mobile telephone 108 and to forward call A to the destination x_no that was passed from mobile telephone 108 to MBX 110.

(9) Transfer Call

Figure 11B:
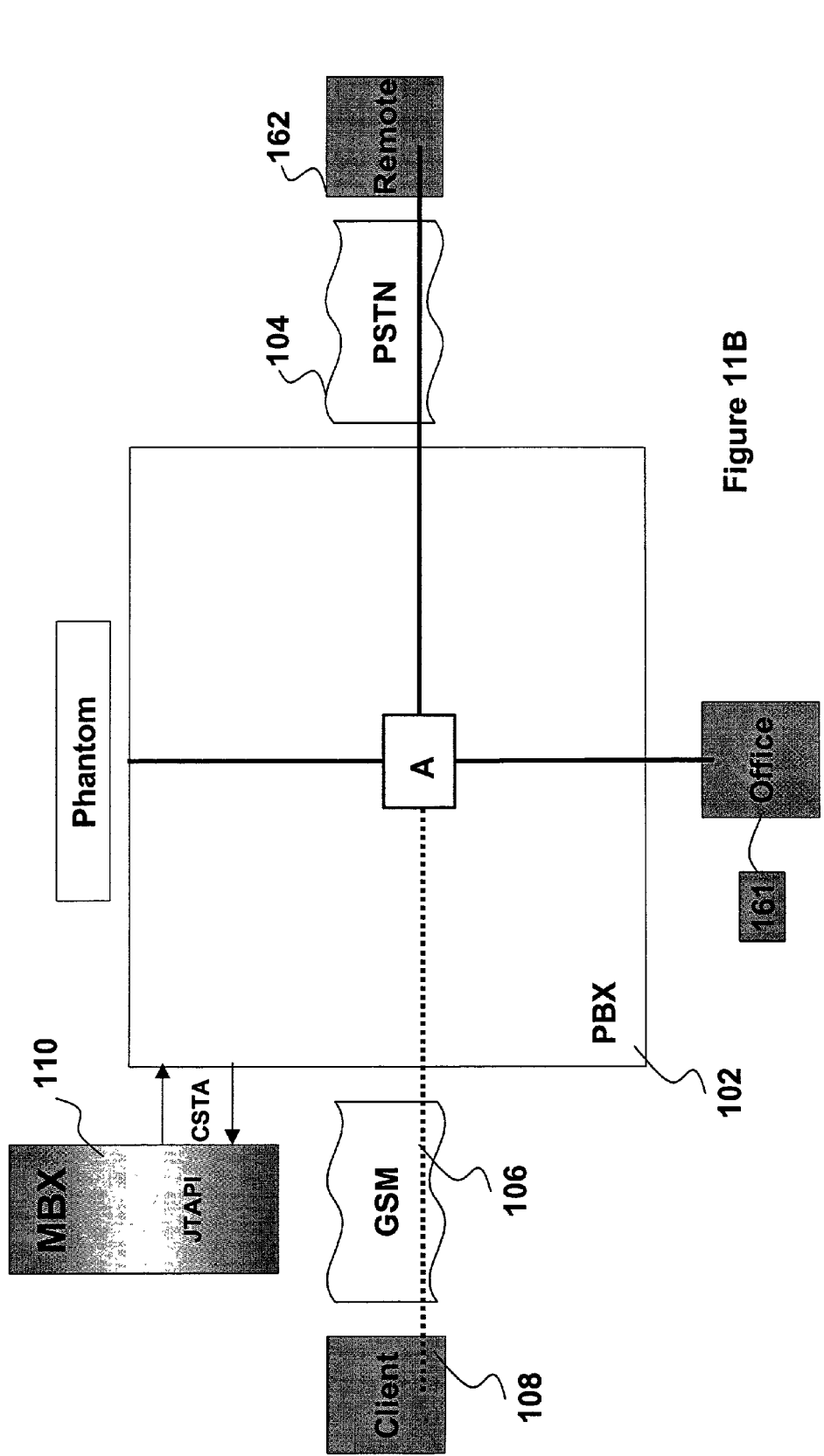

FIGS. 11A and 11B illustrate how a call is transferred in accordance with the present invention. In this sequence, referring first to FIG. 11A, a call A is pre-established between mobile telephone 108, remote number 162 and, in accordance with the preferred embodiment of the present invention, the virtual terminal within PBX 102. To transfer this call, a "conference blind add (o_no)" command is sent from mobile telephone 108 to MBX 110. This command causes MBX 110 to conference-in office telephone 161 corresponding to the o_no number that was passed to MBX 110 via the data channel. Once the conferencing is complete, MBX 110 causes PBX 102 to drop the mobile portion of call A, as shown in FIG. 11B, thereby leaving only the remote telephone number 162 and the office telephone number 161 (along with the virtual terminal) in communication with each other, thereby effecting the call transfer function.

(10) Listen In—Forward

Figure 12A:
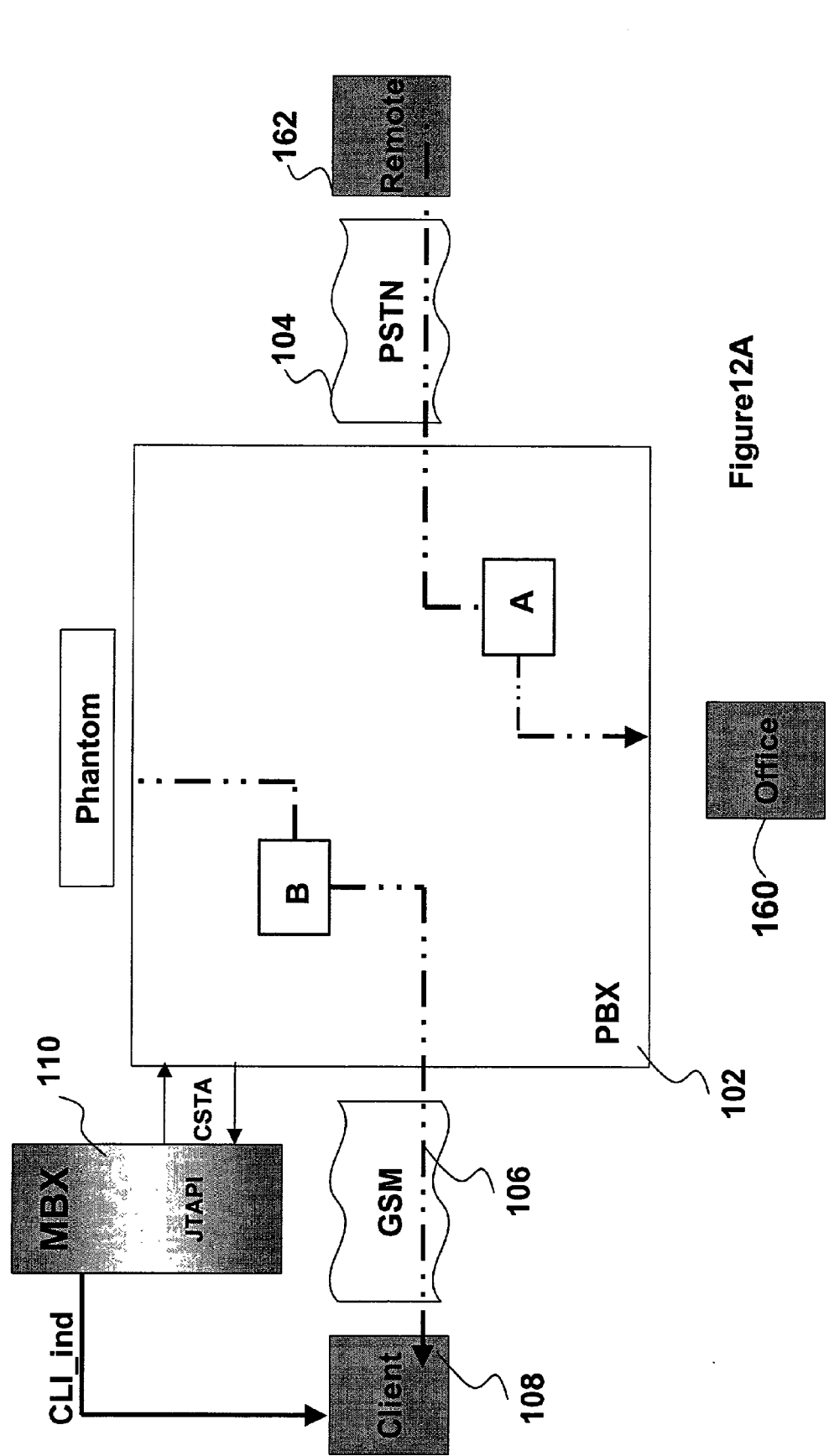
Figure 12B:
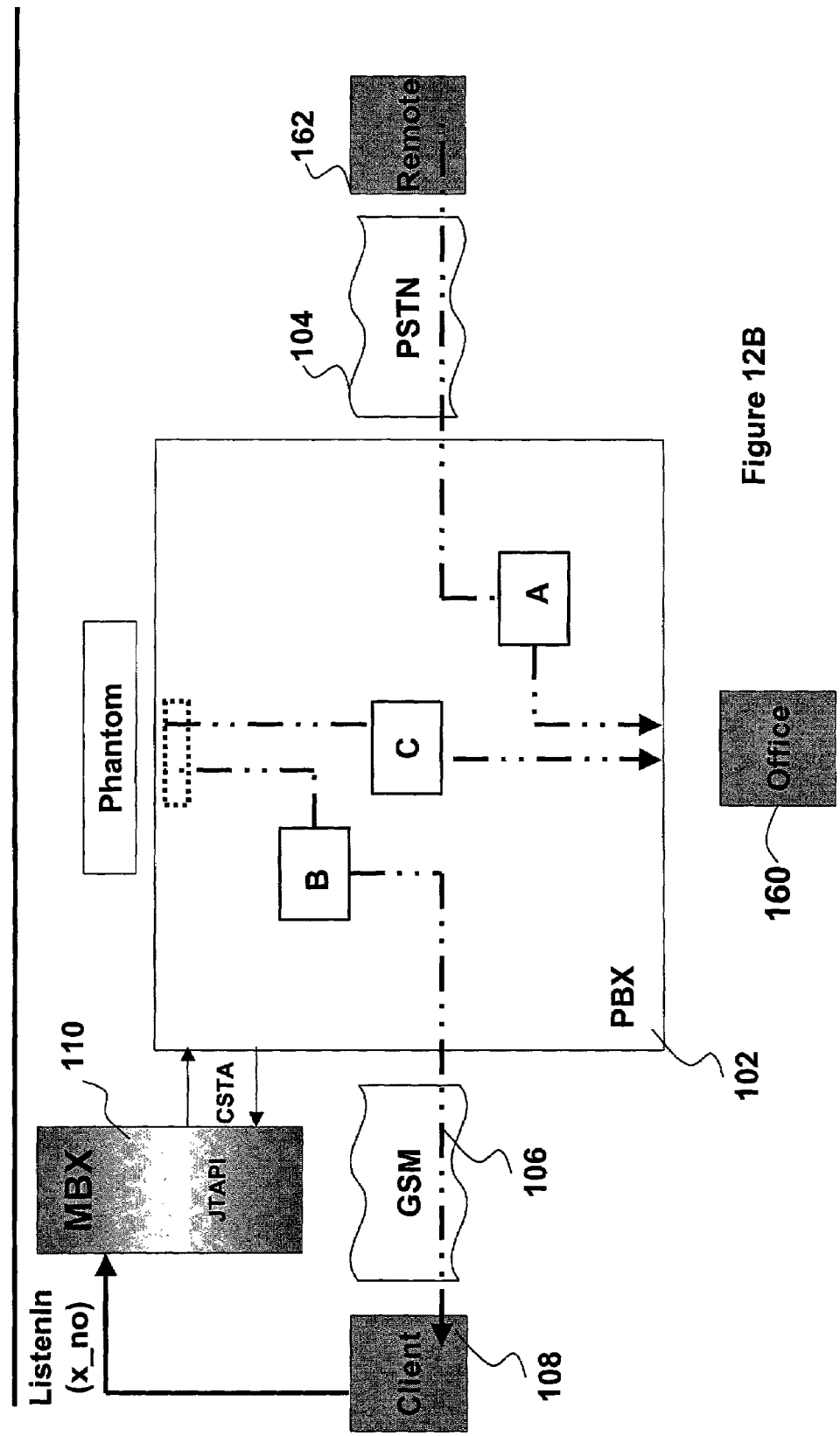

FIGS. 12A–12E illustrate how an incoming call can be listened to and then forwarded as desired, all from mobile telephone 108. Referring first to FIG. 12A, a remote telephone number places a call A to office telephone number 160. As is the case with all incoming calls, a call B is established between a virtual terminal within PBX 102 and mobile telephone 108 and, in parallel, calling line identity information in accordance with TIEP is sent to mobile telephone 108 via the data channel. Assuming the user of mobile telephone 108 desires only to listen-in to the incoming call, rather than answering it, the client side application on mobile telephone 108 sends a ListenIn(x_no) command to MBX 110 via the data channel. This causes a call C to be placed between virtual terminal and office telephone 160 and further causes calls B and C to be conferenced together, as shown in FIG. 12B.

Figure 12C:
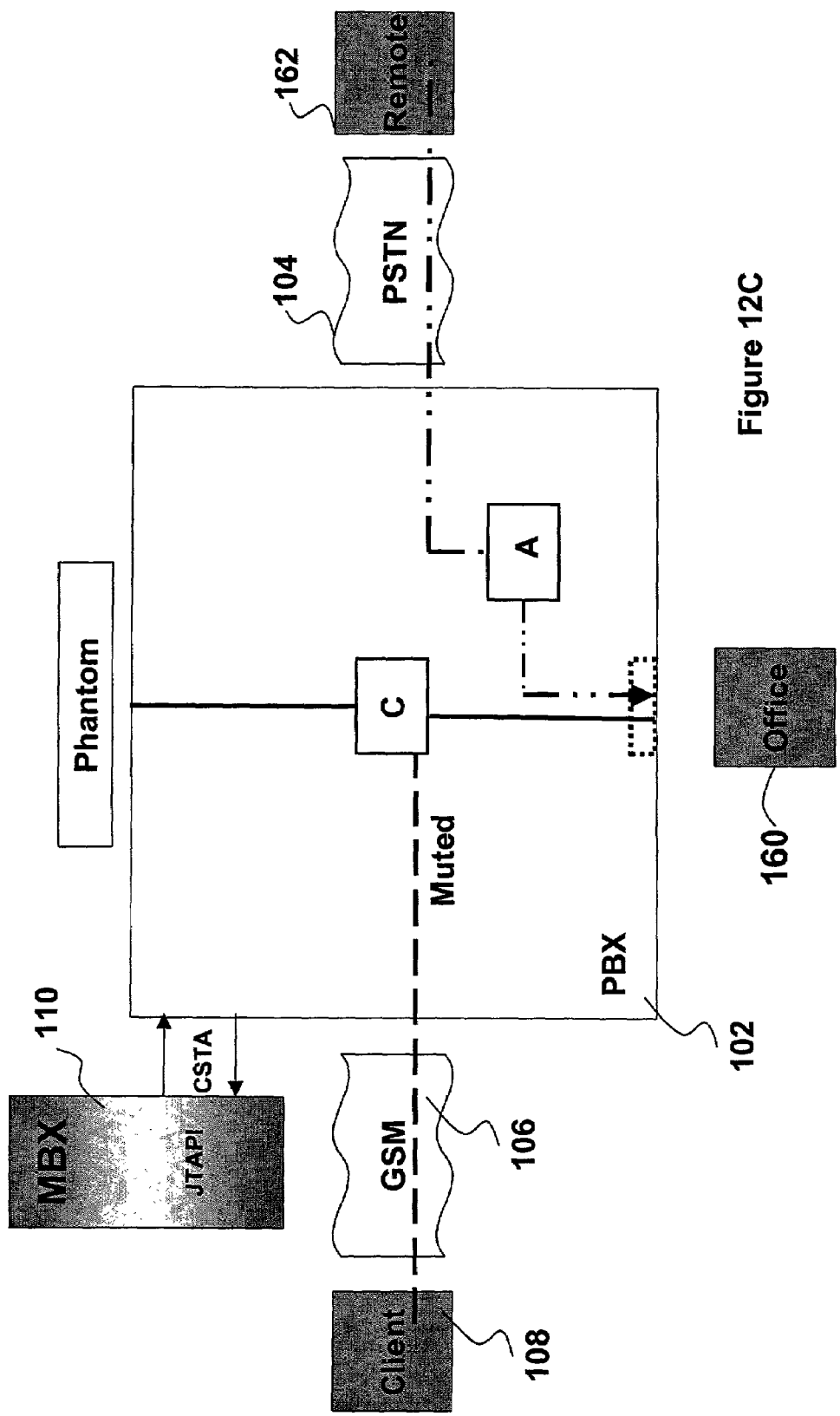
Figure 12D:
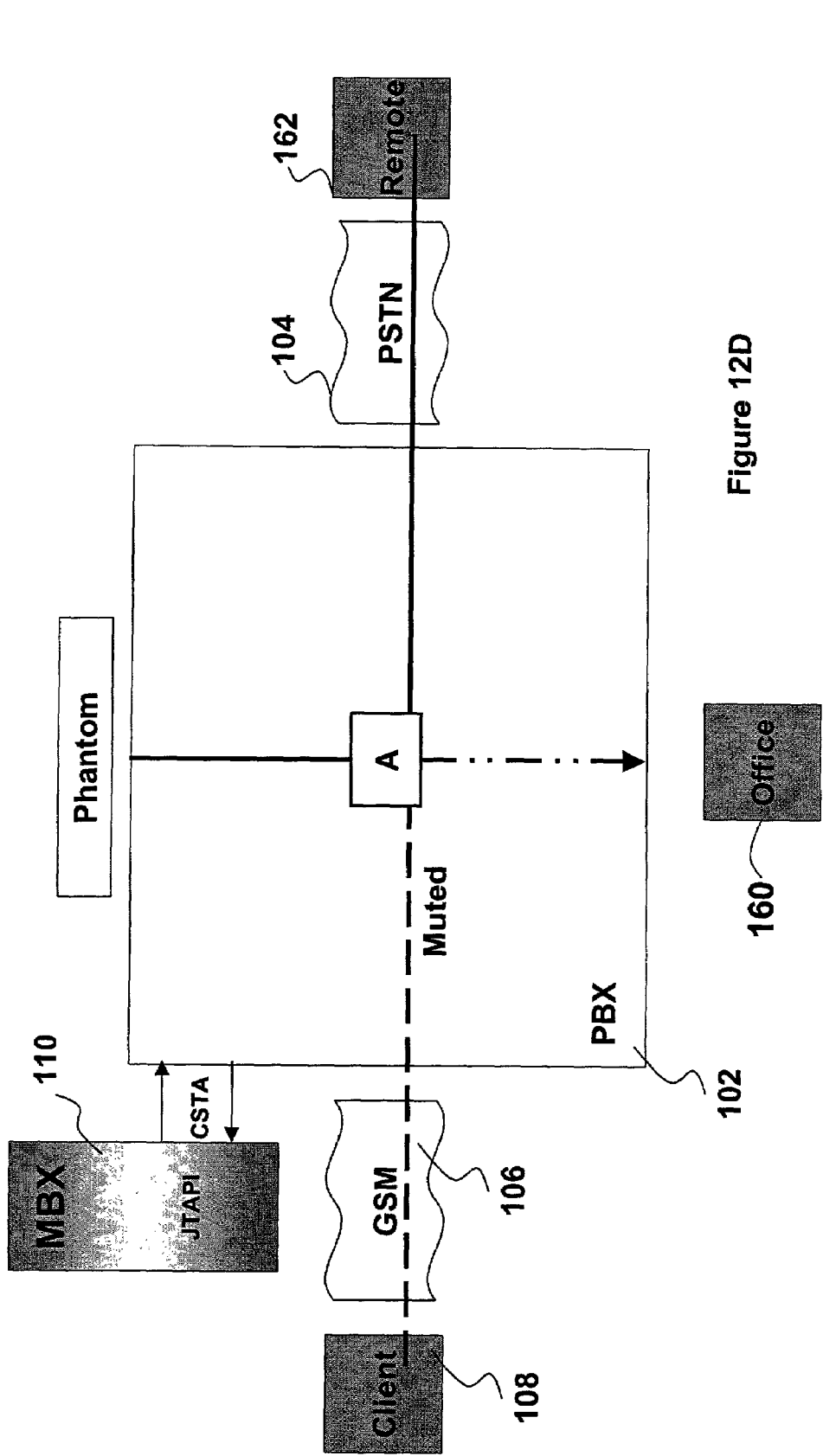

Then, as shown in FIG. 12C, calls C and A are conferenced together and the mobile portion of call C is muted. The result, as shown in FIG. 12D, is that call A is the "live" call and is established among remote telephone number 162, office telephone 160 and the virtual terminal within PBX 102.

Finally, having received a listen in command, as shown in FIG. 12B, call A is then redirected to the number that was included in that command, as shown in FIG. 12E.

(11) Listen In—Intrude

FIG. 13 shows a sequence, which is an extension of the sequence illustrated in FIGS. 12A–12E. In this case, if the user of mobile telephone 108 desires to intrude, or become a participant in the call that has been placed by remote telephone number 162, then the user of mobile telephone 108 simply un-mutes the mobile portion of the conferenced call locally at the mobile telephone, or via an appropriate TIEP command, thereby becoming an active participant.

Control of PBX 102 by MBX 110 can be accomplished using the following exemplary commands that are standard commands used by the vast majority of commercially available PBXs:

Make Call
Answer Call
Clear (End) Call
Clear (Drop) Connection
Deflect (Redirect) Call
Transfer Call
Conference Call
Hold Call
Retrieve (Unhold) Call In addition the relatively simple commands above, the present invention preferably configures a set of virtual terminals in the PBX, configured in hunt groups to which a PBX phantom number can be assigned. Thus, as can be readily appreciated by those skilled in the art, there are only very minor configuration changes needed to have a conventional PBX operate in accordance with the principles of the present invention.

The present invention not only extends conventional PBX functionality to a mobile telephone, but because mobile telephone 108 can be programmed via application layer 208, a significant number of other features associated with PBX and general usability functionality can also be provided to the user of mobile telephone 108 and/or the company/organization with which the user is associated, as will become apparent from the additional description below.

Figure 14:
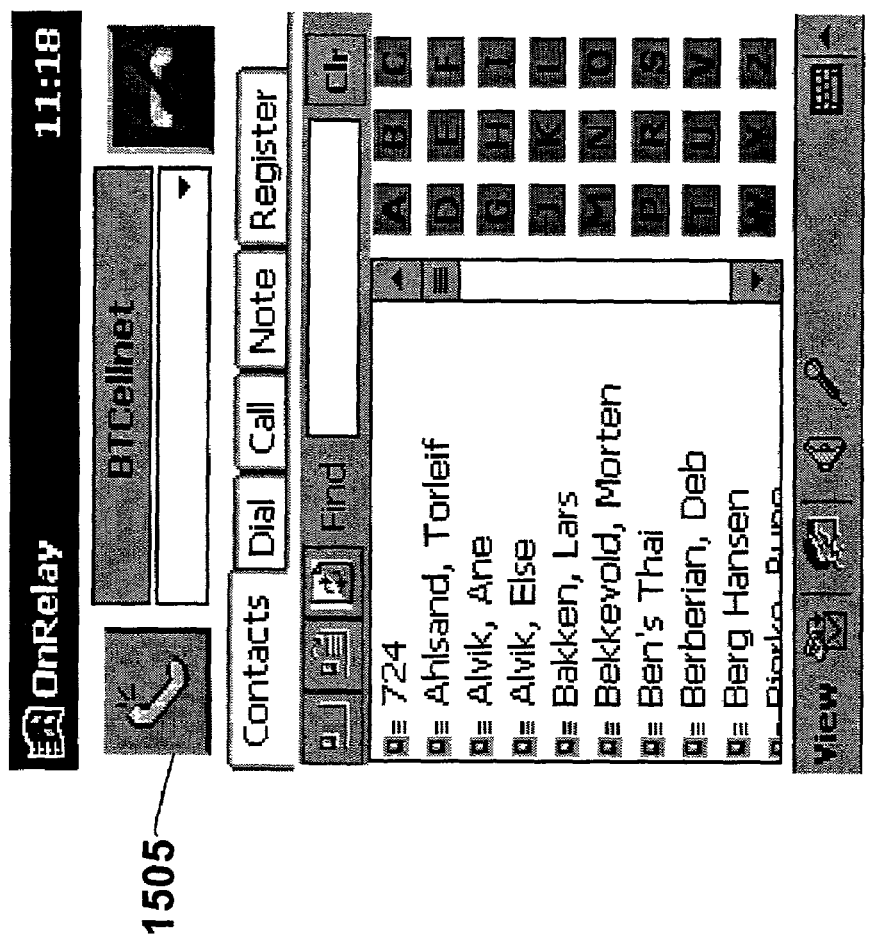
FIGS. 14–23 illustrate exemplary functionality and related screen shots displayed on a mobile telephone in accordance with the present invention.

FIG. 14 illustrates an exemplary screen shot that might be displayed on display 202 of mobile telephone 108. Display 202 preferably implements touch screen functionality whereby the user can select particular items by touching or tapping a stylus or other pointing device (e.g., a finger) to display screen 202. In a preferred embodiment, several screens are easily accessible by arranging the screens in a tabbed configuration. In the case of the screen illustrated in FIG. 14, there are tabs assigned for contacts, dial, call, note, and register.

FIG. 14 illustrates an exemplary contacts screen in accordance with the present invention. In a preferred embodiment, each person or company, etc. that is entered in the contacts list includes full contact information and, in particular, telephone numbers via which those contacts can be contacted, and the contact list is fully consistent and synchronised with the already existing contact list on the mobile telephone. In accordance with the preferred embodiment of the present invention, the user of mobile telephone 108 can simply double tap a selected contact on display screen 202, which will when then preferably present one or more telephone numbers for the selected contact. In a preferred embodiment, the displayed telephone number is then tapped and mobile telephone 108 is automatically dialed and the call connected in accordance with the MBX control described above.

Figure 15:
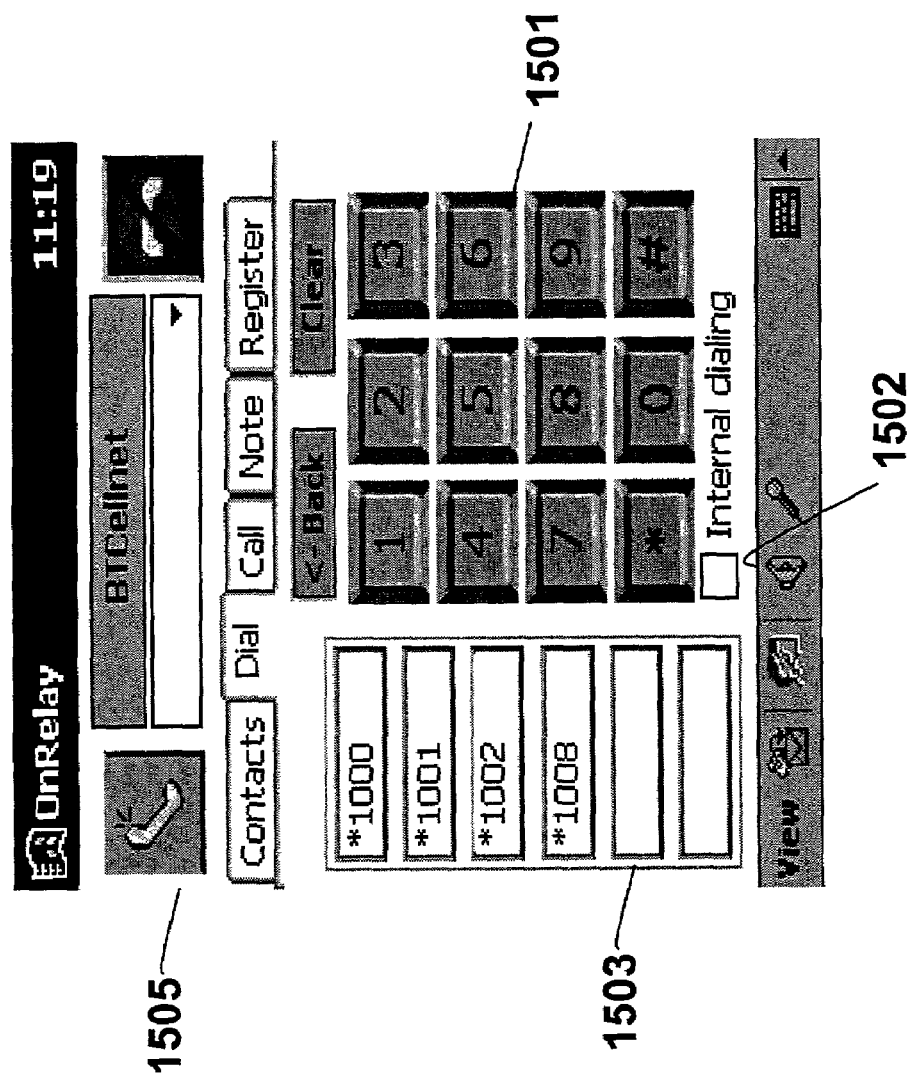

FIG. 15 illustrates the display under the dial tab. In this screen a dial pad 1501 is displayed along with several preprogrammed speed dialing keys 1503. If dial pad 1501 is employed then mobile telephone 108 will initiate a call once call button 1505 is tapped. If a speed-dialing key 1503 is tapped, then mobile telephone 108 preferably immediately initiates the call without having to tap call button 1505. If the internal dialing check-button 1502 is selected, the user can dial using the internal dialing plan of the PBX, as if dialing from the office phone. If the internal dialing 1502 check-button is not selected, the user can dial using the regular public dialing plan.

Figure 16:
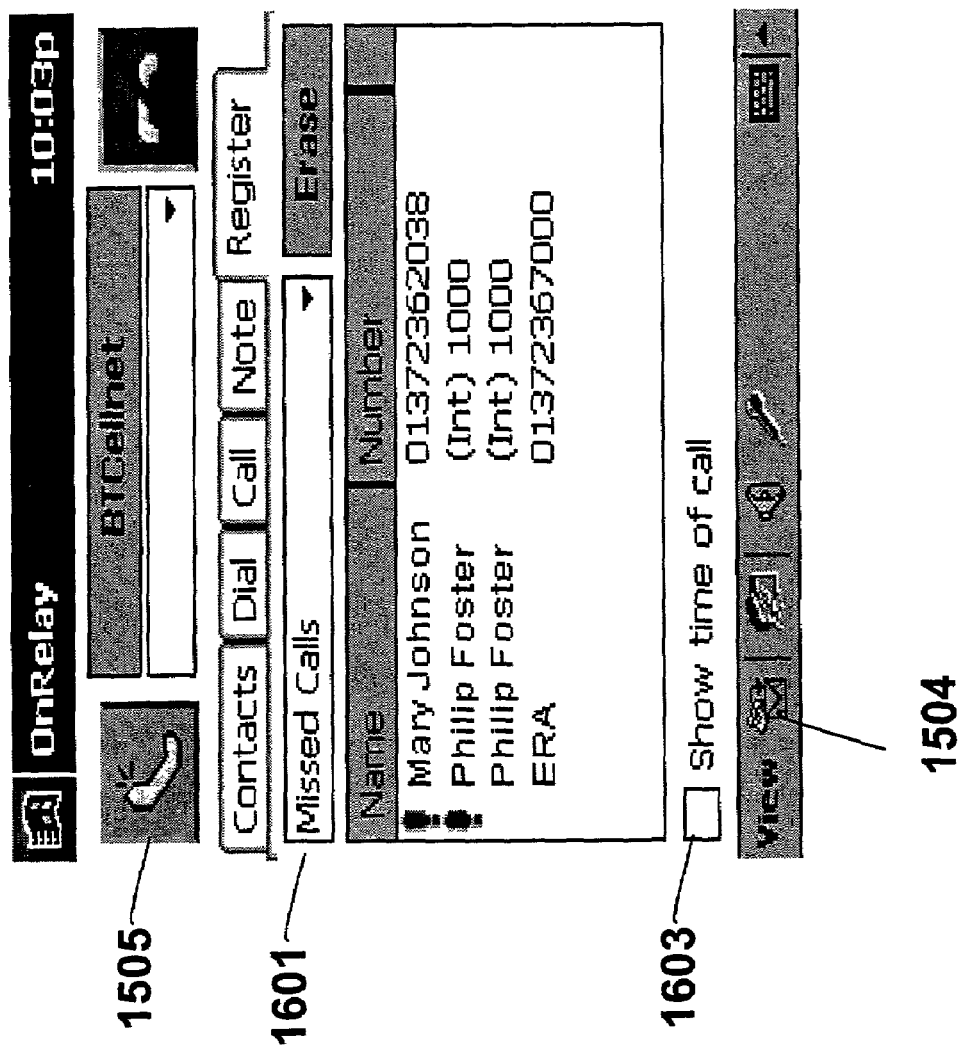
Figure 17:
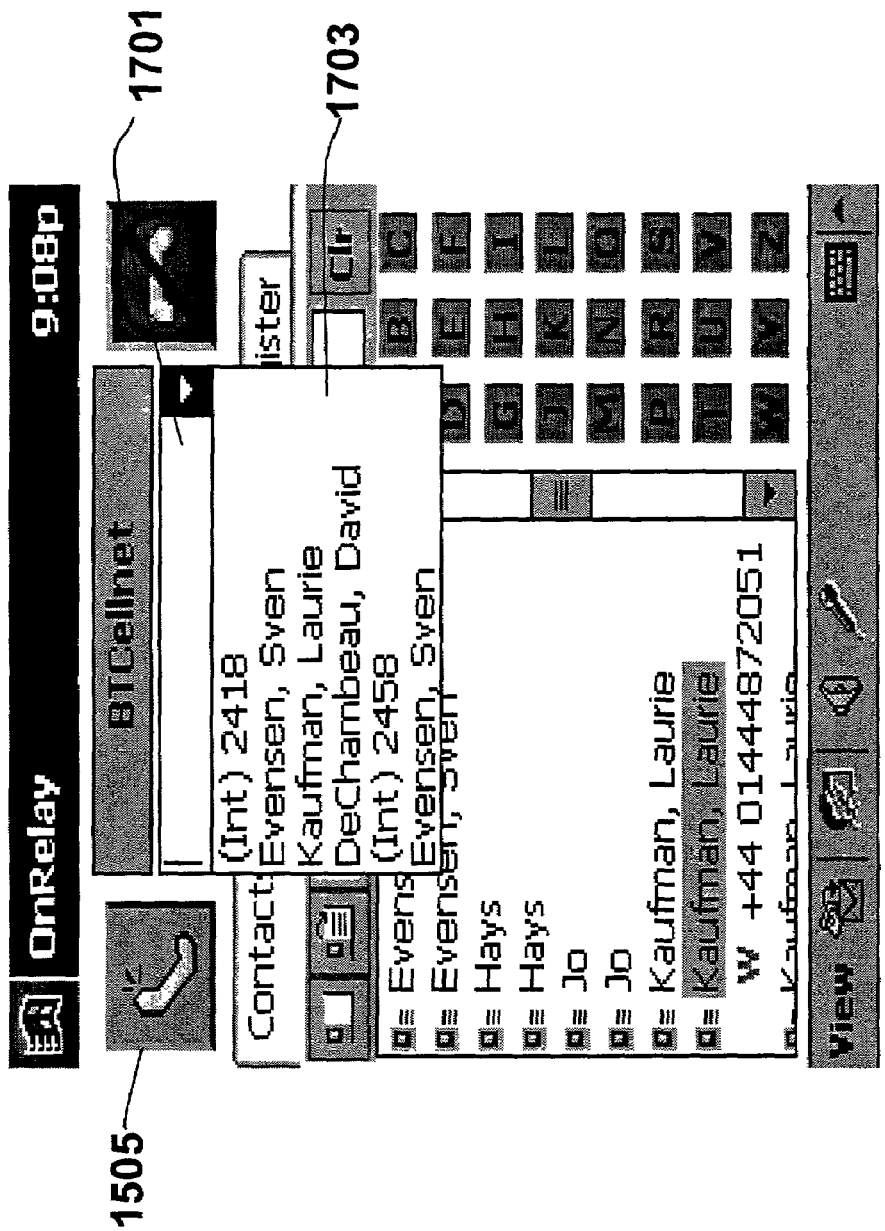

A user of mobile telephone 108 can also access one of several registers that are updated in the normal course of usage of the system and service provided by the present invention. One example of a register in accordance with the present invention is a missed call register, as shown in FIG. 16. Such a register captures and stores the telephone numbers and preferably also a name of a party whose telephone call was missed, because, e.g., mobile telephone 108 was powered off, or mobile telephone 108 was out of range of a wireless network. Different registers, including, but not limited to, outgoing calls and incoming calls, are preferably chosen from a pull down menu 1601. Preferably, there is also an option 1603 for selecting whether to show the times of the calls stored in the register being viewed. Other details of parameters of calls may also be stored and/or displayed as may be desired for a particular implementation of the present invention.

In an alternative quick dialing method, call button 1505 is preferably programmed to cause the last dialed number to be displayed in field 1701, and if call button 1505 is tapped again, the last dialed number is automatically called. If the displayed number is not the number that the user wishes to call, then the user may choose from a last dialed list 1703. Once the desired telephone number or party is selected, call button 1505 is tapped to initiate the call.

As also shown in FIG. 16, a user of mobile telephone 108 can also access a voice message indication button 1504 which is highlighted and displays an open envelope when the voice message indicator lamp on the office telephone is lit. When the voice message indicator lamp on the office telephone is not lit, the button displays a closed envelope, as pictured. The user of mobile telephone 108 can click on the voice message indication button 1504 to dial directly to the PBX voice message system, and the client also provides a mechanism for sending pre-configured DTMF tones to automatically log on the user to the PBX voice messaging system.

Figure 18:
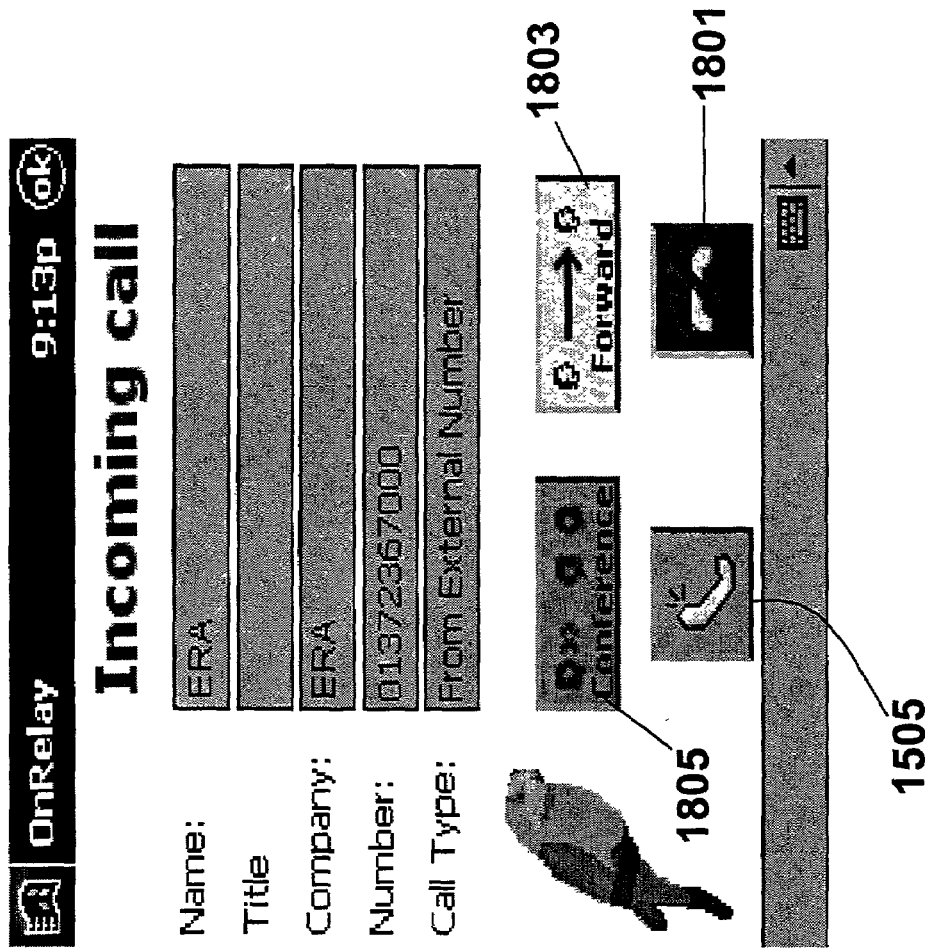

FIG. 18 shows an exemplary screen shot displayed by mobile telephone 108 at the time an incoming call is received. As previously explained, the present invention provides full calling line identity (CLI) information at the mobile telephone. At least a portion of this information is preferably passed via data path 152 before a voice connection is fully established between the mobile telephone user and a caller. In a preferred embodiment, MBX 110 or mobile telephone 108 initiates a public directory or customer relations management (CRM) database look-up arid/or native contact list look-up whereby full contact details of the calling party including a company name and title can be displayed to the local telephone user. Accordingly, the present invention provides a particularly useful call-screening feature whereby, especially in a mobile communications environment, a user can limit the calls that he wishes to engage in. FIG. 18 also shows an exemplary information display of the CLI information. To answer an incoming call, the user simply taps call button 1505.

To reject a call, the user taps a hang up button 1801 in the incoming call screen. In a preferred embodiment, when hang up button 1801 is tapped, the incoming call ceases at mobile telephone, but the call continues at the associated office telephone, and voice mail, if available. Of course, the call is also preferably placed in the appropriate register for later retrieval, as might be desired.

A significant feature of the present invention is the ability for a mobile telephone user to forward a call and establish conference calls as though the user were using their conventional PBX-connected office telephone. Referring still to FIG. 18 two buttons, 1803 and 1805, are provided for these two features.

Figure 19:
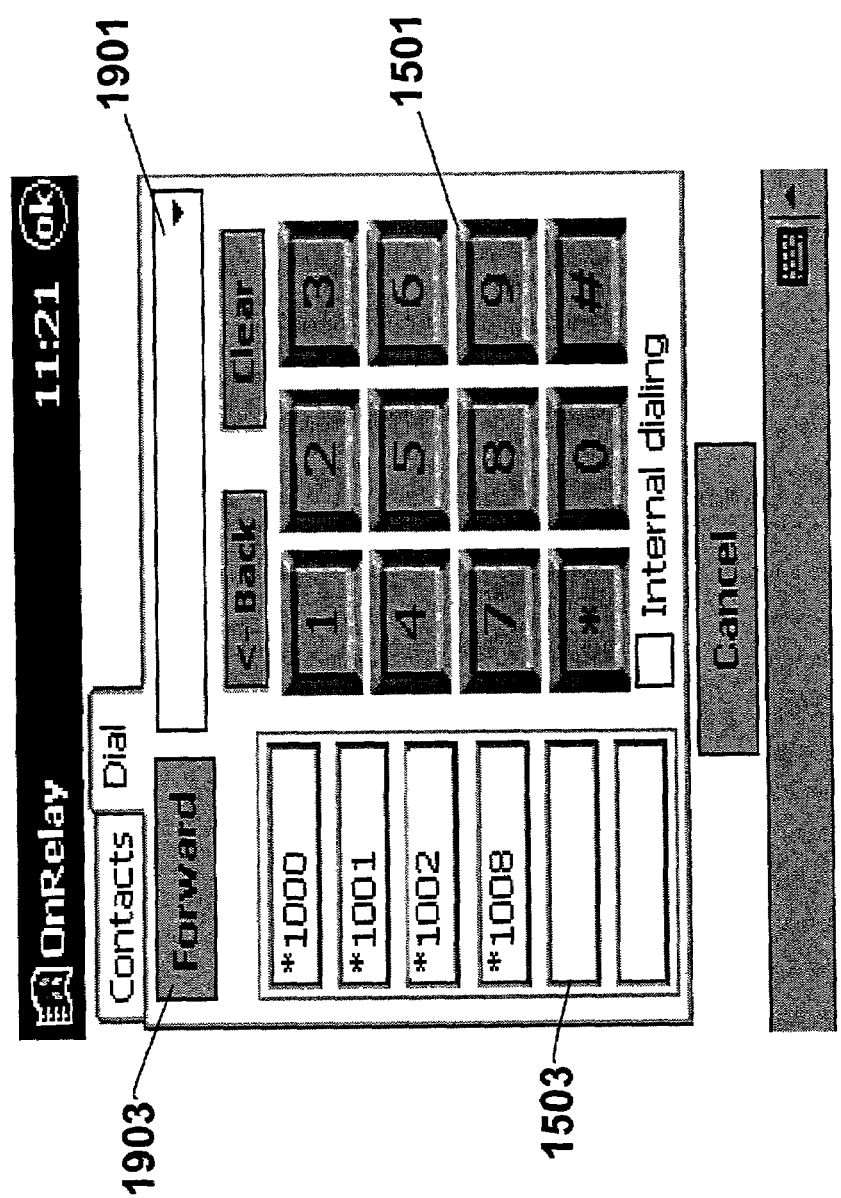

FIG. 19 shows an exemplary screen that is presented to a user when forward button 1803 is tapped. Specifically, the dial tab is presented to the user to give the user the opportunity to choose a party to whom the caller should be forwarded. Once the telephone number is selected in field 1901, forward button 1903 is tapped to forward the call. As shown, the telephone number can be selected via dial pad 1501, speed dial buttons 1503 or a last call list.

Figure 20:
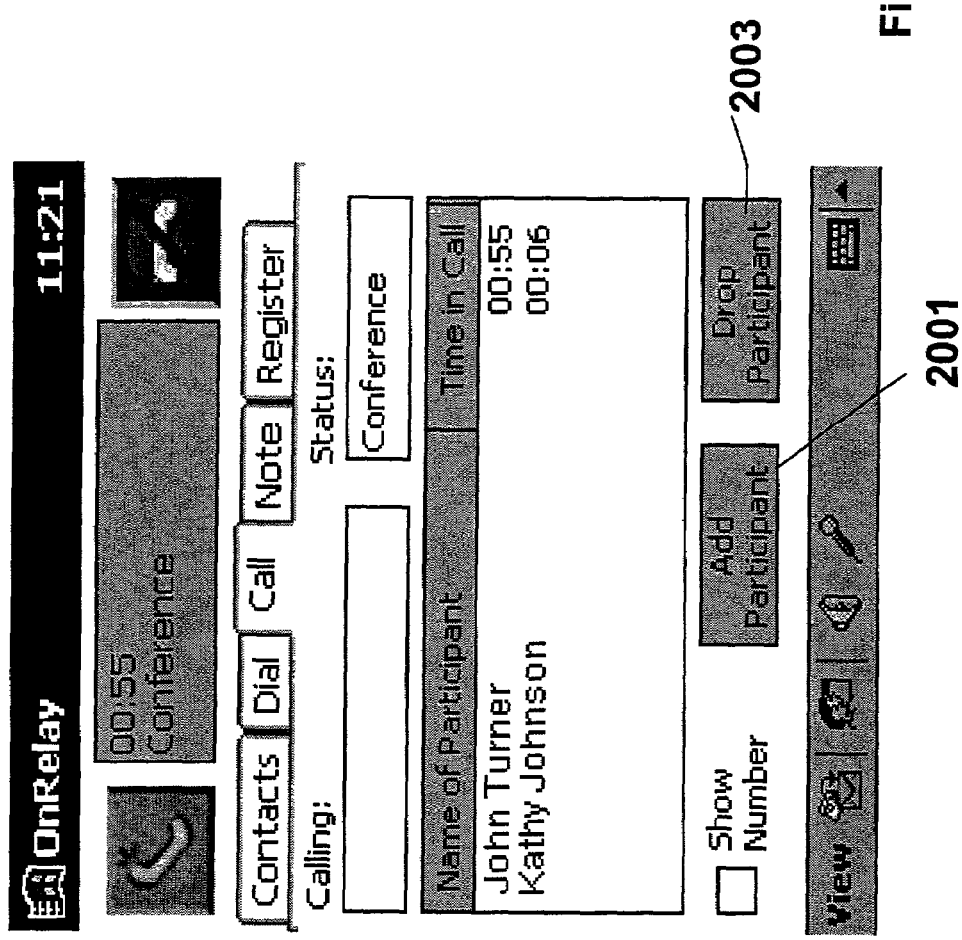

A conference call is preferably initiated by tapping conference button 1805 (FIG. 18) and FIG. 20 illustrates an exemplary screen under the call tab when a conference is desired. In this case, participants in a conference call are listed along with the time that each of the participants has been connected. To add a participant, the user taps add participant button 2001 and a screen like that illustrated in FIG. 19 is presented to the user, whereby the user can select a telephone number associated with the desired new conference participant via dial pad 1501, speed dial buttons 1503 or last call list 1901.

An incoming call also can be conferenced in with an on-going call. When the incoming call is received at mobile telephone 108, the user is notified and given the opportunity to tap add participant button 2001 to connect the new call to the conference call. Preferably, all participants, including the newly added party, are listed in the call tab screen like that shown in FIG. 20. At any time, the user of mobile telephone 108 can drop a participant in a conference call by tapping drop participant button 2003.

Figure 21:
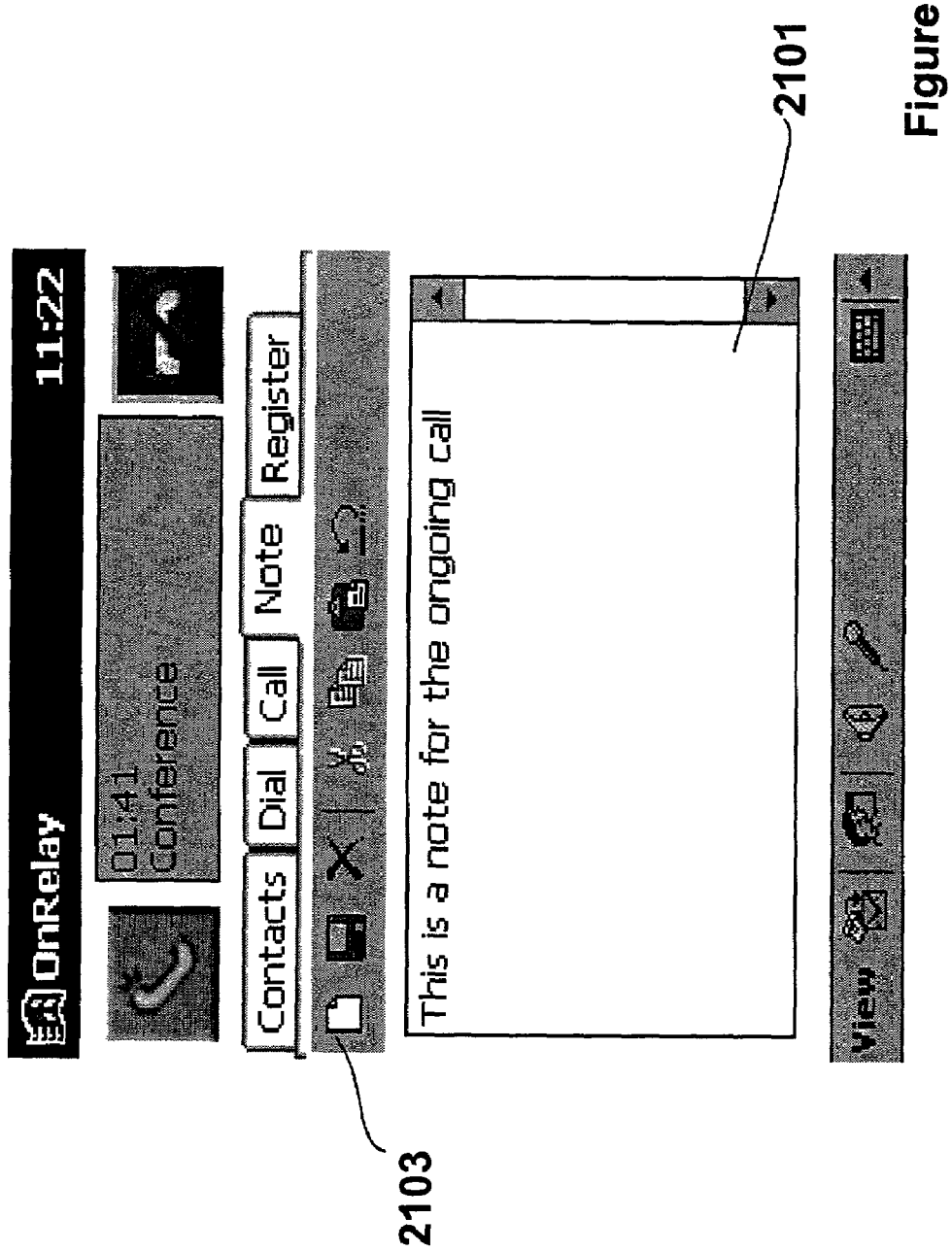

FIG. 21 shows an exemplary screen shot presented under the note tab. In accordance with the present invention, a user of mobile telephone 108 can take a note during a call by tapping the note tab and then tapping into note text area 2101. Text can be entered using a keyboard presented to the user or a character recognition program. The completed note is preferably auto-saved at the end of the call. However, a note can also preferably be edited or added to after the call has been completed. A save icon in tool bar 2103 is then tapped to save the note.

Figure 22:
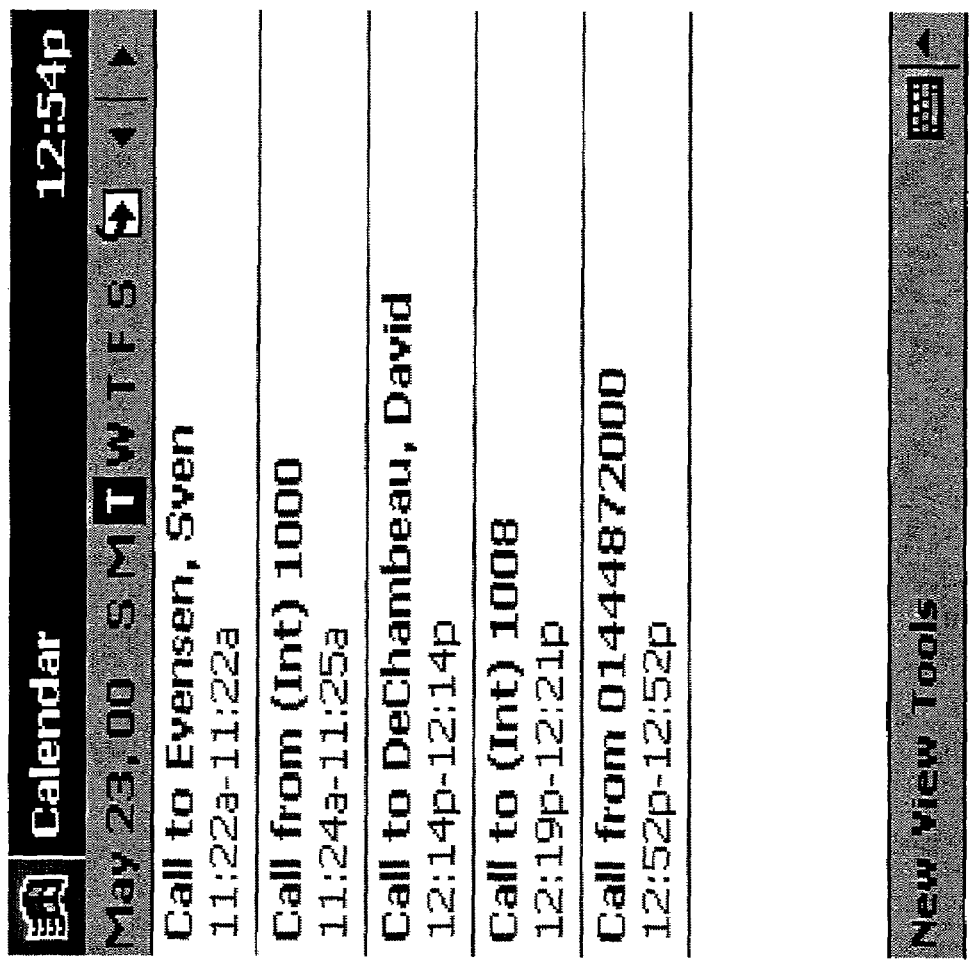
Figure 23:
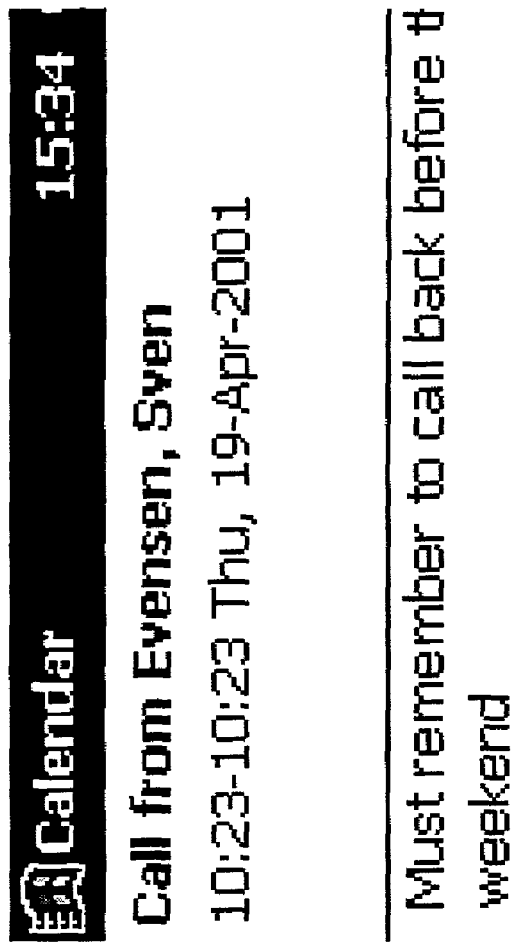

As with most personal digital assistants, mobile telephone 108 preferably includes a calendar application. In accordance with the present invention, such a calendar application can be populated with telephone calls that are made or received via mobile telephone 108, as well as notes that have been generated in connection with such telephone calls. An exemplary calendar is shown in FIG. 22 and FIG. 23 shows one of the calendar entries after being expanded. In this case, a note associated with the telephone call is also shown. It is subsequently possible for the user to search for previous calls by means of the native calendar search function provided with most personal digital assistants.

Having described the basic functionality and implementation techniques of the present invention, the following will describe still more features and advantages of the present invention.

The first and perhaps foremost advantage of the present invention is that an office worker need only have a single telephone number via which people can contact that person. That is, since mobile telephone 108 is controlled, ultimately, by MBX 110, calls passing through PBX 102 can be routed to the office worker's conventional wire line telephone or to his/her mobile telephone 108. Indeed, the present invention preferably provides synchronized simultaneous ringing wherein mobile telephone 108 and the mobile telephone user's wire line office telephone ring at the same time when an incoming call is received, thereby permitting the user to answer the call where most convenient without having to manually configure a redirection of the call. Similarly, one's existing office telephone number automatically becomes a user's single unified business number both for receiving incoming calls and external presentation of outgoing calls. Also, there is no need for the user to continuously modify forward settings at the PBX office telephone, as the simultaneous ringing mechanism can be statically configured.

Another feature of the present invention, as already described herein, is the receipt of full calling line identify information, which can be gleaned from any number of directories or databases that can be accessed either directly from within mobile telephone 108 or via MBX 110, or even directly from data network 114 (e.g., LDAP) without even accessing MBX 110. In a preferred embodiment, a user's address book, stored for example, in Microsoft Outlook, can be synchronized with the address book of mobile telephone 108.

Also, because MBX 110 is in constant communication with PBX 102, even if mobile telephone 108 is not powered on, MBX 110, SMS Gateway 116 or GSM data-network 106 can store calls that have been missed and when mobile telephone 108 is subsequently powered on the missed call information can be updated in the call register of the mobile telephone. Of course, this feature is also effective when mobile telephone 108 is out of range of mobile telephone network 106.

Also, because of the functionality provided by MBX 110, it is possible for a user of mobile telephone 108 to listen in on voicemail that is being left by a caller. This gives the user of mobile telephone 108 the opportunity to interrupt and answer the call as desired, thereby simulating home-answering machine behavior. Again, this functionality is made possible by the close association of MBX 110 with PBX 102 along with the fact that mobile telephone 108 is in communication with MBX 110 both via a voice path 150 and data path 152, i.e., the VDSP.

Since incoming calls received at mobile telephone 108 are passed through PBX 102, even if mobile telephone 108 loses wireless connectivity with mobile telephone network 106, the call may still be connected with PBX 102. In such an instance, MBX 110 will preferably attempt to re-establish or reconnect mobile telephone 108 with the call that is still connected with PBX 102 or, if that is not possible, redirect the call to the user's voice mailbox, or alternatively, a switchboard. As previously explained, the virtual terminal within PBX 102 is kept in conference with the on-going mobile telephone call in the event it is necessary to re-establish the call.

Because data path 152 provides calling line identity information to mobile telephone 108 without there having to be a connected voice path, the present invention also supports forwarding a call without ever answering it. This is particularly useful when a user is busy at a meeting or on another call.

Another benefit of having mobile telephone 108 being closely related to PBX 102 through MBX 110 is that the mobile telephone can now be used as though it were a conventional wire line office telephone in the sense that the mobile telephone user can choose to use the internal short number dialing plan that is supported by virtually all PBXs. For example, instead of having to dial a full number of an office colleague, the mobile telephone user can simply dial a four/five digit extension that has been assigned to the office colleague. Similarly, mobile telephone 108 can be configured such that the user must dial a "9" in order to access an outside line.

Although users are preferably able to configure the ordering or organization of basic calling data such as contact name, times of calls, etc., software incorporated in mobile telephone 108 is preferably able to conduct searches of the several data records and notes as well. This searching functionality is preferably applicable to both incoming and outgoing calls. Also, call records can be integrated with existing customer relations management (CRM) systems. In the overall system topology 100 of the present invention, element 120 (FIG. 1) could be such a CRM system.

In a preferred embodiment of the present invention, MBX 110 and/or mobile telephone 108 can also be programmed to filter incoming calls based on user-identified criteria such as time of day, calendar status or VIP list. For example, the system can be configured to permit only a predetermined set of callers to be able to get through to mobile telephone 108 whereas others are automatically redirected to voicemail. In this way, a user can have a significant amount of control over his accessibility to others. The filtering mechanisms can be loaded on either (or both) mobile telephone 108 or MBX 110.

Another significant advantage to having mobile telephone 108 closely associated with PBX 102 is the ability to control telecommunications services and, particularly, mobile telecommunications costs. For example, corporate users who are given access to a mobile telephone in accordance with the present invention can have their access to both domestic or international call destinations limited/controlled, since the present invention can enforce routing of all calls through the PBX, and thereby reuse the existing call screening functionality in the PBX. Thus, not only can employees be controlled with respect to outbound calling while in a wire line office environment, but those employees can now also be controlled with respect to outgoing calling even if they are using a mobile telephone.

Similarly, present mobile telephone users do not have access to true pre-negotiated rates for telephone connectivity. Long distance calling, in particular, is very expensive when initiated from a mobile telephone versus a land line telephone, especially when "roaming." However, the present invention provides a way to bypass these more expensive telephone connections by channeling all mobile telephone communications through a PBX. Accordingly, assuming the mobile telephone user is not roaming, then all long distance calls initiated by the mobile telephone can enjoy the lower telecommunications prices available to PBX-connected wire-line telephones. Also, a mobile-to-mobile call between different mobile operators is frequently significantly more expensive than the sum of the costs of a mobile-to-fixed and a fixed-to-mobile call, further reducing mobile telephone call charges.

In the case that it is more costly to route calls via the PBX than directly, it is possible with the present invention to configure the client to route specific calls directly (not via PBX) by means of the standard GSM call routing mechanism. This least cost routing mapping is based on automatic client side number recognition and the identity of the mobile operator and the country at which the phone is currently registered.

In addition, if a corporation has locations in different parts of a country or the world, then mobile telephone 108 can be programmed to operate with selected local MBXs so that every call initiated by mobile telephone 108 is, effectively, a local initiated call.

Still another useful feature of the present invention is that users of mobile telephone 108 can now use project codes when initiating telephone calls. Those project codes are then fed back to MBX 110, preferably via data path 152, and registered there for cost allocation to the appropriate clients, thereby avoiding a charge to a corporation.

The present invention, as will be appreciated by those skilled in the art, can also, in view of the rich data being passed between mobile telephone 108 and MBX 110/PBX 102, provide significant insight into call data records whereby information technology personnel or others can monitor the call volume and distribution patterns of one or more mobile telephone users. This can lead to more leverage in negotiating telecommunications services and monitoring the usage patterns of individuals.

Finally, the description of the present invention has been directed, primarily, to extending telephone calls placed to and from a mobile telephone that has programmable capabilities. However, the programmable mobile telephone/PDA device contemplated to be employed in the context of the present invention could also be used for many other purposes. For example, email could be forwarded and sent to/from such a device, as described in U.S. Pat. No. 6,219, 694 B1 to Lazaridis et al. Similarly, the mobile telephone/PDA could be used as an extension of a user's office computer, whereby files or applications that are manipulated on the user's computer can be synchronized or mirrored on the mobile telephone/PDA used in connection with the present invention. Examples of such functionality include accessing the world wide web via data path 152 or accessing a CRM database in a home office via data path 152, or via some other connectivity outside of the MBX paradigm of the present invention. The foregoing functionality is preferably all available on a single device with a single mobile operator subscription for voice and data service.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for providing private branch exchange (PBX) functionality to a mobile communications device, comprising:
   a mobile communications device (108) operable to communicate via a voice pathway (150) and a data pathway (152);
   a private branch exchange (PBX) (102) operable to communicate with the mobile communications device (108) via the voice pathway (150);
   a mobile branch exchange (MBX) server (110) operable to communicate with the mobile communications device (108) via the data pathway (152), and to monitor the PBX (102) for activity related to a user of the mobile communications device (108), and to communicate with and control the PBX (102) in accordance with commands received via the data pathway (152) from the mobile communications device (108) or in accordance with algorithms residing in the MBX server (110);
   the MBX server (110) operable to monitor, communicate and control the PBX (102) via a separate data connection interface (140), without being connected to the voice pathway (150) in such a way that voice calls handled by the voice pathway (150) are routed through the MBX server (110);
   the mobile communications device (108) having a mobile branch exchange software client (MBX client) (208) operable to communicate in parallel via a voice pathway (150) with the PBX (102), and via the data pathway (152) with the MBX server (110), the MBX client (208) also being operable to (i) monitor the mobile communications device for activity related to the voice pathway (150) between the mobile communications device (108) and the PBX (102), and (ii) control the voice pathway (150) between the mobile communications device (108) and the PBX (102) in accordance with commands received via the data pathway (152) from the MBX server (110) and from the user of the mobile communications device (108);
   the data pathway (152) between the MBX server (110) and the MBX client (208) being arranged in parallel with the voice pathway (150) between the mobile communications device (108) and the PBX (102); and
   the MBX server (110) and the MBX client (208) being in communication with each other via a Voice Data Synchronization Protocol (VDSP) implemented in both the MBX server (110) and the MBX client (208).

2. The system of claim 1, wherein the separate data connection comprises a Computer Telephony Integration (CTI) interface (140).

3. The system of claim 1, wherein the CTI interface (140) comprises at least one of CSTA, TAPI, JTAPI, and TSAPI.

4. The system of claim 1, wherein the mobile communications device (108) is at least one of a personal digital assistant, a mobile telephone and a mobile computer.

5. The system of claim 1, wherein the voice pathway (150) and the data pathway (152) share a common communications network.

6. The system of claim 1, wherein the voice pathway (150) comprises at least one of a packet switched network and a circuit switched network.

7. The system of claim 1, wherein the data pathway (152) comprises at least one of a packet switched network and a circuit switched network.

8. The system of claim 1, wherein the data pathway (152) comprises at least one of a short messaging service (SMS) device, an Unstructured Supplementary Services Data (USSD) device, a General Packet Radio System (GPRS) device, and a Unified Mobile Telecommunications System (UMTS) device.

9. The system of claim 1, wherein the MBX server and PBX comprise an integral device.

10. The system of claim 1, wherein the mobile communications device (108) comprises a graphical user interface (202) for controlling at least one of incoming and outgoing calls.

11. The system of claim 1, wherein the parallel voice (150) and data (152) pathways are used to notify a user of the mobile communications device (108) of the existence, and caller identity of, an incoming call received at the PBX (102) from a caller (161 or 162), and wherein the parallel voice and data pathways can be used to instruct the PBX (102) to place an outgoing call from the PBX (102) to a callee (161 or 162), and wherein said incoming call to the PBX (102) or said outgoing call from the PBX (102) is switched into a common call within the PBX (102), which also includes the voice connection between the PBX (102) and the mobile communications device (108).

12. The system of claim 11, wherein the incoming call is destined for a PBX-connected telephone (160) that is assigned for use by a person using the mobile communications device (108).

13. The system of claim 11, wherein a call initiated at the mobile communications device (108) to a callee (162 or 162) is routed through the PBX (102), wherein at least a portion of the information received from the MBX server (110) is provided by the MBX client (208) on the wireless communication device (108), by means of VDSP signaling via the data pathway (152) between the MBX client (208) and the MBX server (110).

14. The system of claim 13, wherein the MBX server (110) and the MBX client (208) cause the call initiated at the mobile communications device (108) to be routed through the PBX (102) such that the call made by the mobile communications device appears to the callee (161 or 162) as being placed from a PBX-connected telephone (160) associated with the mobile communications device (108).

15. The system of claim 11, wherein the MBX client (208) at the mobile communications device (108) can, in conjunction with the MBX server (110), and by means of the data pathway (152), be used to remotely control conference call functionality within the PBX (102), in such a way that a conference call is switched into a common multi-party call within the PBX (102), wherein the conference call includes the original voice connection between the PBX (102) and the mobile communication device (108), wherein the conference call also initially includes the original incoming or outgoing voice connection to/from the PBX (102), and wherein the conference call also includes voice connections between the PBX (102) and other conference participants.

16. The system of claim 15, wherein the conference call functionality comprises a graphical user interface that indicates the participants in the conference call within the PBX (102).

17. The system of claim 15, wherein the conference call functionality comprises adding a new conference call participant to an established call within the PBX (102) by instructing the PBX (102) to place a call to the new conference call participant from the PBX (102).

18. The system of claim 15, wherein the conference call functionality comprises adding a new incoming call to the PBX as a new conference call participant to the conference call within the PBX (102).

19. The system of claim 15, wherein the conference call functionality comprises causing a conference call participant of the conference call within the PBX (102) to be dropped from the ongoing conference call.

20. The system of claim 15, wherein the conference call functionality comprises indicating to a user of the mobile communications device (108) (i) how long each participant has been participating in the conference call within the PBX (102) and (ii) whether a participant has been dropped from the conference call within the PBX (102).

21. A method of extending the functionality of a private branch exchange (PBX) to a mobile communications device, comprising the steps of:
    establishing a data pathway between a software server and a software client on a mobile communications device;
    establishing a voice pathway between a PBX and the mobile communications device;
    sending commands and information signals over the data pathway from the mobile communications device to the software server and from the software server to the mobile communications device;
    monitoring the PBX for activity related to a user of the mobile communications device using the software server, the software client, and a computer telephony integration data connection exposed by the PBX;
    controlling the PBX from the software server in accordance with the commands received over the data pathway from the software client on the mobile communications device and in accordance with algorithms residing in the MBX server;
    connecting the voice pathway between the PBX and the mobile communications device to a call switched within the PBX, the switched call being an outbound or an inbound voice connection to an internal or external call participant;
    combining the voice and data pathways in a Voice Data Synchronization Protocol (VDSP) which is implemented by the software server and the software client; and
    sending commands and information signals across the data pathway, and using such signals to synchronize the behaviour of the voice pathway at the mobile communications device and at the PBX and thereby allow a user of the mobile communications device to remotely monitor, control and participate in PBX calls.

22. The method of claim 21, further comprising extending handling of incoming calls to the PBX to the mobile communications device, comprising the steps of:
    monitoring the PBX for an incoming first call for a selected telephone number from an internal or an external caller;
    causing the PBX to establish a second call from the PBX to the mobile communications device;
    sending to the software client on the mobile communications device via the data pathway an indication containing call data including calling line identity information for the incoming first call to the PBX;
    combining at the mobile communications device the second call and the information for the incoming call to the PBX received via the data pathway; and
    causing the PBX to connect the incoming first call with the second call into a common call within the PBX, wherein the resulting call contains a connection between the mobile communications device and the PBX and another connection between the PBX and the caller, thereby establishing a speech path between the incoming caller and the mobile communications device.

23. The method of claim 22, wherein each of the recited steps occurs automatically.

24. The method of claim 22, further comprising ringing the incoming first call at a PBX-connected telephone associated with the selected telephone number simultaneously with ringing the second call at the mobile communications device.

25. The method of claim 22, further comprising storing calling data with respect to the incoming first call and the second call such that it appears the two calls comprises a single incoming PBX call that was answered by a PBX user.

26. The method of claim 22, further comprising sending a PBX voice message indication to the software client in the mobile communications device when a voice mail indicator on a PBX telephone associated with the mobile communications device has been turned on or off, by sending a corresponding indication from the software server to the software client on the mobile communications device via the data pathway.

27. The method of claim 21, further comprising employing the PBX to route calls from a mobile communications device to an internal or an external callee, comprising the steps of:
    sending to the software server from the software client on the mobile communications device, via the data pathway, calling information for contacting the callee;
    establishing a first call in any direction between the mobile communications device and the PBX;
    causing the PBX to establish a second call between the PBX and the callee based on the calling information; and
    causing the PBX to connect the first call with the outgoing second call into a common call within the PBX, wherein the resulting call contains a connection between the mobile communications device and the PBX, and another connection between the PBX and the callee, thereby establishing a speech path between the mobile communications device and the callee.

28. The method of claim 27, wherein each of the recited steps occurs automatically.

29. The method of claim 27, further comprising storing calling data with respect to the first call and the second call such that it appears the two calls comprises a single outbound PBX call that was originated by a PBX user.

30. The method of claim 21, further comprising transferring the call to a third party by sending a command from the software client to the software server via the data pathway to cause the software server to instruct the PBX to transfer the call.

31. The method of claim 21, further comprising causing the PBX to add additional connections to an original established call, such that the resulting call switched within the PBX includes the voice pathway between the mobile communications device and the PBX, and also includes voice connections between the PBX and other call participants.

32. The method of claim 31, further comprising adding an incoming caller to the PBX as an additional connection to the original established PBX call, comprising the steps of:
- monitoring the PBX for an incoming call for a selected telephone number;
- executing at least one of (i) sending to the software client on the mobile communications device via the data pathway an indication of the existence and calling line identity of the incoming call and (ii) placing a second call from the PBX to the mobile communications device;
- sending from the software client to the software server via the data pathway a request to connect the caller of the incoming call to the established call; and
- causing the PBX to combine within a common call the incoming call to the PBX with the established call, such that the resulting call includes a single connection between the mobile communications device and the PBX, a connection between the caller and the PBX, and connections between the PBX and the other call participants.

33. The method of claim 31, further comprising adding a new participant into the established call within the PBX, comprising the steps of:
- sending from the software client to the software server, via the data pathway, a request, which contains calling information, to add an additional connection to the established call within the PBX;
- causing the PBX to place an outgoing call to the new participant; and
- causing the PBX to combine within a common call the outgoing call from the PBX with the established call, such that the resulting call includes the connection between the mobile communications device and the PBX, a connection between the PBX and the new participant, and connections between the PBX and the other call participants.

34. The method of claim 31, further comprising indicating on the mobile communications device the list of call participants in the PBX call by sending indications from the software server to the software client via the data pathway at least one of (i) how long each connection in a call within the PBX has been established and (ii) whether a connection has been dropped from the PBX call.

35. The method of claim 31, further comprising causing, from the mobile communications device, a connection to be dropped from the call in the PBX, comprising the steps of:
- sending a request from the software client to the software server via the data pathway, which includes the identity of the connection to be dropped; and
- causing the PBX to drop the connection from the call.

* * * * *